United States Patent [19]

Schotz

[11] Patent Number: 4,837,693

[45] Date of Patent: Jun. 6, 1989

[54] METHOD AND APPARATUS FOR FACILITATING OPERATION OF AN INSURANCE PLAN

[76] Inventor: Barry R. Schotz, 1212 Muirlands, La Jolla, Calif. 92037

[21] Appl. No.: 20,329

[22] Filed: Feb. 27, 1987

[51] Int. Cl.[4] .................. G06F 15/21; G06F 15/30
[52] U.S. Cl. ................................ 364/408; 364/401
[58] Field of Search ................ 364/408, 401, 402; 235/381

[56] References Cited

U.S. PATENT DOCUMENTS

| | | | |
|---|---|---|---|
| 4,462,768 | 7/1984 | Roberts | 364/401 X |
| 4,491,725 | 1/1985 | Pritchard | 364/413 X |
| 4,511,970 | 4/1985 | Okano | 364/401 |
| 4,567,359 | 1/1986 | Lockwood | 235/381 |
| 4,598,367 | 7/1986 | DeFrancesco | 364/408 |
| 4,648,037 | 3/1987 | Valentino | 364/408 |

Primary Examiner—Jerry Smith
Assistant Examiner—Steve G. Kibby
Attorney, Agent, or Firm—Bernard L. Kleinke; Jerry R. Potts; William P. Waters

[57] ABSTRACT

The system includes a group of computers for facilitating the implementation and administration of a desired group insurance plan, having conversion rights for individuals. The system includes information gathering devices for receiving and storing employer and employee base information, and devices for generating summarized base information signals in response to the information gathering devices. Devices generate report displays of summarized base information responsive to the signals. Also, devices calculate iteratively a desired employer contribution amount based upon the base information signals.

36 Claims, 93 Drawing Sheets

```
                                              PAGE NUMBER.:          1
                                              DATE PRINTED: 06/19/86
                                              TIME PRINTED: 12:39:12

INFORMATION FOR PROPOSAL

COMPANY NUMBER.....: 10-0000000
COMPANY NAME.......: RACHEL PERRY INCORPORATED
ADDRESS............: 911 MASON AVENUE, CHATSWORTH, CA  91311-0000

TELEPHONE: (818)-888-5881

PRIMARY CONTACT....: CAROL E. SARRORD - CONTROLLER
SECONDARY CONTACT..:

FISCAL YEAR END....: 12/31/86             TAXPAYER BASIS: ACCRUAL
TYPE OF CORPORATION: CLOSELY HELD

TARGET 1ST YEAR CONTRIBUTION: $     250,000

EMPLOYEE BREAKDOWN (1) TOTAL NUMBER OF PERSONS EMPLOYED..........................       32
    UNION....        0
    NON-UNION       32
(2) TOTAL ELIGIBLE TO PARTICIPATE..............................      32
(3) TOTAL PARTICIPATING........................................       0
(4) PART-TIME EMPLOYEES NOT ELIGIBLE...........................       0
(5) NUMBER OF LESS THAN HALFTIME EMPLOYEES
    NOT ELIGIBLE TO PARTICIPATE (LESS THAN
    1/2 OF THE WORKWEEK HOURS).................................       0
(6) SEASONAL EMPLOYEES NOT ELIGIBLE............................       0
(7) NUMBER OF NON-RESIDENT ALIENS..............................       0

EXCLUDING  THE HALF-TIME, PART-TIME AND SEASONAL EMPLOYEES (WHO ARE  NOT
ELIGIBLE TO PARTICIPATE), UNION MEMBERS AND NONRESIDENT ALIENS, INDICATE
HOW  MANY EMPLOYEES OF THE COMPANY AND ITS SUBSIDIARIES AND  AFFILIATES,
IF ANY, FALL INTO THE FOLLOWING CATEGORIES:

(1) OFFICERS...................................................       1
(2) DIRECTORS (WHO ARE NOT OFFICERS)...........................       0
(3) SHAREHOLDERS (WHO OWN MORE THAN 10 % OF
    THE STOCK OF THE COMPANY AND ITS
    SUBSIDIARIES AND AFFILIATES (WHO ARE NOT
    OFFICERS OR DIRECTORS))....................................       1
(4) MANAGERS, SUPERVISORS, ETC., WHO EARN
    $45,000 OR MORE (ANNUAL)...................................       2
(5) OTHER HIGHLY COMPENSATED INDIVIDUALS
    WHO EARN $45,000 OR MORE (ANNUAL)..........................       0

FIG. 3A
```

```
                                              PAGE NUMBER.:         2
                                              DATE PRINTED: 06/19/86
                                              TIME PRINTED: 12:49:05

INFORMATION FOR PROPOSAL

COMPANY NUMBER.....: 10-0000000
COMPANY NAME.......: RACHEL PERRY INCORPORATED

ANNUAL COST OF BENEFITS

NON-UNION          UNION
                                          EMPLOYEES        EMPLOYEES

MAJOR MEDICAL/HOSPITALIZATION:
(DENTAL/VISION CARE, IF APPLICABLE).......... $    60,000             0

GROUP TERM INSURANCE......................... $         0             0

LONG-TERM DISABILITY......................... $         0             0

VACATION PAY................................. $    35,000             0

HOLIDAY PAY.................................. $    28,000             0

SICK PAY..................................... $    28,000             0

SELF FUNDED MAJOR MEDICAL/HOSPITALIZATION ADMINISTRATION COSTS

ADMINISTRATIVE COST.......................... $     2,352

CLAIMS EXPENSES COST......................... $    20,621

PREMIUMS..................................... $    33,064
```

FIG. 3B

INFORMATION FOR PROPOSAL         INFORMATION FOR PROPOSAL

COMPANY NUMBER.....: 10-0000000
COMPANY NAME.......: RACHEL PERRY INCORPORATED

EMPLOYEE CENSUS DATA

| NUMBER | NAME | SEX | BIRTH-DATE | HIRE DATE | SALARY | KEYMAN | OWNER-SHIP 2 |
|---|---|---|---|---|---|---|---|
| 1-00-0000 | RACHEL PERRY | F | 06/28/38 | 12/19/77 | 120,000 | O-OWNER | 100.00 |
| 2-00-0000 | ROBAINAH SOLAT | F | 06/18/33 | 03/21/85 | 20,000 | 9-NON-KEY | 0.00 |
| 3-00-0000 | CAROL SAFFORD | F | 01/12/42 | 04/28/82 | 46,076 | 4-MANAGER | 0.00 |
| 4-00-0000 | MARTHA MARSHAL | F | 04/04/36 | 04/30/84 | 23,000 | 9-NON-KEY | 0.00 |
| 5-00-0000 | JEAN SPECHTENHAUSER | F | 09/17/38 | 09/30/81 | 18,429 | 9-NON-KEY | 0.00 |
| 6-00-0000 | ANGEL FRIAS | M | 07/10/52 | 01/14/84 | 19,760 | 9-NON-KEY | 0.00 |
| 8-00-0000 | JIM SNEED | M | 08/05/43 | 02/22/85 | 37,537 | 9-NON-KEY | 0.00 |
| 9-00-0000 | PAMELA SELLERS | F | 07/26/62 | 07/26/82 | 18,585 | 9-NON-KEY | 0.00 |

GROUP TERM
LEDGER ILLUSTRATION *

PREPARED FOR: FRESNO VALVES & CASTINGS

| (1) YEAR | (2) GROUP TERM ANNUAL PREMIUM | (3) ANNUAL CONVERSION CREDITS PURCHASED | (4) ACCUMULATIVE CONVERSION CREDITS PURCHASED |
|---|---|---|---|
| 1 | $300,000.00 | $483,300.00 | $483,300.00 |
| 2 | $300,000.00 | $439,200.00 | $922,500.00 |
| 3 | $300,000.00 | $399,300.00 | $1,321,800.00 |
| 4 | $300,000.00 | $363,000.00 | $1,684,800.00 |
| 5 | $300,000.00 | $330,000.00 | $2,014,800.00 |

$1,500,000.00 - TOTAL GROUP TERM ANNUAL PREMIUM
==============

ASSUMPTIONS:

1) -ADDITIONAL ANNUAL VEBA CONTRIBUTION: $300,000.00 AND, NO FURTHER CONTRIBUTIONS TO THE GROUP TERM AFTER CONTRACT YEAR NUMBER: 5

2) 35 : FUNDING AGE BEGINS          30 : ENTRY AGE
   40 : CONVERSION/RETIREMENT AGE

3) -INTEREST RATE : 10%

4) - $0.00         : CURRENT VEBA ASSETS.

THE ABOVE ILLUSTRATION DOES NOT RECOGNIZE THAT BECAUSE OF INTEREST, A DOLLAR IN THE FUTURE HAS LESS VALUE THAN TODAY.

CURRENT INTEREST RATE NOT GUARANTEED. THE CURRENT RATE CHANGES EACH POLICY YEAR.

* NOT VALID WITHOUT PAGE TWO.

CODE #:      300000 35 0            50%0.1
                                    FR4-5-86        PAGE -1-

FIG. 4A

CONVERSION
LEDGER ILLUSTRATION

PAGE -2-

| (1) YEAR | (2) ANNUAL PREMIUM | (3) ANNUAL DIVIDENDS | (4) ANNUAL GUARANTEED VALUE | (5) SURRENDER VALUE |
|---|---|---|---|---|
| 1 | $13,226.79 | $0.00 | $0.00 | $0.00 |
| 2 | $13,226.79 | $209,519.54 | $206,704.49 | $206,704.49 |
| 3 | $13,226.79 | $203,562.34 | $232,809.69 | $439,514.19 |
| 4 | $13,226.79 | $211,848.71 | $246,686.11 | $686,200.30 |
| 5 | $13,226.79 | $211,388.94 | $271,502.80 | $957,703.10 |
| 6 | $13,226.79 | $222,791.49 | $286,917.24 | $1,244,620.35 |
| 7 | $13,226.79 | $226,170.45 | $312,992.65 | $1,557,612.99 |
| 8 | $13,226.79 | $236,646.97 | $334,898.20 | $1,892,511.19 |
| 9 | $13,226.79 | $248,995.81 | $358,154.11 | $2,250,665.30 |
| 10 | $13,226.79 | $260,261.98 | $386,062.04 | $2,636,727.35 |
| 11 | $13,226.79 | $271,742.75 | $417,681.65 | $3,054,409.00 |
|  | $145,494.71 | $2,302,928.97 | $3,054,409.00 | $3,054,409.00 |

ASSUMPTIONS:

1) -FACE AMOUNT AT TIME OF CONVERSION:   4,029,600

2) CONVERSION POLICY IS A 'QUICK-PAY' CONTRACT SIMULTANEOUSLY QUALIFYING AS A LIFE INSURANCE CONTRACT UNDER THE DFRA-'84 REGULATIONS.

DIVIDENDS ILLUSTRATED AT CURRENT SCALE ASSUMING NO POLICY LOANS. DIVIDENDS ARE NOT GUARANTEED AND ARE BASED ON CURRENT MORTALITY, EXPENSES, AND INTEREST RATES SHOWN - NOT GUARANTEED. A TERMINAL DIVIDEND IS INCLUDED WHERE APPLICABLE AND IS NOT GUARANTEED.

CODE #:    300000 35 0         50%0.1
                               FR4-5-86

FIG. 4B

OPTIONAL LOAN                          PAGE -3-
LEDGER ILLUSTRATION

| (1) YEAR | (2) ANNUAL LOAN AMOUNT | (3) ACCUMULATIVE LOAN AMOUNT | (4) ANNUAL LOAN INTEREST | (5) ACCUMULATIVE LOAN INTEREST |
|---|---|---|---|---|
| 1 | $0.00 | $0.00 | $0.00 | $0.00 |
| 2 | $104,759.77 | $104,759.77 | $10,999.78 | $10,999.78 |
| 3 | $101,781.17 | $206,540.94 | $10,687.02 | $21,686.80 |
| 4 | $105,924.36 | $312,465.29 | $11,122.06 | $32,808.86 |
| 5 | $105,694.47 | $418,159.76 | $11,097.92 | $43,906.78 |
| 6 | $111,395.75 | $529,555.51 | $11,696.55 | $55,603.33 |
| 7 | $113,085.22 | $642,640.73 | $11,873.95 | $67,477.28 |
| 8 | $118,323.48 | $760,964.22 | $12,423.97 | $79,901.24 |
| 9 | $124,497.90 | $885,462.12 | $13,072.28 | $92,973.52 |
| 10 | $130,130.99 | $1,015,593.11 | $13,663.75 | $106,637.28 |

| YEAR | (6) AFTER TAX LOAN INTEREST | (7) AFTER TAX ACCUMULATIVE LOAN INTEREST |
|---|---|---|
| 1 | $0.00 | $0.00 |
| 2 | $5,499.09 | $5,499.89 |
| 3 | $5,343.51 | $10,843.40 |
| 4 | $5,561.03 | $16,404.43 |
| 5 | $5,548.96 | $21,953.39 |
| 6 | $5,848.28 | $27,801.66 |
| 7 | $5,936.97 | $33,738.64 |
| 8 | $6,211.98 | $39,950.62 |
| 9 | $6,536.14 | $46,486.76 |
| 10 | $6,831.88 | $53,318.64 |

\* ASSUMES A TAX BRACKET OF: 50%

CODE #:   300000 35 0        50%0.1
                             FR4-5-86

FIG. 4C

| ESC | EXIT TO PREVIOUS SCREEN (OR MENU) UNLESS YOU ARE PROCESSING MULTIPLE COMPANIES OR EMPLOYEES, IN WHICH CASE THE NEXT COMPANY/EMPLOYEE IS PROCESSED. |
|---|---|
| F1 | DISPLAY HELP SCREEN FOR CURRENT INPUT ITEM. PRESS ANY KEY TO RETURN TO DATA ENTRY MODE. |
| F10 | TEMPORARY EXIT TO OPERATING SYSTEM TO RUN DOS COMMANDS OR OTHER PROGRAMS. TYPE EXIT TO RETURN TO DATA ENTRY MODE. |
| ALT C | EMERGENCY EXIT FROM SYSTEM TO OPERATING SYSTEM. USE ONLY IF YOU ARE UNABLE TO EXIT USING THE 'ESC' KEY. SELECT 'Q' TO QUIT, 'I' TO IGNORE. |
| ENTER | ACCEPT CURRENT VALUE IN INPUT ITEM AND MOVE CURSOR TO THE NEXT INPUT ITEM. |
| HOME | PLACE CURSOR AT START OF CURRENT INPUT ITEM. |
| CTRL HOME | PLACE CURSOR AT VERY FIRST INPUT ITEM. |
| END | PLACE CURSOR AT END OF CURRENT INPUT ITEM. |
| CTRL END | PLACE CURSOR AT VERY LAST INPUT ITEM. |

FIG. 13

| | | |
|---|---|---|
| | UP | MOVE CURSOR TO PREVIOUS INPUT ITEM. |
| | DOWN | MOVE CURSOR TO NEXT INPUT ITEM. |
| | RIGHT | MOVE CURSOR 1 POSITION TO THE RIGHT IN CURRENT ITEM. |
| CTRL | RIGHT | MOVE CURSOR TO THE BEGINNING OF NEXT WORD. |
| | LEFT | MOVE CURSOR 1 POSITION TO LEFT IN CURRENT ITEM. |
| CTRL | LEFT | MOVE CURSOR TO THE BEGINNING OF THE CURRENT WORD. |
| CTRL | T | ERASE THE WORD TO THE RIGHT OF CURSOR. |
| CTRL | Y | ERASE THE INPUT ITEM TO THE RIGHT OF CURSOR. |
| | PGUP PGDN | USE PGUP AND PGDN TO TERMINATE DATA ENTRY PRIOR TO REACHING THE LAST INPUT ITEM. USEFUL WHEN SUBSEQUENT INPUT ITEMS ALREADY CONTAIN THE VALUES YOU WANT. |
| CTRL | U | 'UNDO' THE CURRENT INPUT ITEM TO ORIGINAL VALUE. |

FIG. 14

HIT "F1" KEY ANY TIME YOU NEED HELP.

```
┌─────────┬──────COMPANY  HEADER  SCREEN──────┬─────────┬──────────┐
│ COMPANY │                                    │ COMPANY │          │
│ NAME    │                                    │ NUMBER  │10-0000000│
├─────────┴────────────────────────────────────┴─────────┴──────────┤
│ OPTIONS:                                                           │
│                                                                    │
│   1... LEAVE ALL FIELDS BLANK AND PRESS` PGDN' KEY .  LIST OF     │
│        COMPANIES IS DISPLAYED IN ALPHABETICAL ORDER.              │
│                                                                    │
│   2... LEAVE  NAME BLANK AND ENTER  NUMBER ONLY.   COMPANY        │
│        WITH SPECIFIED NUMBER WILL BE RETRIEVED.                   │
│                                                                    │
│   3... LEAVE NUMBER BLANK AND ENTER NAME ONLY.  FIRST COMPANY     │
│        THAT MATCHES SPECIFIED  NAME WILL BE RETRIEVED.            │
│                                                                    │
│   4... PLACE A '$' SIGN IN FRONT OF NAME IN 3 ABOVE. LIST OF COMPANIES │
│        IS DISPLAYED STARTING WITH FIRST ONE THAT MATCHES SPECIFIED│
│        NAME.                                                       │
│                                                                    │
│   5... ENTER 'DELETE' IN NAME FIELD, AND ENTER COMPANY # FOR DELETE│
│        OPTIONS.                                                    │
│                                                                    │
│   6... PRESS 'ESC' KEY TO EXIT TO MENU.                           │
└────────────────────────────────────────────────────────────────────┘
```

FIG. 15

```
┌─┬──────────────COMPANY LIST SCREEN──────────────┬──────────┐
│▼│ COMPANY NAME                                  │  NUMBER  │
├─┼───────────────────────────────────────────────┼──────────┤
│0│   ACTUARIAL RESEARCH & DEVELOPMENT CORPORATION│10-0000000│
│0│   COMPANY NUMBER THREE                        │30-0000000│
│0│   MULTUM IN PARVUM SYSTEMS                    │20-0000000│
│ │                                               │          │
│ │                                               │          │
│ │                                               │          │
│ │                                               │          │
└─┴───────────────────────────────────────────────┴──────────┘

ENTER A '1' NEXT TO COMPANIES YOU WISH TO PROCESS.

PRESS 'PGDN' AFTER COMPLETION
       (UNLESS LAST COMPANY LISTED WAS SELECTED).
```

FIG. 16

```
┌─────────────────── COMPANY LIST SCREEN ──────────────────┬────────────┐
│ ▼   COMPANY NAME                                         │   NUMBER   │
├──────────────────────────────────────────────────────────┼────────────┤
│ 0    ACTUARIAL RESEARCH & DEVELOPMENT CORPORATION        │ 10-0000000 │
│ 0    COMPANY NUMBER THREE                                │ 30-0000000 │
│ 0    MULTUM IN PARVUM SYSTEMS                            │ 20-0000000 │
│                                                          │            │
│                                                          │            │
│                                              ┌───────────┴──────────┐ │
│                                              │ C..  CURRENT SCREEN  │ │
└──────────────────────────────────────────────┤                      │ │
    ENTER A '1' NEXT TO COMPANIES YOU WISH     │ D..  NEXT SCREEN     │ │
    PRESS 'PGDN' AFTER COMPLETION              │ P..  PREVIOUS SCREEN │ │
        (UNLESS LAST COMPANY LISTED WAS S      │ M..  RETURN TO MENU  │ │
                                               └──────────────────────┘
```

FIG. 17

HIT "F1" KEY ANY TIME YOU NEED HELP

```
─────────────── EMPLOYEE  HEADER  SCREEN ───────────────
| LAST  NAME |                    | FIRST |            | MIDDLE INIT. |
| SSN    -   -   0 | COMPANY NO. (IF APPLICABLE) |  -     0 |

1... LEAVE ALL FIELDS BLANK AND PRESS 'PGDN' KEY. A LIST OF
         INDIVIDUALS IS DISPLAYED IN LAST NAME ORDER.

2... LEAVE NAME BLANK AND ENTER SSN ONLY.  INDIVIDUAL WITH
         SPECIFIED SSN WILL BE RETRIEVED.

3... LEAVE SSN BLANK AND ENTER NAME ONLY.  FIRST INDIVIDUAL THAT
         MATCHES SPECIFIED NAME WILL BE RETRIEVED.

4... PLACE A '$' SIGN. IN FRONT OF LAST NAME ABOVE.  LIST OF
         INDIVIDUALS DISPLAYED STARTING WITH FIRST ONE THAT
         MATCHES SPECIFIED NAME.

5... ENTER COMPANY NUMBER ONLY.  A LIST OF THE INDIVIDUALS THAT
         HAVE THE SPECIFIED COMPANY NUMBER IS DISPLAYED IN LAST
         NAME ORDER.

6... ENTER 'DELETE' IN LAST NAME FIELD, ENTER SSN FOR DELETE
         OPTIONS

7... PRESS 'ESC' KEY TO RETURN TO MENU.
```

FIG. 18

| ↓ | LAST NAME | ─EMPLOYEE LIST SCREEN─<br>FIRST NAME | I | SSN | COMPANY ID |
|---|---|---|---|---|---|
| 0 | FRIAS | ANGEL | | 6-00-0000 | 10-0000000 |
| 0 | JOHNSTON | WILLIAM | | 111-11-1111 | 30-0000000 |
| 0 | JOHNSTON | WILLIAM | | 2-00-0000 | 10-0000000 |
| 0 | LIEBERMAN | JEFF | | 7-00-0000 | 30-0000000 |
| 0 | MARSHALL | MARTHA | | 4-00-0000 | 10-0000000 |
| 0 | PERRY | RACHEL | | 1-00-0000 | 10-0000000 |
| 0 | SAFFORD | CAROL | | 3-00-0000 | 10-0000000 |
| 0 | SELLERS | PAMELA | | 9-00-0000 | 10-0000000 |
| 0 | SNEED | JIM | | 8-00-0000 | 10-0000000 |

ENTER A '1' NEXT TO THE NAMES YOU WISH TO PROCESS.
PRESS 'PGDN' AFTER COMPLETION
(UNLESS LAST INDIVIDUAL LISTED WAS SELECTED).

FIG. 19

| ↓ | LAST NAME | EMPLOYEE LIST SCREEN FIRST NAME | I | SSN | COMPANY ID |
|---|---|---|---|---|---|
| 0 | FRIAS | ANGEL | | 6-00-0000 | 10-0000000 |
| 0 | JOHNSTON | WILLIAM | | 111-11-1111 | 30-0000000 |
| 0 | JOHNSTON | WILLIAM | | 2-00-0000 | 10-0000000 |
| 0 | LIEBERMAN | JEFF | | 7-00-0000 | 30-0000000 |
| 0 | MARSHALL | MARTHA | | 4-00-0000 | 10-0000000 |
| 0 | PERRY | RACHEL | | 1-00-0000 | 10-0000000 |
| 0 | SAFFORD | CAROL | | 3-00-0000 | 10-0000000 |
| 0 | SELLERS | PAMELA | | 9-00-0000 | 10-0000000 |
| 0 | SNEED | JIM | | | |

ENTER A '1' NEXT TO NAMES YOU WISH TO PROCE
PRESS 'PGDN' AFTER COMPLETION (UNLESS LAST

| C.. | CURRENT SCREEN |
|---|---|
| N.. | NEXT SCREEN |
| P.. | PREVIOUS SCREEN |
| M.. | RETURN TO MENU |

FIG. 20

HIT "F1" KEY IF YOU NEED HELP.

|  | DATABASE UTILITIES MENU | DATE: 07/10/86<br>DAY:  THURSDAY<br>TIME: 01:37:50 |
|---|---|---|

ENTER A '1' IN BOXES FOR OPERATIONS TO BE PERFORMED:

| DATABASE NAME | BACKUP | REINDEX | ZAP | PACK |
|---|---|---|---|---|
| 1 COMPANY | 1  0 | 1  0 | 1  0 | 1  0 |
| 2 EMPLOYEE | 2  0 | 2  0 | 2  0 | 2  0 |
| 3 TABLEA | 3  0 | 3  0 | 3  0 | 3  0 |
| 4 TABLEI | 4  0 | 4  0 | 4  0 | 4  0 |
| 5 BARRY1 | 5  0 | 5  0 | 5  0 | 5  0 |
| 6 DEFAULTS | 6  0 | 6  0 | 6  0 | 6  0 |
| 7 | 7 | 7 | 7 | 7 |
| 8 | 8 | 8 | 8 | 8 |

MESSAGES: HIT 'ESC' KEY TO EXIT

FIG. 21

| SYSTEM DEFAULTS |||
|---|---|---|
| CARRIER |||
| VEBA INTEREST RATE | GROUP TERM RATE | TAX BRACKET |
| POLICY FEE | DEDUCTION ||
| FOOTNOTES |||
|  |||

FIG. 23

| S CHG TABLE | |
|---|---|
| YEAR | |
| 1 | 0.00000% |
| 2 | 41.99512% |
| 3 | 48.11120% |
| 4 | 47.57750% |
| 5 | 45.00990% |
| 6 | 44.87540% |
| 7 | 43.00100% |
| 8 | 42.37840% |
| 9 | 41.91090% |
| 10 | 41.09160% |
| 11 | 40.16540% |
| 12 | 0.00000% |
| 13 | 0.00000% |
| 14 | 0.00000% |
| 15 | 0.00000% |

FIG. 24

| S CHG TABLE | |
|---|---|
| YEAR | |
| 1 | 0.00000% |
| 2 | 41.99512% |
| 3 | 48.11120% |
| 4 | 47.57750% |
| 5 | 45.00990% |
| 6 | 44.87540% |
| 7 | 43.00100% |
| 8 | 42.37840% |
| 9 | 41.91090% |
| 10 | 41.09160% |
| 11 | 40.16540% |
| 12 | 0.00000% |
| 13 | 0.00000% |
| 14 | 0.00000% |
| 15 | 0.00000% |

```
R.. RE-EDIT SCREEN
X.. EXIT THIS SCREEN
M.. RETURN TO MENU
```

FIG. 25

| TABLE 'A' - MALE ENTRY AGE RATES - SETBACK FOR FEMALES IS 6 YEARS ||||||||||||
|---|---|---|---|---|---|---|---|---|---|---|---|
| ENTRY AGE || COST PER 1000 | ENTRY AGE || COST PER 1000 | ENTRY AGE || COST PER 1000 | ENTRY AGE || COST PER 1000 |
| MALE | FEMALE | 1000 | MALE | FEMALE | 1000 | MALE | FEMALE | 1000 | MALE | FEMALE | 1000 |
| 15 | 21 | 0.53 | 29 | 35 | 0.57 | 43 | 49 | 0.89 | 57 | 63 | 2.33 |
| 16 | 22 | 0.53 | 30 | 36 | 0.57 | 44 | 50 | 0.94 | 58 | 64 | 2.60 |
| 17 | 23 | 0.53 | 31 | 37 | 0.58 | 45 | 51 | 0.99 | 59 | 65 | 2.91 |
| 18 | 24 | 0.53 | 32 | 38 | 0.58 | 46 | 52 | 1.04 | 60 | 66 | 3.25 |
| 19 | 25 | 0.53 | 33 | 39 | 0.58 | 47 | 53 | 1.09 | 61 | 67 | 3.63 |
| 20 | 26 | 0.54 | 34 | 40 | 0.59 | 48 | 54 | 1.14 | 62 | 68 | 4.05 |
| 21 | 27 | 0.54 | 35 | 41 | 0.59 | 49 | 55 | 1.19 | 63 | 69 | 4.52 |
| 22 | 28 | 0.00 | 36 | 42 | 0.61 | 50 | 56 | 1.26 | 64 | 70 | 5.04 |
| 23 | 29 | 0.54 | 37 | 43 | 0.64 | 51 | 57 | 1.34 | 65 | 71 | 5.61 |
| 24 | 30 | 0.54 | 38 | 44 | 0.68 | 52 | 58 | 1.44 | 66 | 72 | 0.00 |
| 25 | 31 | 0.55 | 39 | 45 | 0.72 | 53 | 59 | 1.57 | 67 | 73 | 0.00 |
| 26 | 32 | 0.55 | 40 | 46 | 0.76 | 54 | 60 | 1.71 | 68 | 74 | 0.00 |
| 27 | 33 | 0.56 | 41 | 47 | 0.80 | 55 | 61 | 1.89 | 69 | 75 | 0.00 |
| 28 | 34 | 0.56 | 42 | 48 | 0.85 | 56 | 62 | 2.09 | 70 | 76 | 0.00 |

FIG. 26

| TABLE 'A' - MALE ENTRY AGE RATES - SETBACK FOR FEMALES IS 6 YEARS ||||||||||||
| ENTRY AGE || COST PER 1000 | ENTRY AGE || COST PER 1000 | ENTRY AGE || COST PER 1000 | ENTRY AGE || COST PER 1000 |
| MALE | FEMALE | | MALE | FEMALE | | MALE | FEMALE | | MALE | FEMALE | |
| 15 | 21 | 0.53 | 29 | 35 | 0.57 | 43 | 49 | 0.89 | 57 | 63 | 2.33 |
| 16 | 22 | 0.53 | 30 | 36 | 0.57 | 44 | 50 | 0.94 | 58 | 64 | 2.60 |
| 17 | 23 | 0.53 | 31 | 37 | 0.58 | 45 | 51 | 0.99 | 59 | 65 | 2.91 |
| 18 | 24 | 0.53 | 32 | 38 | 0.58 | 46 | 52 | 1.04 | 60 | 66 | 3.25 |
| 19 | 25 | 0.53 | 33 | 39 | 0.58 | 47 | 53 | 1.09 | 61 | 67 | 3.63 |
| 20 | 26 | 0.54 | 34 | 40 | 0.59 | 48 | 54 | 1.14 | 62 | 68 | 4.05 |
| 21 | 27 | 0.54 | 35 | 41 | 0.59 | 49 | 55 | 1.19 | 63 | 69 | 4.52 |
| 22 | 28 | 0.00 | 36 | 42 | 0.61 | 50 | 56 | 1.26 | 64 | 70 | 5.04 |
| 23 | 29 | 0.54 | 37 | 43 | 0.64 | 51 | 57 | 1.34 | 65 | 71 | 5.61 |
| 24 | 30 | 0.54 | 38 | 44 | 0.68 | 52 | 58 | 1.44 | 66 | 72 | 0.00 |
| 25 | 31 | 0.55 | 39 | 45 | 0.72 | 53 | 59 | 1.57 | 67 | 73 | 0.00 |
| 26 | 32 | 0.55 | 40 | 46 | 0.76 | 54 | 60 | | | | |
| 27 | 33 | 0.56 | 41 | 47 | 0.80 | 55 | 61 | | | | |
| 28 | 34 | 0.56 | 42 | 48 | 0.85 | 56 | 62 | | | | |

R.. RE-EDIT SCREEN
X.. EXIT THIS SCREEN
M.. RETURNJ TO MENU

FIG. 27

| TABLE 'I' - RATES |||||||||
|---|---|---|---|---|---|---|---|
| AGE | COST PER 1000 | AGE | COST PER 1000 | AGE | COST PER 1000 | AGE | COST PER 1000 |
| 15 | 0.96 | 29 | 0.96 | 43 | 2.04 | 57 | 9.00 |
| 16 | 0.96 | 30 | 1.08 | 44 | 2.04 | 58 | 9.00 |
| 17 | 0.96 | 31 | 1.08 | 45 | 3.48 | 59 | 9.00 |
| 18 | 0.96 | 32 | 1.08 | 46 | 3.48 | 60 | 14.04 |
| 19 | 0.96 | 33 | 1.08 | 47 | 3.48 | 61 | 14.04 |
| 20 | 0.96 | 34 | 1.08 | 48 | 3.48 | 62 | 14.04 |
| 21 | 0.96 | 35 | 1.32 | 49 | 3.48 | 63 | 14.04 |
| 22 | 0.96 | 36 | 1.32 | 50 | 5.76 | 64 | 14.04 |
| 23 | 0.96 | 37 | 1.32 | 51 | 5.76 | 65 | 0.00 |
| 24 | 0.96 | 38 | 1.32 | 52 | 5.76 | 66 | 0.00 |
| 25 | 0.96 | 39 | 1.32 | 53 | 5.76 | 67 | 0.00 |
| 26 | 0.96 | 40 | 2.04 | 54 | 5.76 | 68 | 0.00 |
| 27 | 0.96 | 41 | 2.04 | 55 | 9.00 | 69 | 0.00 |
| 28 | 0.96 | 42 | 2.04 | 56 | 9.00 | 70 | 0.00 |

FIG. 28

| TABLE 'I' - RATES |||||||| 
|---|---|---|---|---|---|---|---|
| AGE | COST PER 1000 | AGE | COST PER 1000 | AGE | COST PER 1000 | AGE | COST PER 1000 |
| 15 | 0.96 | 29 | 0.96 | 43 | 2.04 | 57 | 9.00 |
| 16 | 0.96 | 30 | 1.08 | 44 | 2.04 | 58 | 9.00 |
| 17 | 0.96 | 31 | 1.08 | 45 | 3.48 | 59 | 9.00 |
| 18 | 0.96 | 32 | 1.08 | 46 | 3.48 | 60 | 14.04 |
| 19 | 0.96 | 33 | 1.08 | 47 | 3.48 | 61 | 14.04 |
| 20 | 0.96 | 34 | 1.08 | 48 | 3.48 | 62 | 14.04 |
| 21 | 0.96 | 35 | 1.32 | 49 | 3.48 | 63 | 14.04 |
| 22 | 0.96 | 36 | 1.32 | 50 | 5.76 | 64 | 14.04 |
| 23 | 0.96 | 37 | 1.32 | 51 | 5.76 | 65 | 0.00 |
| 24 | 0.96 | 38 | 1.32 | 52 | 5.76 | 66 | 0.00 |
| 25 | 0.96 | 39 | 1.32 | 53 | 5.76 | 67 | 0.00 |
| 26 | 0.96 | 40 | 2.04 | 54 | 5.76 | 68 | 0.00 |
| 27 | 0.96 | 41 | 2.04 | 55 | 9.00 | 69 | 0.00 |
| 28 | 0.96 | 42 | 2.04 | 56 | 9.00 | 70 | 0.00 |

```
R.. RE-EDIT SCREEN
X.. EXIT THIS SCREEN
M.. RETURN TO MENU
```

FIG. 29

HIT "F1" KEY ANY TIME YOU NEED HELP.

```
┌─────────┬──── COMPANY HEADER SCREEN ────┬─────────┬──────────┐
│ COMPANY │                               │ COMPANY │          │
│ NAME    │                               │ NUMBER  │10-0000000│
├─────────┴───────────────────────────────┴─────────┴──────────┤
│ OPTIONS:                                                      │
│                                                               │
│   1... LEAVE ALL FIELDS BLANK AND PRESS ` PGDN' KEY . LIST OF│
│        COMPANIES IS DISPLAYED IN ALPHABETICAL ORDER.          │
│                                                               │
│   2... LEAVE  NAME BLANK AND ENTER  NUMBER ONLY.   COMPANY   │
│        WITH SPECIFIED NUMBER WILL BE RETRIEVED.               │
│                                                               │
│   3... LEAVE NUMBER BLANK AND ENTER NAME ONLY.  FIRST COMPANY│
│        THAT MATCHES SPECIFIED  NAME WILL BE RETRIEVED.        │
│                                                               │
│   4... PLACE A '$' SIGN IN FRONT OF NAME IN 3 ABOVE. LIST OF COMPANIES│
│        IS DISPLAYED STARTING WITH FIRST ONE THAT MATCHES SPECIFIED│
│        NAME.                                                  │
│                                                               │
│   5... ENTER 'DELETE' IN NAME FIELD, AND ENTER COMPANY # FOR DELETE│
│        OPTIONS.                                               │
│   6... PRESS 'ESC' KEY TO EXIT TO MENU.                       │
└───────────────────────────────────────────────────────────────┘
```

FIG. 31

| ↓ | COMPANY LIST SCREEN COMPANY NAME | NUMBER |
|---|---|---|
| 0 | ACTUARIAL RESEARCH & DEVELOPMENT CORPORATION | 10-0000000 |
| 0 | COMPANY NUMBER THREE | 30-0000000 |
| 0 | MULTUM IN PARVUM SYSTEMS | 20-0000000 |

ENTER A '1' NEXT TO COMPANIES YOU WISH TO PROCESS.

PRESS 'PGDN' AFTER COMPLETION
   (UNLESS LAST COMPANY LISTED WAS SELECTED).

FIG. 32

```
         ┌─────────────COMPANY LIST SCREEN ─────────────────┬──────────┐
  ↓      │ COMPANY NAME                                     │ NUMBER   │
         │                                                  │          │
  0      │    ACTUARIAL RESEARCH & DEVELOPMENT CORPORATION  │ 10-0000000│
  0      │    COMPANY NUMBER THREE                          │ 30-0000000│
  0      │    MULTUM IN PARVUM SYSTEMS                      │ 20-0000000│
         │                                                  │          │
         │                                       ┌──────────────────────┐
         │                                       │  C..  CURRENT SCREEN │
         └───────────────────────────────────────┤  D..  NEXT SCREEN    │
           ENTER A '1' NEXT TO COMPANIES YOU WISH│  P..  PREVIOUS SCREEN│
             PRESS 'PGDN' AFTER COMPLETION       │  M..  RETURN TO MENU │
                (UNLESS LAST COMPANY LISTED WAS S└──────────────────────┘
```

FIG. 33

HIT "F1" KEY ANY TIME YOU NEED HELP

| COMPANY: ACTUARIAL RESEARCH & DEVELOPMENT CORP. | | NUMBER 10-0000000 | |
|---|---|---|---|
| ADDRESS: 12736 GLYNN AVENUE | CITY: DOWNEY | | STATE: CA |
| ZIP: 90242-0000 | PHONE: (213) 862-4376 | FISCAL YEAR END: 12/31/86 | |
| TAXPAYER BASIS: A | TYPE OF CORP: C | TARGET CONTRIBUTION: $250,000 | |
| PRIMARY CONTACT: MICHAEL F. DAVLIN | | | |
| SECONDARY CONTACT: WILLIAM JOHNSTON | | | |

| SUBSIDIARY OR AFFILIATE NAME(S) - IF ANY | COVERED BY VEBA | % OF STOCK OWNED |
|---|---|---|
| 1. A.R.C.S.<br>2<br>3<br>4<br>5 | | |

FIG. 34

HIT "F1" KEY ANY TIME YOU NEED HELP

| COMPANY: ACTUARIAL RESEARCH & DEVELOPMENT CORP. | NUMBER 10-0000000 |||
|---|---|---|---|
| ADDRESS: 12736 GLYNN AVENUE | CITY: DOWNEY || STATE: CA |
| ZIP: 90242-0000 | PHONE: (213) 862-4376 | FISCAL YEAR END: 12/31/86 ||
| TAXPAYER BASIS: A | TYPE OF CORP: C | TARGET CONTRIBUTION: $250,000 ||
| PRIMARY CONTACT: MICHAEL F. DAVLIN ||||
| SECONDARY CONTACT: WILLIAM JOHNSTON | R.. RE-EDIT THIS SCREEN |||
| | C.. IFP EMPLOYEE COUNTS |||
| SUBSIDIARY OR AFFILIATE NAME(S) - IF ANY | A.. IFP ANNUAL COSTS |||
| | X.. EXIT THIS SCREEN |||
| 1. A.R.C.S. | M.. RETURN TO MENU |||
| 2. ||||
| 3. ||||
| 4. ||||
| 5. ||||

Fig. 35

HIT "F1" KEY ANY TIME YOU NEED HELP

| COMPANY: ACTUARIAL RESEARCH & DEVELOPMENT CORP. | | NUMBER 10-0000000 | |
|---|---|---|---|
| 1. TOTAL PERSONS EMPLOYED  5 | | UNION  0 | NON-UNION  5 |
| 2. TOTAL ELIGIBLE  3 | | 3. TOTAL PARTICIPATING | 2 |
| 4. PART-TIMERS INELIGIBLE  0 | | 5. # < HALF-TIME INELIGIBLE | 0 |
| 6. SEASONAL INELIGIBLE  0 | | 7. #NON-RESIDENT ALIENS | 1 |
| INDICATE HOW MANY EMPLOYEES OF THE COMPANY AND ITS SUBSIDIARIES AND AFFILIATES, IF ANY, FALL INTO THE FOLLOWING CATEGORIES: | | | |
| 1. OFFICERS | 1 | 4. MANAGERS, SUPERVISORS, ETC. ETC. WHO EARN $45,000 AND ABOVE | |
| 2. DIRECTORS | 0 | | 2 |
| 3. SHAREHOLDERS | 3 | 5. OTHERS EARNING $45,000 OR MORE | 1 |

FIG. 36

HIT "F1" KEY ANY TIME YOU NEED HELP

| COMPANY: ACTUARIAL RESEARCH & DEVELOPMENT CORP. | | | NUMBER 10-0000000 | |
|---|---|---|---|---|
| 1. TOTAL PERSONS EMPLOYED | 5 | UNION   0 | NON-UNION | 5 |
| 2. TOTAL ELIGIBLE | 3 | 3. TOTAL PARTICIPATING | | 2 |
| 4. PART-TIMERS INELIGIBLE | 0 | 5. # < HALF-TIME INELIGIBLE | | 0 |
| 6. SEASONAL INELIGIBLE | 0 | 7. NON | | |

INDICATE HOW MANY EMPLOYEES OF THE COMP
AND AFFILIATES, IF ANY, FALL INTO THE FOLLOW

| 1. OFFICERS | 1 | 4. MAN. ETC. |
|---|---|---|
| 2. DIRECTORS | 0 | ABO |
| 3. SHAREHOLDERS | 3 | 5. OTH OR |

```
R.. RE-EDIT THIS SCREEN
N.. IFP NAME AND ADDRESS
A.. IFP ANNUAL COSTS
E.. UPDATE EMPLOYEES
X.. EXIT THIS SCREEN
M.. RETURN TO MENU
```

FIG. 37

HIT "F1" KEY ANY TIME YOU NEED HELP

| COMPANY: ACTUARIAL RESEARCH & DEVELOPMENT CORP | | NUMBER 10-0000000 | |
|---|---|---|---|
| DESCRIPTION OF BENEFIT | COST NON-UNION | COST | UNION |
| MAJOR MEDICAL/HOSPITALIZATION | $ 60,000 | $ | 0 |
| GROUP TERM INSURANCE | $ 2,500 | $ | 0 |
| INDIVIDUAL CONTRACTS: | | | |
| 1. | $ 0 | $ | 0 |
| 2. | $ 0 | $ | 0 |
| 3. | $ 0 | $ | 0 |
| 4. | $ 0 | $ | 0 |
| 5. | $ 0 | $ | 0 |
| LONG TERM DISABILITY | $ 0 | $ | 0 |
| VACATION PAY | $ 35,000 | $ | 0 |
| HOLIDAY PAY | $ 28,000 | $ | 0 |
| SICK PAY | $ 28,000 | $ | 0 |
| IF MAJOR MEDICAL/HOSPITALIZATION IS SELF-FUNDED: | | | |
| ADMINSTRATIVE COSTS | $ 2,352 | | |
| CLAIM EXPENSE COSTS | $ 20,621 | | |
| PREMIUMS | $ 33,064 | | |

FIG. 38

```
HIT "F1" KEY ANY TIME YOU NEED HELP
```

| COMPANY: ACTUARIAL RESEARCH & DEVELOPMENT CORP | | NUMBER 10-0000000 | |
|---|---|---|---|
| DESCRIPTION OF BENEFIT | COST NON-UNION | COST | UNION |
| MAJOR MEDICAL/HOSPITALIZATION | $ 60,000 | $ | 0 |
| GROUP TERM INSURANCE | $ 2,500 | $ | 0 |
| INDIVIDUAL CONTRACTS: | | | |
| 1. | $ 0 | $ | 0 |
| 2. | $ 0 | $ | 0 |
| 3. | $ 0 | $ | 0 |
| 4. | $ 0 | $ | 0 |
| 5. | $ | | |
| LONG TERM DISABILITY | $ | R.. RE-EDIT THIS SCREEN | |
| VACATION PAY | $ | N.. IFP NAME & ADDRESS | |
| HOLIDAY PAY | $ | C.. IFP EMPLOYEE COUNTS | |
| SICK PAY | $ | E.. UPDATE EMPLOYEES | |
| IF MAJOR MEDICAL/HOSPITALIZATION IS SE | | X .. EXIT THIS SCREEN | |
| ADMINSTRATIVE COSTS | | M.. RETURN TO MENU | |
| CLAIM EXPENSE COSTS | | | |
| PREMIUMS | | | |

FIG. 39

| ↓ | LAST NAME | FIRST NAME | I | SSN | COMPANY ID |
|---|---|---|---|---|---|
| | | EMPLOYEE LIST SCREEN | | | |
| 0 | FRIAS | ANGEL | | 6-00-0000 | 10-0000000 |
| 0 | JOHNSTON | WILLIAM | | 111-11-1111 | 30-0000000 |
| 0 | JOHNSTON | WILLIAM | | 2-00-0000 | 10-0000000 |
| 0 | LIEBERMAN | JEFF | | 7-00-0000 | 30-0000000 |
| 0 | MARSHALL | MARTHA | | 4-00-0000 | 10-0000000 |
| 0 | PERRY | RACHEL | | 1-00-0000 | 10-0000000 |
| 0 | SAFFORD | CAROL | | 3-00-0000 | 10-0000000 |
| 0 | SELLERS | PAMELA | | 9-00-0000 | 10-0000000 |
| 0 | SNEED | JIM | | 8-00-0000 | 10-0000000 |

ENTER A '1' NEXT TO THE NAMES YOU WISH TO PROCESS..
PRESS 'PGDN' ON COMPLETION (UNLESS LAST INDIV. LISTED WAS SELECTED).

FIG. 40

HIT "F1" KEY ANY TIME YOU NEED HELP

```
──────────── EMPLOYEE HEADER SCREEN ────────────
| LAST NAME |           | FIRST |          | MIDDLE INIT. |
| SSN       | - - 0 | COMPANY NO. (IF APPLICABLE) | - 0 |
```

1... LEAVE ALL FIELDS BLANK AND PRESS 'PGDN' KEY. A LIST OF
    INDIVIDUALS IS DISPLAYED IN LAST NAME ORDER.

2... LEAVE NAME BLANK AND ENTER SSN ONLY. INDIVIDUAL WITH
    SPECIFIED SSN WILL BE RETRIEVED.

3... LEAVE SSN BLANK AND ENTER NAME ONLY. FIRST INDIVIDUAL THAT
    MATCHES SPECIFIED NAME WILL BE RETRIEVED.

4... PLACE A '$' SIGN IN FRONT OF LAST NAME ABOVE. LIST OF
    INDIVIDUALS DISPLAYED STARTING WITH FIRST ONE THAT
    MATCHES SPECIFIED NAME.

5... ENTER COMPANY NUMBER ONLY. A LIST OF THE INDIVIDUALS THAT
    HAVE THE SPECIFIED COMPANY NUMBER IS DISPLAYED IN LAST
    NAME ORDER.

6... ENTER 'DELETE' IN LAST NAME FIELD, ENTER SSN FOR DELETE
    OPTIONS

7... PRESS 'ESC' KEY TO RETURN TO MENU.

FIG. 41

HIT "F1" KEY ANY TIME YOU NEED HELP

| LAST NAME | JOHNSTON | FIRST WILLIAM | MIDDLE INITIAL | |
|---|---|---|---|---|
| SSN | 2-00-0000 | COMPANY # 10-0000000 | | |
| SEX M/F M | BIRTH DATE 01/08/49 | AGE 37 | HIRE DATE 03/21/86 | |
| SALARY $ 50,0000 | SALARY MODE A | KEYMAN 1 | KEYMAN PERCENT 20.00% | |

FIG. 42

HIT "F1" KEY ANY TIME YOU NEED HELP

| LAST NAME | JOHNSTON | FIRST | WILLIAM | MIDDLE INITIAL | |
|---|---|---|---|---|---|
| SSN | 2-00-0000 | COMPANY # | 10-0000000 | | |
| SEX M/F | M | BIRTH DATE 01/08/49 | AGE 37 | HIRE DATE 03/21/86 | |
| SALARY $ 50,0000 | SALARY MODE A | KEYMAN 1 | KEYMAN PERCENT 20.00% | | |

```
R.. RE-EDIT SCREEN
X.. EXIT THIS SCREEN
M.. RETURN TO MENU
```

FIG. 43

```
                                              PAGE NUMBER.:           1
                                              DATE PRINTED: 06/19/86
                                              TIME PRINTED: 12:39:12

INFORMATION FOR PROPOSAL
COMPANY NUMBER.....: 10-0000000
COMPANY NAME.......: RACHEL PERRY INCORPORATED
ADDRESS............: 911 MASON AVENUE, CHATSWORTH, CA  91311-0000

TELEPHONE: (818)-888-5881

PRIMARY CONTACT....: CAROL E. SARRORD - CONTROLLER
SECONDARY CONTACT..:

FISCAL YEAR END....: 12/31/86              TAXPAYER BASIS: ACCRUAL
TYPE OF CORPORATION: CLOSELY HELD

TARGET 1ST YEAR CONTRIBUTION: $      250,000

EMPLOYEE BREAKDOWN (1) TOTAL NUMBER OF PERSONS EMPLOYED........................          32
    UNION....       0
    NON-UNION      32
(2) TOTAL ELIGIBLE TO PARTICIPATE............................         32
(3) TOTAL PARTICIPATING......................................          0
(4) PART-TIME EMPLOYEES NOT ELIGIBLE.........................          0
(5) NUMBER OF LESS THAN HALFTIME EMPLOYEES
    NOT ELIGIBLE TO PARTICIPATE (LESS THAN
    1/2 OF THE WORKWEEK HOURS)...............................          0
(6) SEASONAL EMPLOYEES NOT ELIGIBLE..........................          0
(7) NUMBER OF NON-RESIDENT ALIENS............................          0

EXCLUDING  THE HALF-TIME, PART-TIME AND SEASONAL EMPLOYEES (WHO ARE  NOT
ELIGIBLE TO PARTICIPATE), UNION MEMBERS AND NONRESIDENT ALIENS, INDICATE
HOW  MANY EMPLOYEES OF THE COMPANY AND ITS SUBSIDIARIES AND  AFFILIATES,
IF ANY, FALL INTO THE FOLLOWING CATEGORIES:

(1) OFFICERS.................................................          1
(2) DIRECTORS (WHO ARE NOT OFFICERS).........................          0
(3) SHAREHOLDERS (WHO OWN MORE THAN 10 % OF
    THE STOCK OF THE COMPANY AND ITS
    SUBSIDIARIES AND AFFILIATES (WHO ARE NOT
    OFFICERS OR DIRECTORS))..................................          1
(4) MANAGERS, SUPERVISORS, ETC., WHO EARN
    $45,000 OR MORE (ANNUAL).................................          2
(5) OTHER HIGHLY COMPENSATED INDIVIDUALS
    WHO EARN $45,000 OR MORE (ANNUAL)........................          0
```

FIG. 44

```
                                        PAGE NUMBER.:         2
                                        DATE PRINTED: 06/19/86
                                        TIME PRINTED: 12:49:05
```

```
                    INFORMATION FOR PROPOSAL

COMPANY NUMBER.....: 10-0000000
COMPANY NAME.......: RACHEL PERRY INCORPORATED

ANNUAL COST OF BENEFITS

NON-UNION        UNION
                                          EMPLOYEES      EMPLOYEES
                                          ─────────      ─────────
MAJOR MEDICAL/HOSPITALIZATION:

(DENTAL/VISION CARE, IF APPLICABLE).......... $   60,000           0

GROUP TERM INSURANCE......................... $        0           0

LONG-TERM DISABILITY......................... $        0           0

VACATION PAY................................. $   35,000           0

HOLIDAY PAY.................................. $   28,000           0

SICK PAY..................................... $   28,000           0

SELF FUNDED MAJOR MEDICAL/HOSPITALIZATION ADMINISTRATION COSTS

ADMINISTRATIVE COST.......................... $    2,352

CLAIMS EXPENSES COST......................... $   20,621

PREMIUMS..................................... $   33,064
```

FIG. 45

INFORMATION FOR PROPOSAL          INFORMATION FOR PROPOSAL

COMPANY NUMBER.....: 10-0000000
COMPANY NAME.......: RACHEL PERRY INCORPORATED

EMPLOYEE CENSUS DATA

| NUMBER | NAME | SEX | BIRTH-DATE | HIRE DATE | SALARY | KEYMAN | OWNER-SHIP 2 |
|---|---|---|---|---|---|---|---|
| 1-00-0000 | RACHEL PERRY | F | 06/28/38 | 12/19/77 | 120,000 | 0-OWNER | 100.00 |
| 2-00-0000 | ROBAINAH SOLAT | F | 06/18/33 | 03/21/85 | 20,000 | 9-NON-KEY | 0.00 |
| 3-00-0000 | CAROL SAFFORD | F | 01/12/42 | 04/28/82 | 46,076 | 4-MANAGER | 0.00 |
| 4-00-0000 | MARTHA MARSHAL | F | 04/04/36 | 04/30/84 | 23,000 | 9-NON-KEY | 0.00 |
| 5-00-0000 | JEAN SPECHTENHAUSER | F | 09/17/38 | 09/30/81 | 18,429 | 9-NON-KEY | 0.00 |
| 6-00-0000 | ANGEL FRIAS | M | 07/10/52 | 01/14/84 | 19,760 | 9-NON-KEY | 0.00 |
| 8-00-0000 | JIM SNEED | M | 08/05/43 | 02/22/85 | 37,537 | 9-NON-KEY | 0.00 |
| 9-00-0000 | PAMELA SELLERS | F | 07/26/62 | 07/26/82 | 18,585 | 9-NON-KEY | 0.00 |

TERM TO TERM CONVERSION ILLUSTRATION

COMPANY #/NAME  10-0000000  ACTUARIAL RESEARCH & DEVEL. CORP.

| CURRENT AGE 52 YEARS | | TERM AGE 30 YEARS | EXISTING ASSETS $ 0 | |
|---|---|---|---|---|
| YEAR | ANNUAL CONTRIBUTION | ASSETS INTEREST | GROUP TERM INTEREST | TOP TAX BRACKET |
| 1 | $ 250,000 | 10.00% | 10.00% | 50.00% |
| 2 | $ 250,000 | 10.00% | 10.00% | 50.00% |
| 3 | $ 250,000 | 10.00% | 10.00% | 50.00% |
| 4 | $ 250,000 | 10.00% | 10.00% | 50.00% |
| 5 | $ 250,000 | 10.00% | 10.00% | 50.00% |

CARRIER NAME  CREATIVE COMPENSATION INCORPORATED

FIG. 47

TERM TO TERM CONVERSION ILLUSTRATION

COMPANY #/NAME  10-0000000   ACTUARIAL RESEARCH & DEVEL. CORP.

| CURRENT AGE 52 YEARS | | TERM AGE 30 YEARS | EXISTING ASSETS $  0 | |
|---|---|---|---|---|
| YEAR | ANNUAL CONTRIBUTION | ASSETS INTEREST | GROUP TERM INTEREST | TOP TAX BRACKET |
| 1 | $ 250,000 | 10.00% | 10.00% | 50.00% |
| 2 | $ 250,000 | 10.00% | 10.00% | 50.00% |
| 3 | $ 250,000 | 10.00% | 10.00% | 50.00% |
| 4 | $ 250,000 | 10.00% | 10.00% | 50.00% |
| 5 | $ 250,000 | 10.00% | 10.00% | 50.00% |

ENSURE PRINTER IS ON AND PAPER ALIGNED

P.. PRINT
M.. RETURN TO MENU

CARRIER NAME    CREATIVE COMPENSATION INCORPORATED

FIG. 48

GROUP TERM
LEDGER ILLUSTRATION *

PREPARED FOR: FRESNO VALVES & CASTINGS

| (1) YEAR | (2) GROUP TERM ANNUAL PREMIUM | (3) ANNUAL CONVERSION CREDITS PURCHASED | (4) ACCUMULATIVE CONVERSION CREDITS PURCHASED |
|---|---|---|---|
| 1 | $300,000.00 | $483,300.00 | $483,300.00 |
| 2 | $300,000.00 | $439,200.00 | $922,500.00 |
| 3 | $300,000.00 | $399,300.00 | $1,321,800.00 |
| 4 | $300,000.00 | $363,000.00 | $1,684,800.00 |
| 5 | $300,000.00 | $330,000.00 | $2,014,800.00 |

$1,500,000.00 - TOTAL GROUP TERM ANNUAL PREMIUM

ASSUMPTIONS:

1) -ADDITIONAL ANNUAL VEBA CONTRIBUTION: $300,000.00 AND, NO FURTHER CONTRIBUTIONS TO THE GROUP TERM AFTER CONTRACT YEAR NUMBER: 5

2) 35 : FUNDING AGE BEGINS    30 : ENTRY AGE
   40 : CONVERSION/RETIREMENT AGE

3) -INTEREST RATE : 10%

4) - $0.00        : CURRENT VEBA ASSETS.

THE ABOVE ILLUSTRATION DOES NOT RECOGNIZE THAT BECAUSE OF INTEREST, A DOLLAR IN THE FUTURE HAS LESS VALUE THAN TODAY.

CURRENT INTEREST RATE NOT GUARANTEED. THE CURRENT RATE CHANGES EACH POLICY YEAR.

* NOT VALID WITHOUT PAGE TWO.

CODE #:        300000 35 0           50%0.1
                                      FR4-5-86           PAGE -1-

FIG. 49

CONVERSION LEDGER ILLUSTRATION

PAGE -2-

| (1) YEAR | (2) ANNUAL PREMIUM | (3) ANNUAL DIVIDENDS | (4) ANNUAL GUARANTEED VALUE | (5) SURRENDER VALUE |
|---|---|---|---|---|
| 1 | $13,226.79 | $0.00 | $0.00 | $0.00 |
| 2 | $13,226.79 | $209,519.54 | $206,704.49 | $206,704.49 |
| 3 | $13,226.79 | $203,562.34 | $232,809.69 | $439,514.19 |
| 4 | $13,226.79 | $211,848.71 | $246,686.11 | $686,200.30 |
| 5 | $13,226.79 | $211,388.94 | $271,502.80 | $957,703.10 |
| 6 | $13,226.79 | $222,791.49 | $286,917.24 | $1,244,620.35 |
| 7 | $13,226.79 | $226,170.45 | $312.992.65 | $1,557,612.99 |
| 8 | $13,226.79 | $236,646.97 | $334,898.20 | $1,892,511.19 |
| 9 | $13,226.79 | $248,995.81 | $358,154.11 | $2,250,665.30 |
| 10 | $13,226.79 | $260,261.98 | $386,062.04 | $2,636,727.35 |
| 11 | $13,226.79 | $271,742.75 | $417,681.65 | $3,054,409.00 |
|  | $145,494.71 | $2,302,928.97 | $3,054,409.00 | $3,054,409.00 |

ASSUMPTIONS:

1) -FACE AMOUNT AT TIME OF CONVERSION:    4,029,600

2) CONVERSION POLICY IS A 'QUICK-PAY' CONTRACT SIMULTANEOUSLY QUALIFYING AS A LIFE INSURANCE CONTRACT UNDER THE DFRA-'84 REGULATIONS.

DIVIDENDS ILLUSTRATED AT CURRENT SCALE ASSUMING NO POLICY LOANS. DIVIDENDS ARE NOT GUARANTEED AND ARE BASED ON CURRENT MORTALITY, EXPENSES, AND INTEREST RATES SHOWN - NOT GUARANTEED. A TERMINAL DIVIDEND IS INCLUDED WHERE APPLICABLE AND IS NOT GUARANTEED.

CODE #:    300000 35 0        50%0.1
                              FR4-5-86

FIG. 50

OPTIONAL LOAN
LEDGER ILLUSTRATION

PAGE -3-

| (1) YEAR | (2) ANNUAL LOAN AMOUNT | (3) ACCUMULATIVE LOAN AMOUNT | (4) ANNUAL LOAN INTEREST | (5) ACCUMULATIVE LOAN INTEREST |
|---|---|---|---|---|
| 1 | $0.00 | $0.00 | $0.00 | $0.00 |
| 2 | $104,759.77 | $104,759.77 | $10,999.78 | $10,999.78 |
| 3 | $101,781.17 | $206,540.94 | $10,687.02 | $21,686.80 |
| 4 | $105,924.36 | $312,465.29 | $11,122.06 | $32,808.86 |
| 5 | $105,694.47 | $418,159.76 | $11,097.92 | $43,906.78 |
| 6 | $111,395.75 | $529,555.51 | $11,696.55 | $55,603.33 |
| 7 | $113,085.22 | $642,640.73 | $11,873.95 | $67,477.28 |
| 8 | $118,323.48 | $760,964.22 | $12,423.97 | $79,901.24 |
| 9 | $124,497.90 | $885,462.12 | $13,072.28 | $92,973.52 |
| 10 | $130,130.99 | $1,015,593.11 | $13,663.75 | $106,637.28 |

| YEAR | (6) AFTER TAX LOAN INTEREST | (7) AFTER TAX ACCUMULATIVE LOAN INTEREST |
|---|---|---|
| 1 | $0.00 | $0.00 |
| 2 | $5,499.09 | $5,499.89 |
| 3 | $5,343.51 | $10,843.40 |
| 4 | $5,561.03 | $16,404.43 |
| 5 | $5,548.96 | $21,953.39 |
| 6 | $5,848.28 | $27,801.66 |
| 7 | $5,936.97 | $33,738.64 |
| 8 | $6,211.98 | $39,950.62 |
| 9 | $6,536.14 | $46,486.76 |
| 10 | $6,831.88 | $53,318.64 |

\* ASSUMES A TAX BRACKET OF: 50%

CODE #: 300000 35 0      50%0.1
                         FR4-5-86

FIG. 51

| ESC | EXIT TO PREVIOUS SCREEN (OR MENU) UNLESS YOU ARE PROCESSING MULTIPLE COMPANIES OR EMPLOYEES, IN WHICH CASE THE NEXT COMPANY/EMPLOYEE IS PROCESSED. |

| F1 | DISPLAY HELP SCREEN FOR CURRENT INPUT ITEM. PRESS ANY KEY TO RETURN TO DATA ENTRY MODE. |

| F10 | TEMPORARY EXIT TO OPERATING SYSTEM TO RUN DOS COMMANDS OR OTHER PROGRAMS. TYPE EXIT TO RETURN TO DATA ENTRY MODE. |

| ALT | C | EMERGENCY EXIT FROM SYSTEM TO OPERATING SYSTEM. USE ONLY IF YOU ARE UNABLE TO EXIT USING THE 'ESC' KEY. SELECT 'Q' TO QUIT, 'I' TO IGNORE. |

| ENTER | ACCEPT CURRENT VALUE IN INPUT ITEM AND MOVE CURSOR TO THE NEXT INPUT ITEM. |

| HOME | PLACE CURSOR AT START OF CURRENT INPUT ITEM. |

| CTRL | HOME | PLACE CURSOR AT VERY FIRST INPUT ITEM. |

| END | PLACE CURSOR AT END OF CURRENT INPUT ITEM. |

| CTRL | END | PLACE CURSOR AT VERY LAST INPUT ITEM. |

FIG. 52

| | UP | MOVE CURSOR TO PREVIOUS INPUT ITEM. |
|---|---|---|
| | DOWN | MOVE CURSOR TO NEXT INPUT ITEM. |
| | RIGHT | MOVE CURSOR 1 POSITION TO THE RIGHT IN CURRENT ITEM. |
| CTRL | RIGHT | MOVE CURSOR TO THE BEGINNING OF NEXT WORD. |
| | LEFT | MOVE CURSOR 1 POSITION TO LEFT IN CURRENT ITEM. |
| CTRL | LEFT | MOVE CURSOR TO THE BEGINNING OF THE CURRENT WORD. |
| CTRL | T | ERASE THE WORD TO THE RIGHT OF CURSOR. |
| CTRL | Y | ERASE THE INPUT ITEM TO THE RIGHT OF CURSOR. |
| | PGUP | USE PGUP AND PGDN TO TERMINATE DATA ENTRY PRIOR TO REACHING THE LAST INPUT ITEM. USEFUL WHEN SUBSEQUENT INPUT ITEMS ALREADY CONTAIN THE VALUES YOU WANT. |
| | PGDN | |
| CTRL | U | 'UNDO' THE CURRENT INPUT ITEM TO ORIGINAL VALUE. |

FIG. 53

```
                    M A R K E T I N G   T R A C K I N G                              PAGE 1
                    =========================================

TO DATA    RECEIVE   RECEIVE     RECEIVE    RECEIVE      TO
WE    21 1987  08:47:15    NUMBER    CONTROL    PROOF     PARTCPT     FORMULA    ILLUST     CASE
                                                          REPORT      COMPARE    ETC.       ADMINIS.
COMPANY NAME               ------    -------    -------   -------     -------    -------    --------
------------               
CCI                        10503
>>>

TOTAL IN MARKETING PHASE:  1
------------------------   -----
```

FIG. 57

TTC CENSUS DATA CONTROL FORM

FIG. 58

MARKETING TRACKING

CLIENT NAME: _____

| CENSUS DATA |
| --- |

RECEIVE FROM CLIENT: _____

FORWARD TO MIS: _____

| PROOF LIST |
| --- |

RECEIVE FROM MIS: _____

FORWARD TO MIS: _____

| PARTICIPANT LIST |
| --- |

RECEIVE FROM MIS: _____

FORWARD TO MIS (CHANGES): _____

FORMULA COMPARISON RUN NOTIFICATION: _____

| FORMULA COMPARISON REPORT |
| --- |

RECEIVE FROM MIS: _____

FORWARD TO MIS: _____

| PRODUCTION REPORTS |
| --- |

RECEIVE FROM MIS: _____

FORWARD TO MIS (CHANGES): _____

FORWARD TO CASE ADMINISTRATION: _____

FIG. 59

MON   19 1987   14:18:54

C E N S U S   D A T A   P R O O F   L I S T

PAGE    1

COMPANY:                              NUMBER: 01475              ESTIMATED CONTRIBUTION:     $40,000.00

| EMPLOYEE NAME | WAGES | BONUSES | MISC | SEX | BIRTH DATE | HIRE DATE | SOCIAL SECURITY | RATE FACT | CODE | SPEC | FLATEXTRA AMOUNT YR | PART |
|---|---|---|---|---|---|---|---|---|---|---|---|---|
| MICHAEL M MILLER | $71,940.80 | $0.00 | $0.00 | M | 07/23/55 | 10/05/72 | 000-00-0000 | S 1.00 | 1 | M | 0.00  0 | Y |
| RONALD P SMITH | $585,360.00 | $0.00 | $0.00 | M | 12/15/24 | 04/11/55 | 000-00-0000 | S 1.00 | 1 | M | 0.00  0 | Y |
| RALPH T JONES | $196,705.00 | $0.00 | $0.00 | M | 06/18/36 | 11/17/77 | 000-00-0000 | S 1.00 | 1 | M | 0.00  0 | Y |

```
*****************************************************
*  M A R K E T I N G   R E V I E W E R ' S   I N I T I A L S   _____  *
*                                                    *
*  CHANGES HAVE BEEN MADE.  PLEASE RE-RUN PROOF LIST.         *
*                                                    *
*  EVERYTHING LOOKS GOOD.   PLEASE RUN PARTICIPANT LIST.      *
*****************************************************
```

FIG. 60

```
MC    19 1987  14:26:56                     P A R T I C I P A N T S   L I S T                                       PAGE    1

COMPANY:                              NUMBER 01475                                ESTIMATED CONTRIBUTION:    $40,000.00

S                                             R        C  S
                                              E      BIRTH     HIRE      SOCIAL             A    T   O  P E
                                              X      DATE      DATE      SECURITY           T  E FACT D  E C    FLATEXTRA
EMPLOYEE NAME    WAGES      BONUSES   MISC                                                                       AMOUNT YR $71,940.80    $0.00    $0.00    M    07/23/55   10/05/72  000-00-0000         S  1.00  1   M         0.00  0
             $585,360.00    $0.00    $0.00    M    12/15/24   04/11/55  000-00-0000         S  1.00  1   M         0.00  0
             $196,705.00    $0.00    $0.00    M    06/18/36   11/17/77  000-00-0000         S  1.00  1   M         0.00  0

*********************************************************************************************************************
*  M A R K E T I N G   R E V I E W E R ' S   I N I T I A L S   _____
*
*  CHANGES HAVE BEEN MADE.  PLEASE RE-RUN PROOF LIST.                      USE BENEFIT TO PREMIUM RATIO
*
*  EVERYTHING LOOKS GOOD.   PLEASE RUN FORMULA COMPARE.
*********************************************************************************************************************
```

FIG. 61

FORMULA COMPARISON REPORT:
GROUP NUMBER: 01475
TARGET AMOUNT: 40,000
NUMBER OF PARTICIPANTS: 3

| FORMULA CODE | TOTAL GROUP PREMIUMS | GROUP TERM PREMIUMS | CONVERSION PREMIUMS | POLICY FEES | TOTAL AMOUNTS PRE-CONVERSION | TOTAL AMOUNTS AT CONVERSION |
|---|---|---|---|---|---|---|
| A | 40,000 | 827 | 38,723 | 450 | 80,000 | 616,470 |
| B | 40,000 | 827 | 38,723 | 450 | 80,000 | 616,470 |
| C | 40,000 | 411 | 39,139 | 450 | 80,000 | 436,684 |
| D | 40,000 | 411 | 39,139 | 450 | 80,000 | 436,684 |
| 1 | 40,000 | 314 | 39,236 | 450 | 124,930 | 624,651 |
| 2 | 40,000 | 1,520 | 38,030 | 450 | 605,449 | 605,449 |
| 3 | 40,000 | 314 | 39,236 | 450 | 124,930 | 624,651 |
| 4 | 40,000 | 1,520 | 38,030 | 450 | 605,449 | 605,449 |
| 5 | 40,000 | 449 | 39,101 | 450 | 87,254 | 436,268 |
| 6 | 40,000 | 1,543 | 38,007 | 450 | 424,059 | 424,059 |
| 7 | 40,000 | 449 | 39,101 | 450 | 87,254 | 436,268 |
| 8 | 40,000 | 1,543 | 38,007 | 450 | 424,059 | 424,059 |

FORMULA KEY:
A - FLAT AMOUNT PER CLASS, GRADED PURCHASE
B - FLAT AMOUNT, GRADED PURCHASED
C - MULTIPLE OF COMP PER CLASS, GRADED PURCHASE
D - MULTIPLE OF COMP, GRADED PURCHASE
1 - FLAT AMOUNT PER CLASS, MODULAR PURCHASE
2 - FLAT AMOUNT PER CLASS
3 - FLAT AMOUNT MODULAR PURCHASE
4 - FLAT AMOUNT
5 - MULTIPLE OF COMP PER CLASS, MODULAR PURCHASE
6 - MULTIPLE OF COMP PER CLASS
7 - MULTIPLE OF COMP, MODULAR PURCHASE
8 - MULTIPLE OF COMP

FIG. 62

GROUP TERM LEDGER ILLUSTRATION *

PREPARED FOR:
GROUP NUMBER: 04175

| (1) GROUP CONTRACT YEAR | (2) GROUP TERM ANNUAL PREMIUM | (3) ANNUAL CONVERSION CREDITS PURCHASED | (4) CUMULATIVE CONVERSION CREDITS PURCHASED | (5) AGGREGATE 1040 INCOME | (6) AGGREGATE 1040 TAX |
|---|---|---|---|---|---|
| 1 | $40,000 | $5,441 | $5,441 | $138 | $45 |
| 2 | 40,154 | 117,365 | 122,806 | 138 | 45 |
| 3 | 40,285 | 110,835 | 233,641 | 138 | 45 |
| 4 | 40,390 | 104,459 | 338,100 | 0 | 0 |
| 5 | 40,489 | 98,168 | 436,268 | 0 | 0 |
| TOTALS: | $201,318 | $436,268 | | | $138 |

ASSUMPTIONS:

\* NOT VALID WITHOUT PAGES ILLUSTRATING CONVERSION BENEFITS.

FIG. 63

INDIVIDUAL PARTICIPATING TERM LEDGER ILLUSTRATION

PREPARED FOR:

| (1) INDIVIDUAL CONTRACT YEAR | (2) DEATH BENEFIT | (3) 15 YEAR ANNUAL RENEWABLE MAXIMUM TERM PREMIUM | (4) 15 YEAR ANNUAL RENEWABLE CURRENT TERM PREMIUM | (5) ANNUAL DIVIDEND |
|---|---|---|---|---|
| 1 | $36,751 | $162 | $120 | $111 |
| 2 | 36,751 | 171 | 125 | 98 |
| 3 | 36,751 | 181 | 131 | 86 |
| 4 | 36,751 | 192 | 137 | 74 |
| 5 | 36,751 | 200 | 143 | 62 |
| 6 | 36,751 | 215 | 149 | 50 |
| 7 | 36,751 | 225 | 155 | 39 |
| 8 | 36,751 | 236 | 162 | 27 |
| 9 | 36,751 | 247 | 170 | 16 |
| 10 | 36,751 | 259 | 178 | 5 |
| 11 | 36,751 | 281 | 187 | 9 |
| 12 | 36,751 | 296 | 198 | 0 |
| 13 | 36,751 | 311 | 212 | 0 |
| 14 | 36,751 | 329 | 227 | 0 |
| 15 | 36,751 | 348 | 242 | 0 |
| TOTALS: |  | $3,651 | $2,535 | $578 |

ASSUMPTIONS:

FIG. 64

INDIVIDUAL PARTICIPATING TERM LEDGER ILLUSTRATION

PREPARED FOR:

| (1)<br>INDIVIDUAL CONTRACT YEAR | (2)<br>DEATH BENEFIT | (3)<br>15 YEAR ANNUAL RENEWABLE MAXIMUM TERM PREMIUM | (4)<br>15 YEAR ANNUAL RENEWABLE CURRENT TERM PREMIUM | (5)<br>ANNUAL DIVIDEND |
|---|---|---|---|---|
| 1  | $299,030 | $4,490  | $2,352  | $5,532 |
| 2  | 299,030  | 5,282   | 3,213   | 5,030  |
| 3  | 299,030  | 6,081   | 3,946   | 4,545  |
| 4  | 299,030  | 7,238   | 4,615   | 4,055  |
| 5  | 299,030  | 7,938   | 5,324   | 3,526  |
| 6  | 299,030  | 9,460   | 6,048   | 2,954  |
| 7  | 299,030  | 11,239  | 6,813   | 2,323  |
| 8  | 299,030  | 12,399  | 7,686   | 1,606  |
| 9  | 299,030  | 13,637  | 8,727   | 789    |
| 10 | 299,030  | 14,935  | 9,968   | 475    |
| 11 | 299,030  | 23,209  | 12,031  | 0      |
| 12 | 299,030  | 25,210  | 14,651  | 0      |
| 13 | 299,030  | 27,348  | 17,949  | 0      |
| 14 | 299,030  | 29,701  | 21,953  | 0      |
| 15 | 299,030  | 32,329  | 26,794  | 0      |
| TOTALS: |     | $230,495 | $152,071 | $30,836 |

ASSUMPTIONS:

FIG. 65

INDIVIDUAL PARTICIPATING TERM LEDGER ILLUSTRATION

PREPARED FOR:

| (1)<br>INDIVIDUAL CONTRACT YEAR | (2)<br>DEATH BENEFIT | (3)<br>15 YEAR ANNUAL RENEWABLE MAXIMUM TERM PREMIUM | (4)<br>15 YEAR ANNUAL RENEWABLE CURRENT TERM PREMIUM | (5)<br>ANNUAL DIVIDEND |
|---|---|---|---|---|
| 1 | $100,487 | $694 | $310 | $1,054 |
| 2 | 100,487 | 794 | 435 | 942 |
| 3 | 100,487 | 919 | 542 | 835 |
| 4 | 100,487 | 1,060 | 635 | 731 |
| 5 | 100,487 | 1,143 | 720 | 627 |
| 6 | 100,487 | 1,318 | 799 | 524 |
| 7 | 100,487 | 1,520 | 883 | 417 |
| 8 | 100,487 | 1,656 | 976 | 305 |
| 9 | 100,487 | 1,808 | 1,091 | 186 |
| 10 | 100,487 | 1,976 | 1,220 | 60 |
| 11 | 100,487 | 2,672 | 1,430 | 107 |
| 12 | 100,487 | 2,915 | 1,696 | 0 |
| 13 | 100,487 | 3,172 | 2,017 | 0 |
| 14 | 100,487 | 3,448 | 2,405 | 0 |
| 15 | 100,487 | 3,754 | 2,879 | 0 |
| TOTALS: | | $230,495 | $152,071 | $30,836 |

ASSUMPTIONS:

FIG. 66

INDIVIDUAL PARTICIPATING TERM LEDGER ILLUSTRATION

PREPARED FOR:

| (1)<br>INDIVIDUAL CONTRACT YEAR | (2)<br>DEATH BENEFIT | (3)<br>15 YEAR ANNUAL RENEWABLE MAXIMUM TERM PREMIUM | (4)<br>15 YEAR ANNUAL RENEWABLE CURRENT TERM PREMIUM | (5)<br>ANNUAL DIVIDEND |
|---|---|---|---|---|
| 1 | $436,268 | $5,345 | $2,782 | $6,698 |
| 2 | 436,268 | 6,246 | 3,773 | 6,070 |
| 3 | 436,268 | 7,180 | 4,619 | 5,467 |
| 4 | 436,268 | 8,490 | 5,387 | 4,859 |
| 5 | 436,268 | 9,281 | 6,187 | 4,215 |
| 6 | 436,268 | 10,993 | 6,996 | 3,528 |
| 7 | 436,268 | 12,983 | 7,851 | 2,779 |
| 8 | 436,268 | 14,290 | 8,825 | 1,938 |
| 9 | 436,268 | 15,692 | 9,988 | 992 |
| 10 | 436,268 | 17,170 | 11,367 | 65 |
| 11 | 436,268 | 26,163 | 13,649 | 591 |
| 12 | 436,268 | 28,420 | 16,545 | 0 |
| 13 | 436,268 | 30,831 | 20,178 | 0 |
| 14 | 436,268 | 33,478 | 24,585 | 0 |
| 15 | 436,268 | 36,431 | 29,916 | 0 |
| TOTALS: | | $230,495 | $152,071 | $30,836 |

ASSUMPTIONS:

FIG. 67

```
PREMIUM SUMMARY FOR                           GROUP NUMBER: 01475
EQUAL MULTIPLE OF SALARY FOR EACH ELIGIBLE EMPLOYEE IN A CLASS;
MODULAR PURCHASE.
------------------------------------------------------------------------
EMPL NAME  :
SS NUMBER  : 000-00-0000           DEATH BENEFITS
AGE        : 31                PRECONVERSION  ON CONVERSION
SEX        : M                     7,350.00       36,751.00
CLASS FACT : 1.00                      3.43           18.82
COMP       : 71940.80                 25.00          692.00     TOTAL
D.O.B.     : 07/23/55    POLICY FEE  150.00                    PREMIUM
DATE HIRED : 10/05/72    ----------  ------         --------   -------
U/W RATING : S           PREMIUM     175.00          692.00     867.00
------------------------------------------------------------------------
EMPL NAME  :
SS NUMBER  : 111-11-1111           DEATH BENEFITS
AGE        : 62                PRECONVERSION  ON CONVERSION
SEX        : M                    59,806.00      299,030.00
CLASS FACT : 1.00                      4.52          107.61
COMP       : 585360.00               270.00       32,179.00     TOTAL
D.O.B.     : 12/15/24    POLICY FEE  150.00                    PREMIUM
DATE HIRED : 04/11/55    ----------  ------         --------   -------
U/W RATING : S           PREMIUM     420.00       32,179.00  32,599.00
------------------------------------------------------------------------
EMPL NAME  :
SS NUMBER  : 222-22-2222           DEATH BENEFITS
AGE        : 50                PRECONVERSION  ON CONVERSION
SEX        : M                    20,097.00      100,487.00
CLASS FACT : 1.00                      7.61           62.01
COMP       : 196705.00               153.00        6,231.00     TOTAL
D.O.B.     : 06/18/36    POLICY FEE  150.00                    PREMIUM
DATE HIRED : 11/17/77    ----------  ------         --------   -------
U/W RATING : S           PREMIUM     303.00        6,231.00   6,534.00
------------------------------------------------------------------------
```

FIG. 68A

```
SUMMARY PAGE FOR                                  GROUP NUMBER: 3000
EQUAL MULTIPLED OF SALARY FOR EACH ELIGIBLE EMPLOYEE IN A CLASS
MODULAR PURCHASE
------------------------------------------------------------------
TOTAL GROUP TERM PREMIUM      :         449.00
TOTAL GROUP POLICY FEES       :         450.00
TOTAL CONVERSION PREMIUM      :      39,101.00
TOTAL GROUP PREMIUM           :      40,000.00
TOTAL PRECONVERSION BENEFITS  :      87,254.00
TOTAL POSTCONVERSION BENEFITS :     436,268.00
TOTAL PARTICIPANT COUNT       :           3
```

FIG. 68B

TTC/GROUP LIFE INSURANCE DISBURSEMENT SCHEDULE
---

DECEMBER 29, 1986                    DISBURSEMENT NUMBER: U00006
COMPANY NAME:                         GROUP NUMBER: 01475

---

TOTAL PREMIUM FUNDED: $ 67,554.60

ROYALTIES . . . . . . : $ 6,971.90   - PAYABLE TO AGENESIS, INC.

COMMISSIONS . . . . : $ 25,473.50    - PAYABLE TO PARTICIPATING INSURANCE
                                       MARKETING RESOURCES, INC.

CARRIER . . . . . . : $ 53,369.11 - PAYABLE TO _____
                                                 INSURANCE COMPANY

DISBURSEMENT COMPARISON REPORT: 01475
GROUP NUMBER:
TARGET AMOUNT: 40000.00
NUMBER OF PARTICIPANTS: 3

| FORMULA CODE | PREMIUM | AMOUNT DUE CARRIER | ADDITIONAL AMOUNT DUE | ROYALTIES | COMMISSIONS |
|---|---|---|---|---|---|
| A | 40000.00 | 5108.36 | 1198.85 | 32139.69 | 2751.95 |
| B | 40000.00 | 5108.36 | 1198.85 | 32139.69 | 2751.95 |
| C | 40000.02 | 4754.53 | 1211.74 | 32485.21 | 2760.28 |
| D | 40000.02 | 4754.53 | 1211.74 | 32485.21 | 2760.28 |
| 1 | 39999.99 | 4671.55 | 1214.76 | 32566.21 | 2762.23 |
| 2 | 40000.00 | 5696.75 | 1177.42 | 31565.15 | 2738.11 |
| 3 | 39999.99 | 4671.55 | 1214.76 | 32566.21 | 2762.23 |
| 4 | 40000.00 | 5696.75 | 1177.42 | 31565.15 | 2738.11 |
| 5 | 39999.99 | 4786.22 | 1210.58 | 32454.24 | 2759.53 |
| 6 | 40000.00 | 5716.35 | 1176.70 | 31546.01 | 2737.65 |
| 7 | 39999.99 | 4786.22 | 1210.58 | 32454.24 | 2759.53 |
| 8 | 40000.00 | 5716.35 | 1176.70 | 31546.01 | 2737.65 |

FORMULA KEY:
A - FLAT AMOUNT PER CLASS, GRADED PURCHASE
B - FLAT AMOUNT, GRADED PURCHASED
C - MULTIPLE OF COMP PER CLASS, GRADED PURCHASE
D - MULTIPLE OF COMP, GRADED PURCHASE

1 - FLAT AMOUNT PER CLASS, MODULAR PURCHASE
2 - FLAT AMOUNT PER CLASS
3 - FLAT AMOUNT MODULAR PURCHASE
4 - FLAT AMOUNT
5 - MULTIPLE OF COMP PER CLASS, MODULAR PURCHASE
6 - MULTIPLE OF COMP PER CLASS
7 - MULTIPLE OF COMP, MODULAR PURCHASE
8 - MULTIPLE OF COMP

FIG. 69B

UNDERWRITING REPORT:

GROUP NUMBER: 01475

| PARTICIPANT | FACE AMOUNT | DATE OF BIRTH | AGE | SEX | NMS | PM | HOS | ECG | BP | ME | SEC | IR | FJ | SCHEDULE DATE | COMPLETE DATE | RECEIVE DATE | RATE |
|---|---|---|---|---|---|---|---|---|---|---|---|---|---|---|---|---|---|
| | 7,350 | 07/23/55 | 31 | M | | | | | | | | | | | | | |
| | 59,806 | 12/15/24 | 62 | M | | XXX XXX | | | | | | | | | | | |
| | 20,097 | 06/18/36 | 50 | M | | | | | | | | | | | | | |

KEY: NMS - NON-MEDICAL STATEMENT          PM - PARAMED                HOS - HOME OFFICE SPECIMEN
     ECG - ELECTROCARDIOGRAM              BP - BLOOD PROFILE          ME  - MEDICAL EXAM
     SEC - STRESS ELECTROCARDIOGRAM       IR - INSPECTION REPORTS     FJ  - FINANCIAL JUSTIFICATION

FIG. 70

PRELIMINARY CHECKLIST

NAME OF COMPANY/CLIENT: _____

ADDRESS: _____

_____

COUNTY: _____

PHONE NUMBER: ( ) _____

TELECOPIER NUMBER: _____

TYPE OF BUSINESS: (SPELL OUT) _____

SIC CODE: _____

CORPORATE FEDERAL EIN: _____

VEBA FEDERAL EIN: _____

VEBA STATE ORGANIZATION NUMBER: _____

VEBA FISCAL YEAR END: _____

CORPORATE FISCAL YEAR END: _____

VEBA EXECUTION ADOPTION DATE: _____

VEBA EFFECTIVE DATE: _____

DATE OF DOCUMENT PRODUCTION: _____

RETAINER AMOUNT: $ _____

CORPORATION TYPE:   CLOSELY HELD _____   PUBLIC _____

VEBA ACCOUNTING BASIS:   CASH _____   ACCRUAL _____

COMPANY CONTACT: _____

TITLE: _____

FIRM: (IF OTHER THAN CLIENT NAME) _____

FIRM TELEPHONE: ( ) _____

FIG. 73A

PRESIDENT: _____

SECRETARY: _____

PLAN NUMBER:   501 _____    510 _____    OTHER _____

BOARD OF DIRECTOR(S): _____

_____

_____

PLAN COMMITTEE MEMBER(S): _____

_____

_____

TOTAL PERSONS EMPLOYED:   NON-UNION _____   UNION _____

ELIGIBLE PARTICIPANTS:    NON-UNION _____   UNION _____   PART-TIME _____

SHORTEST WAIT FOR PARTICIPATION: _____

TOTAL PARTICIPANTS AT BEGINNING OF YEAR: _____

TOTAL PARTICIPANTS AT END OF YEAR: _____

DATE OF CENSUS COUNT: _____

DATE OF INCORPORATION: _____

BONUSES?    YES _____ NO _____    IF YES, AMOUNT: $ _____

COMMISSIONS? YES _____ NO _____   IF YES, AMOUNT: $ _____

INITIAL AMOUNT OF CONTRIBUTION: $ _____

FIG. 73B

BENEFITS THAT REQUIRE PARTICIPANT CONTRIBUTIONS:

| | | | |
|---|---|---|---|
| MM/H: | $_____ | Y ____ | N ____ |
| DEATH: | $_____ | Y ____ | N ____ |
| VACATION: | $_____ | Y ____ | N ____ |
| HOLIDAY: | $_____ | Y ____ | N ____ |
| LONG TERM DIS: | $_____ | Y ____ | N ____ |
| SHORT TERM DIS: | $_____ | Y ____ | N ____ |

UNION INCLUDED: Y ____ N ____ UNION NAME: _____

DATE FORM 3500 PREPARED: _____

NON-CORPORATE TRUSTEE(S): (SELF-TRUSTED)

NAME(S): _____
    _____

ADDRESS: _____
    _____
    _____

CORPORATE TRUSTEE:

BANK NAME:

BANK ADDRESS: _____
    _____

TRUST OFFICER: _____

PHONE: (____) _____

FIG. 73C

CORPORATE ATTORNEY:

NAME: _____

FIRM: _____

ADDRESS: _____

_____

PHONE: (___)_____

CORPORATE ACCOUNTANT:

NAME: _____

FIRM: _____

ADDRESS: _____

_____

PHONE: (___)_____

NOTES: _____

_____

_____

_____

_____

DATE: _____

PREPARED BY: _____

FIG. 73D

AGENT LICENSE LIST

| NAME OF AGENT | LICENSED IN STATE OF: | TYPE OF LICENSE | DATE LICENSED | DATE LICENSE EXPIRES |
|---|---|---|---|---|
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |

FIG. 74

TTC CASE TRACKING – APPLICATION PHASE

MASTER APPLICATION

ACKNOWLEGEMENT/RECEIPT

ENROLLMENT CARDS

FIG. 75

ACKNOWLEDGEMENT AND RECEIPT

_____, EMPLOYEES' WELFARE BENEFIT TRUST ("APPLICANT") HEREBY ACKNOWLEDGES THAT NEITHER _____ LIFE INSURANCE COMPANY (" LIC") NOR ANY OF ITS AGENTS HAVE PROVIDED ANY LEGAL OR TAX ADVICE UPON WHICH APPLICANT IS RELYING IN APPLYING FOR LIFE INSURANCE WITH \_\_LIC. APPLICANT UNDERSTANDS THAT \_\_LIC'S AND ITS AGENTS DO NOT OFFER LEGAL OR TAX ADVICE AND CANNOT OFFER ANY ASSURANCE THAT APPLICANT'S PLAN, WHETHER A VEBA PLAN OR OTHERWISE, WILL RECEIVE FAVORABLE TAX CONSIDERATION BY THE INTERNAL REVENUE SERVICE. APPLICANT FURTHER UNDERSTANDS THAT ONLY \_\_LIC'S PRESIDENT OR SECRETARY HAS AUTHORITY TO MODIFY OR DISCHARGE CONTRACTS OR WAIVE ANY OF \_\_LIC'S RIGHTS OR REQUIREMENTS, AND THEN ONLY IN WRITING, AND NO STATEMENT, REPRESENTATION OR PROMISE BY ANY OTHER PERSON SHALL BE BINDING UPON \_\_LIC. FURTHER, WE HAVE RECEIVED FROM A REPRESENTATIVE LIFE INSURANCE AGENT OF PARTICIPATING INSURANCE MARKETING RESOURCES, INC. ("PIMRI"), AN ILLUSTRATION OF THE GROUP TERM LIFE INSURANCE PROPOSAL FOR WHICH WE HAVE APPLIED TO _____ LIFE INSURANCE COMPANY.

NAME TRUSTEE                                DATE

FIG. 76

CASE APPROVAL NOTIFICATION FORM

DATE _____     AGENT _____

NAME OF CASE _____

ITEMS ENCLOSED:     PRELIMINARY CHECK LIST            _____

ILLUSTRATIONS                     _____

UNDERWRITING REPORT               _____

PREMIUM CALCULATION REPORT        _____

FORMULA COMPARISON REPORT         _____

CENSUS REPORT                     _____

PARTICIPANT LIST                  _____

APPLICATION TRACKING

PAGE 1

| COMPANY NAME | NUMBER | FROM MARKTG | MASTER APPL SENT CLIENT | RECEVD | SENT CARRIER | ACK & RECPT SENT CLIENT | RECEVD | SENT CARRIER | ENROLLMENT SENT CLIENT | RECEVD | SENT CARRIER |
|---|---|---|---|---|---|---|---|---|---|---|---|
| CLIENT NO. 1 >>>> | 11607 | 12/31 | | | | | | | | | |
| CLIENT NO. 2 >>>> | 1105 | 12/31 | | | | | | | | | |
| CLIENT NO. 3 >>>> | 12745 | 12/31 | | | | | | | | | |
| CLIENT NO. 4 >>>> | 12483 | 12/31 | | | | | | | | | |

TOTAL IN APPLICATION PHASE:    4

FIG. 78

CASE TRACKING – UNDERWRITING PHASE

FIG.82

UNDERWRITING TRACKING

TH 2 1987 23:42:41 PAGE 1

| COMPANY NAME | NUMBER | MARKTG THRU | U/W SENT CARRIER | REPT RECEVD | REQUIREMENTS SENT SERVICE | COMPLET | RECEVD | SENT CARRIER |
|---|---|---|---|---|---|---|---|---|
| CLIENT NO. 1 >>>> | 11607 | 12/31 | | | | | | |
| CLIENT NO. 2 >>>> | 1105 | 12/31 | | | | | | |
| CLIENT NO. 3 >>>> | 12745 | 12/31 | | | | | | |
| CLIENT NO. 4 >>>> | 12483 | 12/31 | | | | | | |

TOTAL IN UNDERWRITING PHASE: 4

FIG. 83

METHOD AND APPARATUS FOR FACILITATING OPERATION OF AN INSURANCE PLAN

BACKGROUND OF THE INVENTION

The present invention relates in general to a method and apparatus for facilitating the operation of an insurance plan, and it more particularly relates to a computer system for controlling the operation of an insurance plan.

BACKGROUND ART

There have been different types of employer group life insurance plans for the benefit of employees. While such plans have been generally satisfactory, there have been many examples of hardships suffered by employees who were forced to terminate their employment with the company, and were no longer covered by life insurance. For example, an employee may become seriously ill, and not be able to continue working. Following termination, insurance coverage would terminate, and, unfortunately, the ex-employee may, at that time, be uninsurable.

As a result of such unfortunate occurrences, governmental agencies have required that such group plans provide for conversion rights, whereby an employee is given the right to elect to convert his or her group life insurance coverage, to an individual life insurance contract. Such an election is often times required within a certain period of time, such as two months, following termination. While such a legal provision has helped to alleviate some of the problems, all too frequently, an ill-fated ex-employee would not have sufficient funds to pay for the expensive individual life insurance contract, especially in the typical situation where medical expenses are being incurred concurrently with the loss of employment.

One of the reasons why the individual insurance conversion contract requires unusually high premium payments, is that those persons converting to an individual contract, were typically those persons in ill health. Thus, they were very poor insurance risks, and hence the insurance made available through conversion plans, has been typically prohibitively expensive for such employees.

Therefore, it would be highly desirable to have a group insurance plan, which provides employee conversion rights, whereby employees could obtain reasonable, low-cost insurance protection. In this regard, it would be particularly desirable to have a computer system for enabling the employer to help provide for the individualized conversion rights for its employees, since insurance carriers are not prepared to offer such low-cost individual insurance conversion rights.

One of the many problems associated with the adoption of such an insurance plan, would be that insurance carriers are unable, or otherwise unwilling, to do the initial expensive design work for a new and unique insurance product. In this regard, for a relatively few number of employers willing to adopt such a plan, there is an extensive amount of expensive developmental work concerning such an insurance product. For example, exhaustive actuarial studies are required, as well as accounting and tax analysis must be researched.

Another and very important reason why insurance carriers are understandably very reluctant to allow covered employees to convert to individual contracts at some indeterminate future date, is that for an indefinite period of time, the carrier would be responsible to guarantee the insurability of all qualified employees. Such a long term commitment is undesirable and unwanted, since the employees may not remain in the same state of good health. New and unanticipated diseases, such as the current malady—Acquired Immune Deficiency Syndrome, can arise to make the future risk uncertain.

Other reasons relate to the fact that, once such an insurance plan is implemented, there would be an excessive number of periodic reports required by law for the proper administration of such plans. Certain reserves must be maintained for the expected conversion contracts, and therefore, statutorily required periodic reports must be filed with the state departments of insurance, quarterly income tax reports are required, and general accounting practices must be reported to public corporations for Securities and Exchange Commission requirements. Some of these reports are even required monthly, and massive actuarial calculations are required for each and every covered employee.

Thus, it would be highly desirable to have a computer system, which could facilitate the establishment and administration of an insurance plan, and which would enable an employer to allow an employee to convert from a group insurance plan to a low-cost individual contract, providing reasonable coverage for the employee. Such a computer system should facilitate the execution of the insurance plan, and in this regard, help compile the necessary reports and other information, such as customer illustration reports and insurance carrier premium calculation reports. By somehow providing such a computer system, the insurance carrier could be attracted to underwrite such an insurance plan, by reducing greatly the cost to design, implement and administer such a plan.

Also, it would be highly desirable to provide information to the insurance carrier to help define the insurance risk associated with the taking on of a prospective new employer/customer. Such a risk is speculative, since the number of employees electing to convert to individual plans is not known, the number of future policy lapses is not known, and many other factors. Thus, it would be important to have such a computer system, which could help reduce such a risk.

DISCLOSURE OF INVENTION

Therefore, the principal object of the present invention is to provide a new and improved computer system, which facilitates the implementation of an insurance plan, wherein an employee can convert his or her group insurance coverage into an individual term insurance contract, which is a low-cost premium insurance relative to the amount of protection afforded.

Another object of the present invention is to provide such a new and improved computer system, which facilitates an insurance carrier to underwrite such an insurance plan in an effective and cost efficient manner.

Briefly, the above and further objects of the present invention are realized by providing a computerized insurance system, which facilitates the implementation and the administration of an employer group insurance plan, which enables all of the qualified employees to convert from a group plan to an individual term insurance contract at affordable low premiums relative to the coverage provided to the individual employees.

The system includes a group of computers for facilitating the implementation and administration of a desired group insurance plan, having conversion rights for individuals. The system includes information gathering devices for receiving and storing employer and employee base information, and devices for generating summarized base information signals in response to the information gathering devices. Devices generate report displays of summarized base information responsive to the signals. Also, devices calculate iteratively a desired employer contribution amount based upon the base information signals.

By employing such a distributed computer system, the employer uses a computer programmed to communicate with a service computer. If desired, the service computer, for example, may be utilized by an independent computer service organization, to support one or more insurance carrier computers, to execute the desired group conversion insurance plan. In so doing, the service computer can perform much of the work normally required by the insurance carrier computer, thereby reducing greatly the amount of work required by the insurance carrier and thus the expense to it.

Since the service computer supports a group of insurance carrier computers, the service computer operates effectively and efficiently to perform the many tasks required to implement and administer the plan. Thus, the employees can all be offered the conversion rights to individual insurance contracts, and the insurance carriers are willing and able to underwrite such low-cost individual insurance.

Moreover, by utilizing the distributed computer system of the present invention, various different insurance carriers may be contracted with for the group master insurance plans, and the same or different insurance carriers can be contracted with, at the discretion of the employees, to underwrite the individual post-conversion contracts.

In order to clarify the insurance risk for the carrier, prior to establishing the insurance plan for a prospective new customer, the system calculates the master group premium, based upon individual premium components, which are calculated iteratively, and based upon a mathematical function, including a number of factors, to help the insurance carrier to evaluate the prospective risk. For example, the factors include anticipated future policy lapses, anticipated mortality, interest rates, and many other factors that are important and useful for an insurance company to determine and evaluate a speculative future risk.

BRIEF DESCRIPTION OF DRAWINGS

The above-mentioned and other objects and features of this invention and the manner of obtaining them will become apparent, and the invention itself will be best understood by reference to the following description of an embodiment of the invention taken in conjunction with the accompanying drawings, wherein:

FIGS. 3a, b, and c are face plan views of an information-for-proposal report of the system of FIG. 1;

FIGS. 4a, b, and c are face plan view of an illustration report of the system of FIG. 1;

FIGS. 12-53 are face views of displayed images generated by the customer computers;

FIGS. 56-67, 68a, 68b, 69a, 69b, and 70 are face plan views of the forms and reports used in conjunction with, and generated by, the service computer of FIG. 2, during the Marketing Phase of the insurance plan;

FIGS. 73a, b, c and d and 74 are face plan views of the forms and reports used in conjunction with, and generated by, the service computer of FIG. 2, during the Application Phase of the insurance plan;

FIGS. 82 and 83 are face plan views of the forms and reports used in conjunction with, and generated by, the service computer of FIG. 2, during the Underwriting Phase of the insurance plan.

Best Mode for Carrying Out the Invention

The following description is presented and organized according to the following outline:
A. HARDWARE DESCRIPTION
B. SYSTEM OPERATION
C. SYSTEM COMPUTER SOFTWARE
D. UNDERLYING INSURANCE PLAN
   1. Premium Calculations
   2. Simplified Example of Premium Calculations
   3. Definitions
E. SYSTEM COMPUTER PROGRAM PLAN ESTABLISHMENT SUB-ROUTINES
   1. Database Dictionaries
   2. Major System Interface
   3. Special Data Entry Screens
   4. Rate Tables and System Defaults
   5. Information For Proposal (IFP)
   6. Calculations and Illustrations
F. ESTABLISHING AND ADMINISTERING INSURANCE PLAN
   1. Marketing Phase
   2. Application Phase
   3. Accounting Phase
   4. Underwriting Phase
   5. Issue Phase

A. HARDWARE DESCRIPTION

Figure 1:
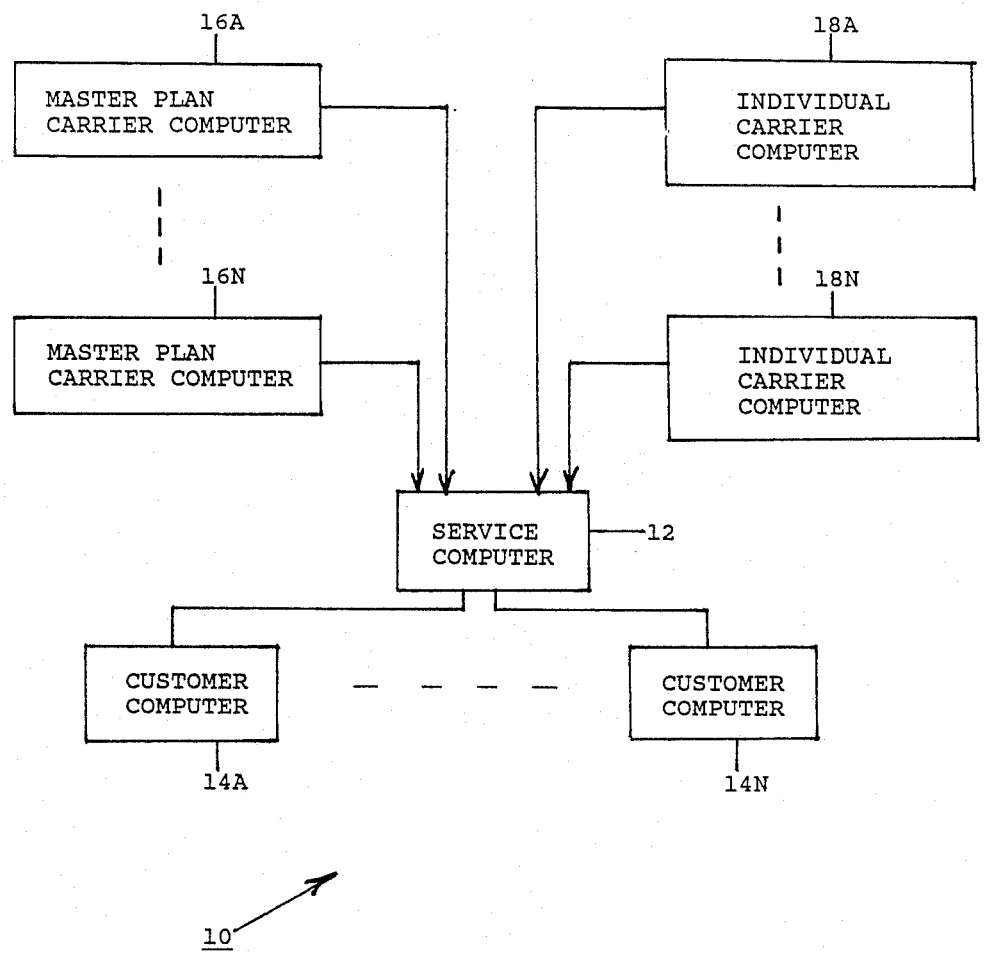
FIG. 1 is a symbolic block diagram of the computerized insurance system according to the present invention.

Referring now to FIG. 1 of the drawings, there is shown a computer system 10, which is constructed in accordance with the present invention.

The system 10 generally comprises a common service computer 12, which communicates individually and selectively with each one of a group of customer computers 14A–14N. In this regard, the service computer 12 performs all of the necessary basic calculations, and communicates with the customer computers, which may be located at the employers' place of business. In this manner, a desired group conversion insurance plan can be implemented to cover employees, to enable them to convert to individual low-cost insurance contracts. In order to so contract with the insurance carrier, the employer pays to the carrier, not only the premiums for the master group plan standard insurance, but also a component to maintain a current reserve requirement of the insurance carrier to guarantee the individual conversion rights for all of the qualified employees.

The system 10 also includes a group of master plan carrier computers 16A through 16N, which communicate individually and selectively with the common service computer 12. In this regard, there can be any number of such master plan carrier computers, and each one is utilized by a separate insurance carrier for cooperating with the service computer for controlling the execution of the conversion insurance plan for a particular customer computer. In this regard, one of the master plan carrier computers, such as the computer 16A, is utilized with the service computer, to implement and administer the customer's master group plan.

Once a customer's employee elects to convert his or her group insurance from the master group plan to an individual employee insurance contract, one or more of a group of individual carrier computers 18A–18N may be employed. It should be understood that the master plan carrier can also provide the individual insurance policy, at the election of the employee. If the master plan carrier also issues the individual contracts, then the master plan carrier computer is also used as the individual carrier computer. Thus, the employee can select the most competitive individual contract available, and need not be limited only to the contract currently available with the master plan carrier.

Figure 2:
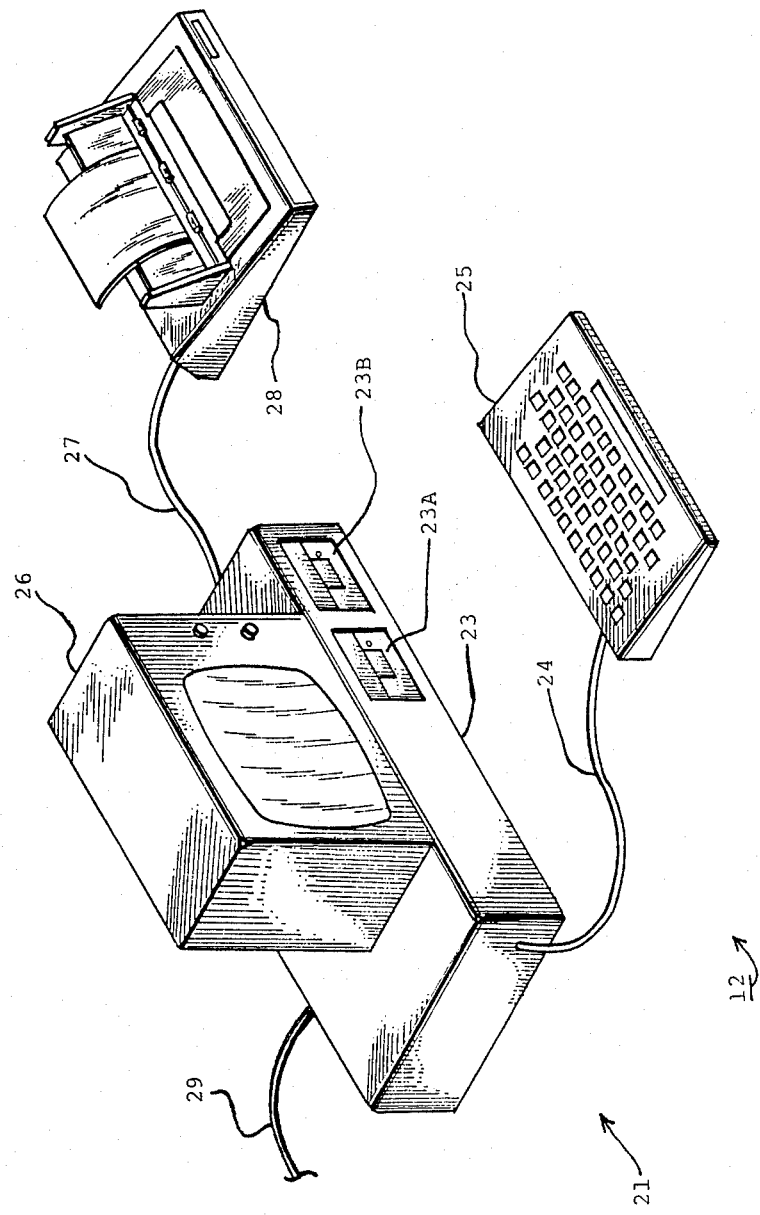
FIG. 2 is a pictorial view of a service computer.

As shown in FIG. 2, the service computer 12 is shown pictorially. The individual service computer 12 generally comprises a computer processor 23 having a pair of floppy disk drive memories 23A and 23B. The processor 23 also includes an internal hard disk drive memory (not shown). A cable 24 interconnects the processor 23 with an input keyboard 25.

A cable 27 interconnects the computer processor 23 and a printer 28. A cable 29 interconnects the service computer processor 23 with the other components of the system 10, such as the master plan carrier computers and the customer computers.

B. SYSTEM OPERATION

In operation, the first phase of the operation of the system 10 comprises a basic fact gathering process performed under the control of a computer program executed by a customer computer, such as the computer 14A. The fact gathering process is performed at the employer's place of business. The information is gathered in response to computer generated images, referred to as screens, displayed by the computer 14A, as hereinafter described in greater detail. The computer program for causing the generation of the screens, is preferably stored on a floppy disk (not shown), which is also used to store the basic data. Once the basic data is entered into the customer computer, such information is stored on the same disk, which is then sent to the service company for entering in the service computer 12. Alternatively, the basic information, once gathered, can be sent to the service computer 12 by various other techniques, such as by sending electronic messages, via modems (not shown) and telephone lines.

The basic information includes an employee census report, an employer company report, and a report on the nature and details of an employer welfare benefit plan, and/or employee benefit plan, if any, from which the group life insurance premiums are to be paid. Such a plan may be a pension plan, profit sharing plan, or a voluntary employees' beneficiary association (VEBA).

The census report includes the name of the employees. In this regard, all of the employees must be included, and categorized as both qualified and unqualified employees. The hiring dates, ages and birthdates, salary, officer status, sex, and the like, are included in the report.

Information gathered concerning the welfare benefit plan, and/or employee benefit plan, if any, includes information concerning the amount of the assets contained in the trust, and information concerning historical contributions to the trust. Additionally, company information is gathered. This information includes the name and address of the company, the type of corporation, the tax information concerning the corporation, and whether or not there are any subsidiary or affiliated companies covered by the welfare benefit plan, and/or employee benefit plan.

Once the basic information is gathered, a message is sent to the service computer 12, preferably in the form of the basic information stored on the floppy disk (not shown). At this point, the second phase of the operation commences. This second phase is the issue process phase.

As part of this second phase of the operation, an information for proposal report as shown in FIG. 3, is generated. The document includes summarized information. Such information includes the characteristics of the employee group, as to whether the employees are part-time employees, union employees, qualified employees and the like. Also, the amount of the assets of the welfare benefit plan, and/or employee benefit plan are included, together with the type of benefits, and other such information.

This information is then utilized in the computer 12 to generate an illustration report as shown in FIG. 4A. The illustration report is based upon the summary information contained in the IFP report. A benefit allocation formula is determined iteratively as hereinafter described in greater detail under program control.

Once these two reports are generated, an electronic message is sent from the service computer 12 to the master plan carrier computer 16A. This message includes all of the information of both the IFP report and the illustration report. A computer program stored in the master plan carrier computer 16A checks the accuracy of the data contained in the two reports.

Should the insurance carrier company require additional information concerning the medical history of one or more of the employees in the proposed group, the master plan carrier computer 16A sends a message back to the service computer 12, which, in turn, may send a message to the customer computer 14 to gather more detailed medical information concerning selected employees.

Once the required additional information is obtained and the proposed insurance plan is acceptable to the master plan carrier company, the master plan carrier computer 16A generates an insurance policy and documents to implement the plan for the proposed customer. In this regard, master group insurance contract application form (not shown) is generated by the master plan carrier computer 16A, and is sent to the customer company.

Similarly, as shown in FIG. 4B, an employee census/premium report is generated. This report includes each employee's premium, both pre-conversion attributable premiums to each employee, as well as the post-conversion premiums. Also, the death benefit for both pre- and post-conversion insurance contracts. The report also includes benefit allocation formula information, as well as the classification category for each employee. In this regard, there are four different categories as to the level of each employee. Level 1 includes directors and officers, Level 2 includes managers and supervisors, Level 3 includes lower level employees, and Level 4 is a miscellaneous category. These categories are important to determine whether or not the resulting insurance plan is non-discriminatory under §79 of the Internal Revenue Code. Additionally, the report also contains a much closer approximation to the benefit allocation formula, since the insurance carrier has made its determinations accordingly.

Once these reports are generated by the service computer, they are transmitted to the master plan carrier computer 16A. The computer 16A then reviews and analyzes the data, and either approves or disapproves the medical information. The decision is based upon the Medical Information Bureau standard information.

If there are any additional problems medically, the employee census/premium report may have to be redone to reflect changes in the medical report. Additional medical information may be requested, and even more in-depth information required. In this regard, certain employees may be classified as to a level of insurability in accordance with established underwriting categories. All of the employees are covered, but some of them may be classified at very low insurability categories due to their current condition of health. The insurance carrier computer then updates the premium calculations.

An updated illustration is then generated to reflect the final information by the computer, for both the individual and the master insurance policies.

The last stage is that the master plan carrier computer generates both a master group policy contract, and all of the individual employee certificates.

By having the base information stored in the service computer 12, such information can be readily updated as needed. For example, the various customer computers can send electronic messages to the service computer, whenever new employees are covered by the plan, old employees terminate, certain employees are electing to convert to individual insurance contracts, and the like. Thus, the service computer 12 can generate all reports (not shown) needed for the insurance plans of each customer, thereby reducing the burden and expense of the carrier companies for administering the various plans.

C. SYSTEM COMPUTER SOFTWARE

Figure 5:
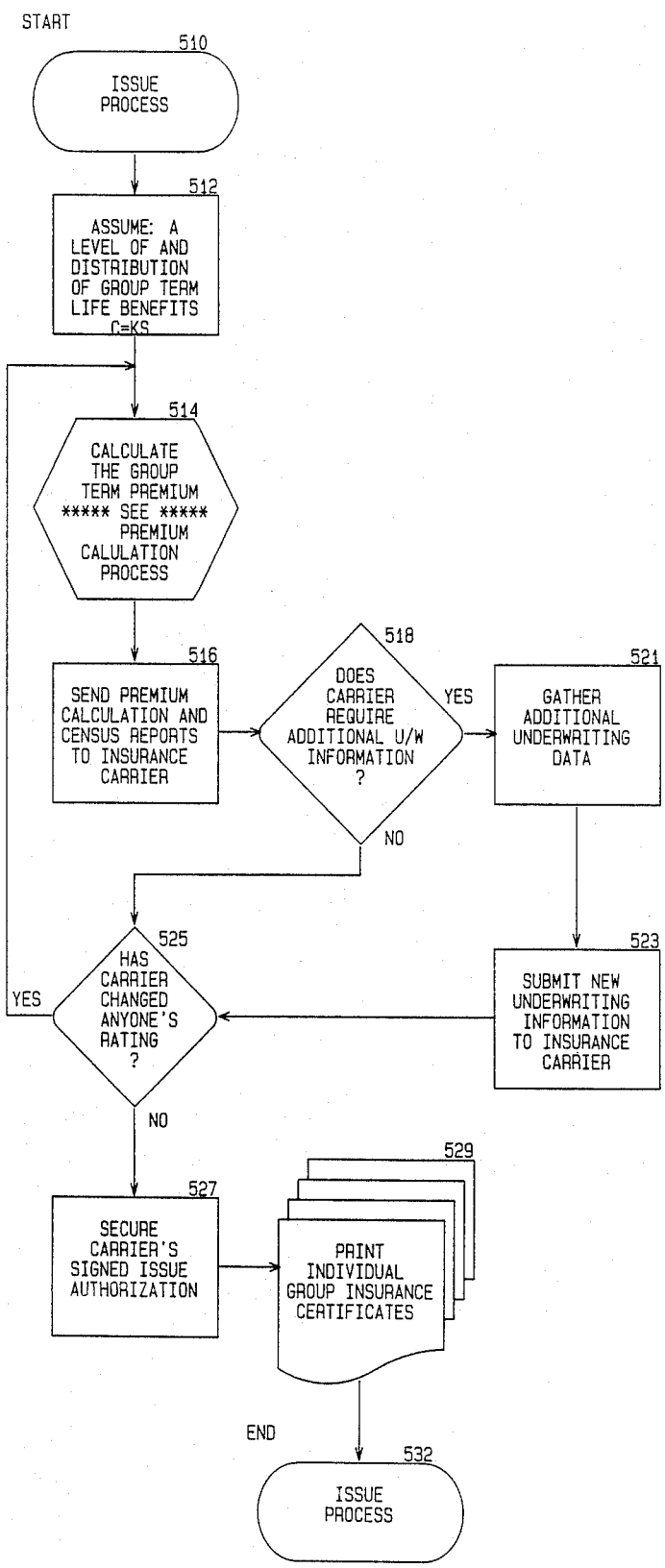
FIGS. 5-10 are flow charts of a computer program stored in the service computer of FIG. 2.

Referring now to FIGS. 5-10, there is shown the computer program for the service computer as illustrated in FIG. 2. Referring now more particularly to FIG. 5, there is shown the issue process phase program for controlling the system 10, in connection with the initial issuance of the master insurance policy and the individual insurance certificates.

As indicated at 510, the issue process commences. At 512, there is indicated that a level of and distribution of group term life benefits for the group insurance plan are calculated. In this regard, the face amount of insurance for each one of the individual employee insurance contracts are calculated according to the assumption formula. In the example shown, the face amount of the insurance policy is calculated to be a given multiple of the employee's annual salary.

Figure 6:
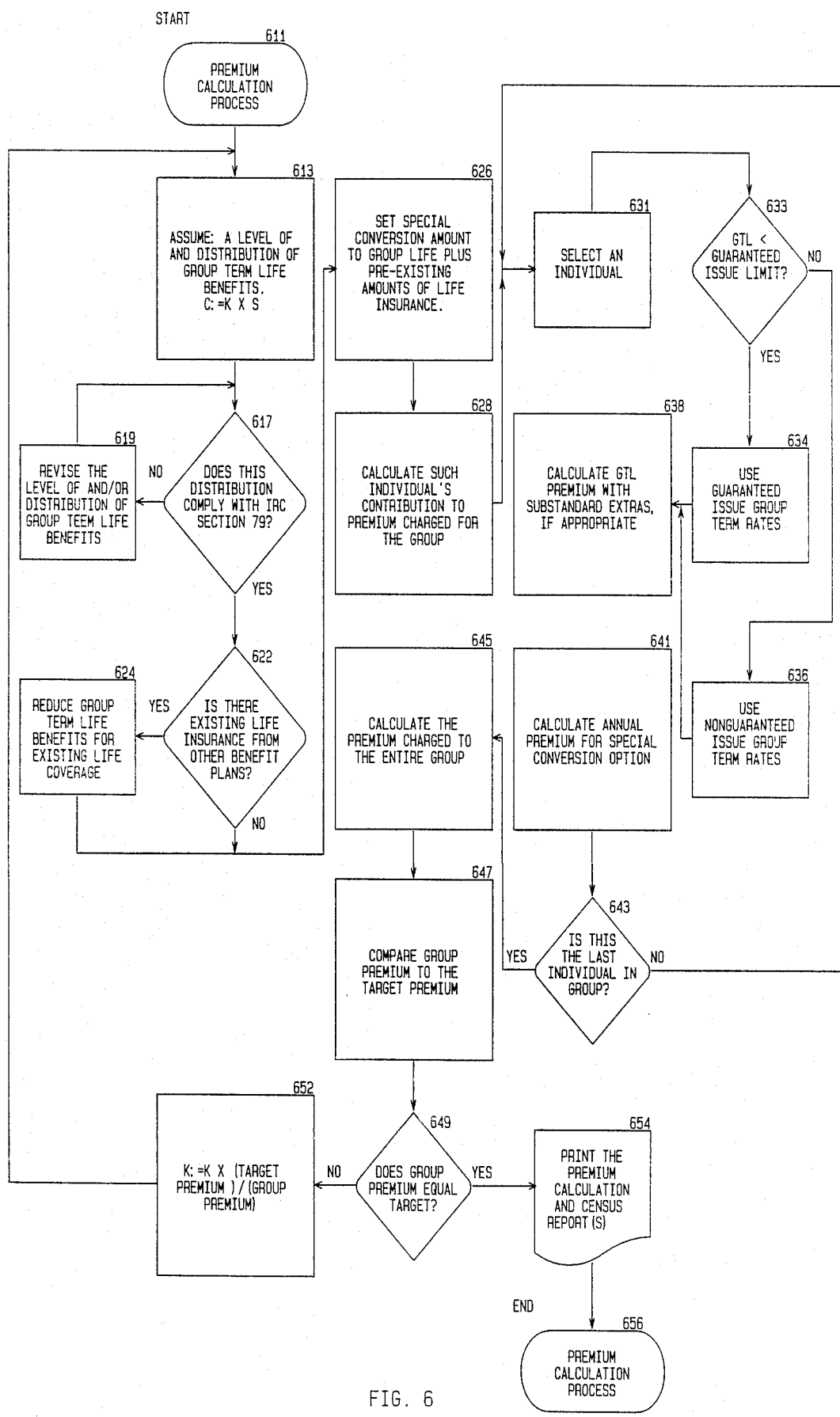

At 514, the premium calculation is performed according to a sub-routine shown in FIG. 6. Once the calculation is performed, as indicated at 516, a premium calculation and census reports are transferred to the insurance carrier computer. Thereafter, at 518, a decision is made by the insurance carrier computer as to whether or not additional underwriting information is required. If it is, as indicated at 521, additional underwriting data is gathered. This information is gathered according to the information contained in, and under the control of, the insurance carrier computer.

Thereafter, as indicated at 523, new underwriting information is submitted to the insurance carrier computer, which performs the necessary calculations. As a result of the calculations, the ratings for certain employees may be changed.

As shown at 525, a decision is made as to whether or not the insurance carrier has changed an employee's rating. In this regard, a message is transferred back to the service computer determining the current employee ratings. The service computer then determines, as indicated at 525, whether or not the insurance carrier has changed any employee's rating. It should be noted that if the carrier did not require additional underwriting information, the steps indicated at 521 and 523 are not executed.

If the carrier does require a change in the rating of one or more of the employees, a premium calculation is performed as indicated at 514 to re-calculate the premium and proceed through the boxes 516 and 518 to the box 525. If the carrier then has not made further changes in the employee ratings, a message is returned to the carrier computer indicating that the carrier should generate an issue authorization document (not shown) for signature by authorized carrier personnel. Thereafter, individual group insurance certificates are printed as indicated at 529 to thereby complete the issue process as indicated at 532.

Referring now to FIG. 6, there is shown the subroutine indicated at 514 in FIG. 5, for calculating the group term premium. The premium calculation as shown at FIG. 6, commences at 611 and proceeds, as shown at 613, to calculate the face amounts of each individual post-conversion individual insurance contract. In this regard, the face amounts are computed to be a multiple of each employee's annual salary. The constant used is the same for each employee.

After the calculations are made of the face amounts of the policies, as indicated at 617, a decision is made as to whether or not the distribution complies with the Internal Revenue Code §79 as to whether or not such contributions are non-discriminatory. This process is performed pursuant to a sub-routine (not shown), or alternatively, human intervention could be used at this point to make the necessary determination.

If the distribution does not comply, as indicated at 619, the level of and/or the distribution of group term life benefits are revised, and then the determination at 617 is again made until the distribution does, in fact, comply with the Internal Revenue Code.

Once the distribution is determined to comply with the Internal Revenue Code, as indicated at 622, a determination is made as to whether or not there is existing life insurance from other benefit plans. This determination is made from the initial input data, and if there is such other benefit plans, as indicated at 624, the group term life benefits are reduced to account for the existing life insurance coverage. Thereafter, once the adjustment is made, or if no adjustment is necessary, as indicated at 626, the special conversion amount is calculated, together with the pre-existing amounts of life insurance. As indicated at 628, each individual contribution is calculated.

Once the individual's contributions to the premiums charged for the group have been calculated, as indicated in 631, one of the individual employees is selected, and then as indicated at 633, a determination is made as to whether or not the GTL is less than the guaranteed issue limit. If it is, as indicated in 634, the guaranteed issue group term rate is used. If it is not, as indicated at 636, the non-guaranteed issue group term rate is used. Thereafter, as indicated at 638, the GTL premium with substandard extras, if appropriate, is calculated. In this regard, the standard premium calculation is made. In this regard, the total of the premiums allocated to each one of the individual employees covered under the group insurance policy, is added to determine the total group term life premium.

Thereafter, as indicated at 641, the annual premium for the special conversion option is then calculated. In this regard, each one of the individual insurance conversion rights are calculated, and then the total of those amounts are added to determine the total annual premium for the special conversion option is generated.

Thereafter, as indicated at 643, a decision is made as to whether or not this is the last individual in the group. If it is not, then the cycle is repeated until the calculations are made for all of the employees in the group.

Once the last individual in the group has a calculation made, as indicated in 645, the premium charged for the entire group is then calculated. In this regard, the standard group term life premium calculated at 638 is then added to the total special conversion option annual premium calculated at 641. The result is then compared at 647 with a predetermined target premium rate. Thereafter, as indicated at 649, a decision is made as to whether or not the total does compare to the target amount. If it does not compare, then as indicated at 652, a calculation is made to determine a ne constant to be used for determining the face amounts of each one of the group policy fact amounts and each one of the converted individual policy face amounts. In this regard, the new constant is equal to the old constant, multiplied by the target value of the total premium, divided by the trial value thereof as calculated at 647. The new constant is then used at 613 to again perform all of the calculations for each employee. In this regard, an iterative process is commenced. In this regard, all of the calculations are repeated until the trial total premium calculated at 645 does compare to the target total premium as indicated at 647. In such a situation, the two are equal, and thus the determination at 649 indicates an affirmative decision so that the premium calculation and census reports can be printed as indicated at 654. Thereafter, the premium calculation process terminates at 656.

Figure 7:
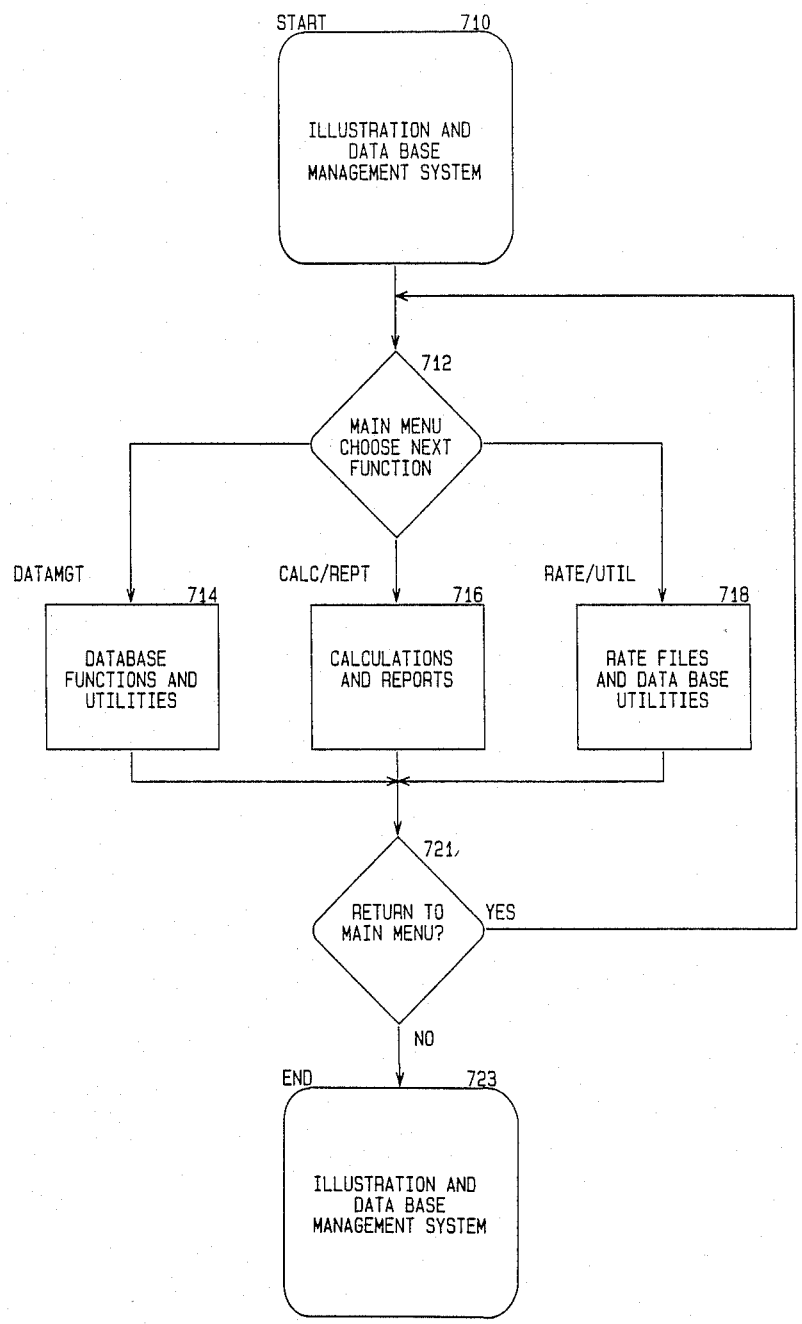

Referring now to FIG. 7, there is shown a routine for generating an illustration report. This routine is stored in the service computer shown in FIG. 2.

As indicated at 710, an illustration and data base management system routine is called. The routine starts by displaying a main menu to request the user to select any one of three functions. A computer program routine called DATAMGT may be selected at 714 to perform a database function and utility process. This routine is shown more fully in FIG. 8.

As indicated at 716, a sub-routine computer program CALC/REPT can be selected to perform a calculation and report process to generate the IFP report and the illustration report.

Also, the sub-routine program RATE/UTIL can be selected at 718 to perform a rate files and database utilities function. This sub-routine computer program generates a report to list the investment made by the insurance carrier, the mortality rates for the insurance policies, valuation mortality table information, and conversion premium information.

Each one of the three sub-routine computer programs exit at 721 so that a decision as to whether or not a return to the main menu is necessary. If not, the routine is terminated at 723.

Figure 8:
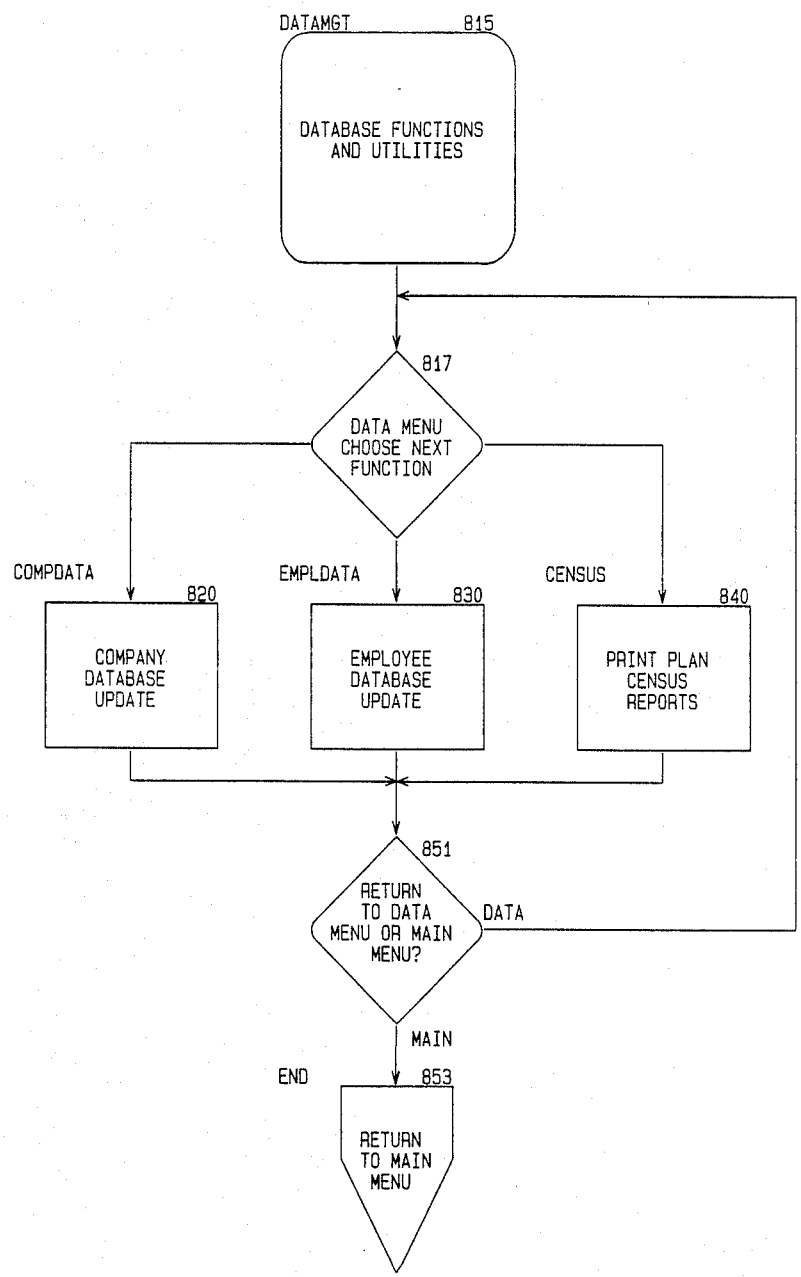

Referring now to FIG. 8, there is shown the subroutine computer program DATAMGT. The sub-routine commences at 815 and generates a data menu at 817 to allow any one of three functions to be selected. A sub-routine computer program COMPDATA may be selected at 820 to allow the company database to be updated as to certain data concerning the employer, the welfare benefit plan, and/or employee benefit plan, and other information.

A sub-routine computer program EMPLDATA can be selected at 830 concerning the employee database update to allow individual employee information to be updated. Also, as indicated at 840, a sub-routine computer program CENSUS can be selected at 840 to allow the printing of the census reports.

As indicated at 851, the three sub-routines exit to a menu display indicating that a return to the main menu can be selected, or a return to the data menu at 817. The selection of the main menu allows the sub-routine DATAMGT to be exited at 853 to return to the main menu shown at 712.

Figure 9:
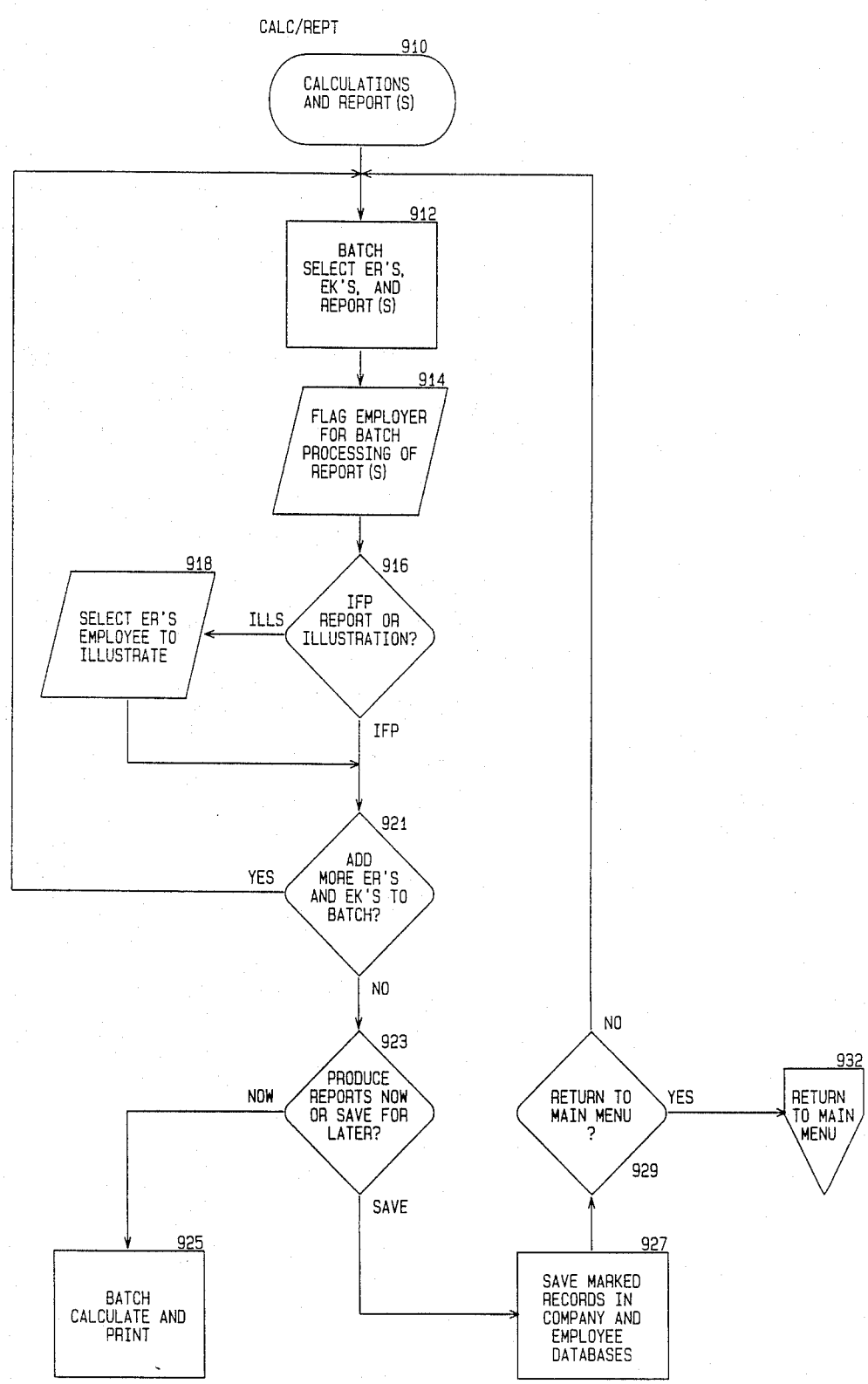

Referring now to FIG. 9, the sub-routine computer program CALC/REPT is illustrated, and is commenced at 910, for the purpose of performing calculations and generating reports. The first step of the process is illustrated at 912, by selecting employer's and employee's reports for a batch process. In this regard, for any one employer's plan, a batch process can be performed. In this regard, as indicated at 914, certain employers are flagged so that they can be selectively batch processed.

After batch processing certain selected employer calculations, a determination is made at 916 whether an IFP report or an illustration report is required. If an illustration report is required, one of the employer group plans is selected at 918, and the illustration report for that particular employer's plan is generated. If an IFP report is required, it is generated as indicated at 916. Once either one or both of the reports are generated, as indicated at 921, a decision is made as to whether or not to add additional employers and employees to the batch processing. If the decision is affirmative, the batch selection process is repeated at 912. If not, as indicated at 923, a decision is made as to whether to produce the report now, as indicated at 925, or to save the report for later, as indicated at 927. If so, then the report is marked for processing in the company and the employee databases. Thereafter, as indicated in 929, a decision is made as to whether to return to the main menu. If the decision is made to return to the data menu, the process may be repeated at 910, or the other two subroutines can be chosen as indicated at 817 in FIG. 8.

If the main menu is selected, the sub-routine is exited at 932 to return to the main menu as indicated at 712 in FIG. 7.

Figure 10:
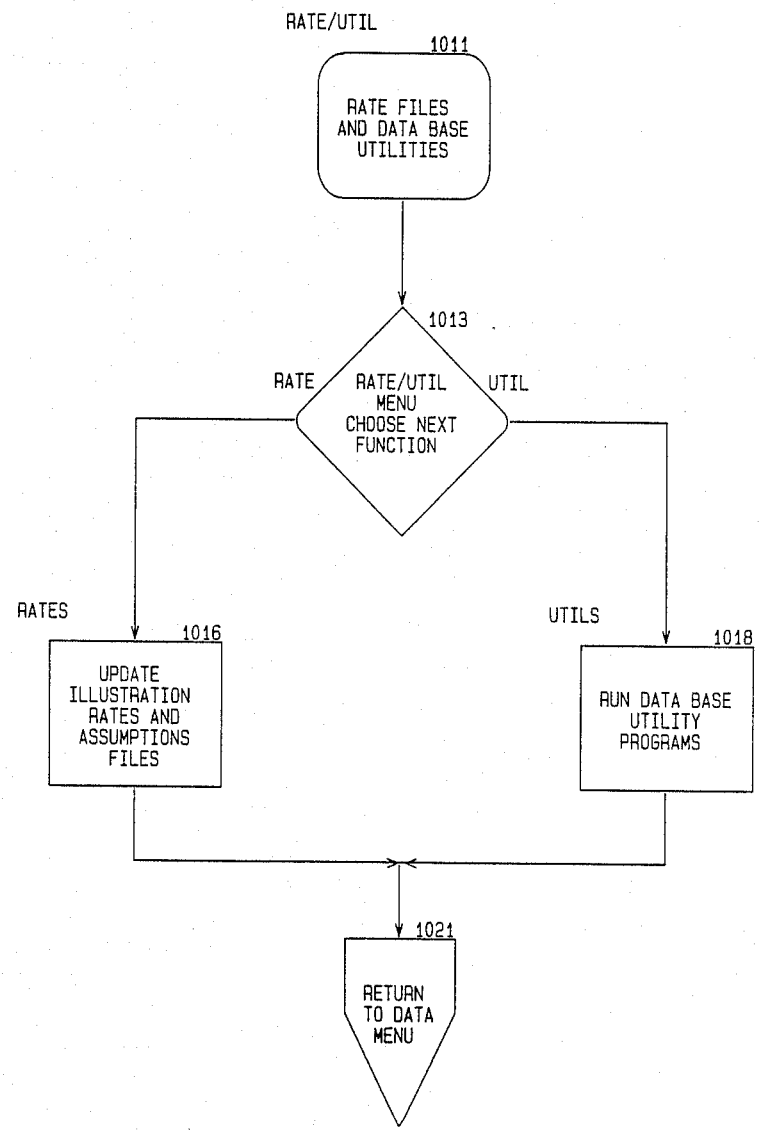

Referring now to FIG. 10, the sub-routine computer program RATE/UTIL is illustrated in more detail. That sub-routine computer program is commenced at 1011 and begins with a decision at 1013 to choose between the rate process or the utility process. If the rate process is chosen, as indicated at 1016, the illustration rate and assumption files are updated. If the utilities process is chosen, as indicated at 1018, database utility programs are executed In this regard, various different utilities are executable, including re-indexing files, backing up the system, deleting files, and the like.

Both of the rate and utility functions exit to a return to data menu exit point at 1021, so that the data menu indicated at 813 can be displayed for further selection by the user.

D. UNDERLYING INSURANCE PLAN

Briefly, the underlying insurance plan includes master group term life insurance contract for covering qualified employees. The group plan provides standard life insurance coverage for the qualified employees.

After an employee becomes and remains a part of the group for a predetermined length of time, such as five years, then the employee has the right to convert to an individual participating group term life insurance contract, bearing a low premium for the face value of the contract.

The service computer 21 of the system 10 automatically determines the face value for each one of the pre-conversion contracts and the post-conversion contracts. Since it is desirable to start with a given employer's contribution to the insurance plan, the system 10 starts with that given contribution, and then iteratively calculates both the group standard premium and the current reserve requirements of the insurance carrier for the post-conversion individual contracts.

The face value for each individual contract is computed for the amount of cumulated credits for each individual employee. Should an employee leave the group prior to the expiration of the five year qualifying period, his or her accumulated credits at the date of leaving the group, are distributed to the remaining employees in the group.

1. Premium Calculations

The system software executes premium calculations. It calculates the single premium paid by the employer, for transmittal to both the customer's computer, and to the carrier's computer. In this regard, the employee census/premium calculation report is generated by the service computer.

The master premium is calculated based upon a large number of factors, relating to the particular insurance risk associated with a given customer. Such factors may include pre- and post-conversion contract face amounts, interest rates, anticipated contract lapses, anticipated individual conversion elections, anticipated mortality, premium tax, carrier profit, size of group, geographic information, and many other possible factors. These factors may be displayed on the premium calculation report, and such report may be sent electronically to the associated carrier computer As a result, the carrier company can decide whether or not it wants to assume such a risk, based on the various factors, and the resulting calculation. It should be understood that the insurance carrier can determine which factors are important to it, and what specific functional relationship these factors are to be employed. Also, the carrier can modify the premium calculation formula at any time.

As hereinafter described in greater detail, the service computer calculates the group premium based upon various formulas. The single master premium is calculated to be equal to the sum of individual premium components allocable to the individual employees.

The individual premium component is calculated according to an iterative process. The individual premium component is given, since the employer determines what the total premium to be paid should be for the given employee group. In order to achieve the desired target value of the employer's premium component, the face amounts of the policies are varied successively, until the target premium component is arrived at iteratively, through successive approximations.

For example, the process may be commenced by first determining that both the pre- and post-conversion face amounts are equal to one another, and are calculated according to one of several possible formulas.

The face amount is then calculated to be a certain multiple of the employee's annual salary, such as two (2) times the amount of the employee's current annual salary. For sake of simplicity, the multiple can be assumed to be one (1).

Once this calculation is completed, then the result is used in the premium component formula to calculate a trial premium component, all of the other factors being given constants. If the resulting trial premium component differs from the target component, a different face amount is used in the formula. This process is repeated iteratively, until the resulting trial premium component equals the target premium component. At that point in the process, the face amounts of the policies are determined for a desired premium component.

The iterative process is then repeated for each employee to obtain the contract face amounts for all the employees. This information is then used in the Employee Census/Premium Calculation Report.

More comprehensive formulas used for premium calculations will now be discussed in greater detail.

2. Simplified Example of Premium Calculations

In order to illustrate the premium calculation performed by the system 10, a greatly simplified example will now be described. Assume that there are two employees in the group. One is a female employee who has currently attained the age of 35 years. The other covered employee is a male employee who has currently attained the age of 45 years.

The employer's premium contribution for each employee is equal to the following:

$$X = AY + BZ,$$

where
- X = employer's contributions
- Y = post-conversion death benefit of policy
- Z = pre-conversion death benefit of policy
- A = post conversion premium rate
- B = conversion premium rate per $1,000.00 of conversion death benefit In order to provide a simplified example for sake of clarity, assume that both employees are assigned the same amount of death benefit. In this regard, Y=Z for both employees, and for this example, assume Y=Z=$50,000.00 for both employees. The $50,000.00 amount is chosen as the cut-off amount, above which special underwriting requirements become effective. In such a situation, the premium values change.

In order to determine the premium rates for both employees, it must be determined what the desired amount of the employer's total premium contribution will be for a given year. In this regard, assume that the employer desires to contribute $25,000.00. Therefore, X=$25,000.00, which is the target value.

Knowing the foregoing, the female employee's premiums will first be calculated, as follows:

$$\begin{align} X_F &= A_F Y_F + B_F Z_F \\ &= (.0035)(\$50,000) + (.01)(\$50,000) \\ &= \$675 \end{align}$$

The male employee's premium calculation is performed next, as follows:

$$\begin{align} X_M &= A_M Y_M + B_M Z_M \\ &= (.005)(\$50,000) + (.015)(\$50,000) \\ &= \$1,000 \end{align}$$

Thereafter, the total employer's premium calculation is made as follows:

$$\begin{align} X &= X_F + X_M \\ &= \$675 + \$1,000 \\ &= \$1,675 \end{align}$$

Thus, the first iteration produced a value of X, which is substantially less than the target value of $25,000.00. Hence, another iteration is required.

The next iteration is attempted by selecting a different value for Y and Z. The next value of Y and Z is determined by the following iteration formula:

$$K = k \times \frac{TP}{GP}$$

K symbolizes an iteration constant, used to determine a new value for Y and Z. The term k represents a multiple of the employee's annual salary, and for sake of simplicity, it will be assumed that k=1. The term TP represents the "target premium", which in the present example, is $25,000.00. The term GP represents "group premium", which is the last computed value of X, and which is the amount $1,675.00 in the present example.

Therefore, the iteration formula is as follows:

$$K = (1)\frac{(\$25,000)}{(\$1,675)} = 14.92$$

The next value for Y and Z is calculated as follows:

$$\begin{align} Y &= Z = K(\text{assumed value of } Y, Z) \\ &= (14.92)(\$50,000) \\ &= \$746,268.66 \end{align}$$

Since the new value of Y and Z is greater than $50,000, special underwriting requirements become effective. In this regard, different premium rates for both employees must be utilized in the next iteration.

The female employee's premium is then calculated, as follows:

$$\begin{align} X_F &= A_F Y_F + B_F Z_F \\ &= (0.0015)(\$746,266.66) + \\ &\quad (.01)(\$746,266.66) \\ &= \$8,582.09 \end{align}$$

It should be noted that AF for this iteration is lower than the prior iteration, because the underwriting requirements now take into account the age, health and possibly other factors for this particular employee.

The next calculation for the male employee premiums, is as follows:

$$\begin{align} X_M &= A_M Y + B_M Z \\ &= (.003)(\$746,266.66) + \\ &\quad (.015)(\$746,266.66) \\ &= \$13,432.84 \end{align}$$

It should be noted that the male employee's $A_M$ was also lower in value than the previous iteration, due to the underwriting requirements for this particular employee.

The summation is then taken as follows:

$$\begin{align} X &= X_F + X_M \\ &= \$8,582.09 + \\ &\quad \$13,432.84 \\ &= \$22,014.93 \end{align}$$

Since this value is less than the target value of $25,000.00, another iteration is required. The iteration formula is again used to calculate a new value for Y and Z, as folows:

$$\begin{align} K &= k\frac{TP}{GP} \\ &= (1)\frac{\$25,000}{\$22,014.93} = 16.949 \\ Y &= Z = K(\$50,000) \\ &= 16.949(\$50,000) \\ &= \$847,436 \end{align}$$

The $X_F$ calculation is as follows:

$$X_F = A_F Y + B_F Z$$
$$= .0015(\$847,436) + .01(\$847,436)$$
$$= \$9,745.52$$

The $X_M$ calculation is as follows:

$$X_M = A_M Y + B_M Z$$
$$= .003(\$847,436) + .015(\$847,436)$$
$$= \$15,253.86$$

The total employer premium X is then calculated as follows:

$$X = X_F + X_M$$
$$= \$9,745.52 + \$15,253.86$$
$$= \$24,999.38$$

This iteration is within one dollar of the target amount, and thus the process stops at this point. Therefore, for an employer contribution of $24,999.38, the female employee death benefit is $9,745.52, and the male employee's death benefit is $15,253.86.

It should now become apparent to those skilled in the art that even in the simplest formula, the iterative approach required to solve for the premiums, is somewhat complex. The system 10 is also able to perform the necessary calculations, based on a number of different formulas. For example, there may be different death benefits based on employee classification. Also, there can be a formula that is based on death benefits, which are a function of annual income. The death benefit function can also vary among the classes of employees. Another example would be where k is something other than one (1).

The system 10 can execute twelve different formulas. Therefore, the system 10 calculates the premiums in twelve different manners—one for each formula. The one formula that provides the best result for the prospective customer, is the one which is transmitted from the service computer to the customer's computer for approval by the customer. If approved, such as by sending a message back to the service computer, the service computer then sends a message to the appropriate carrier computer, to provide the necessary information to establish the plan. The message is in the form of a report containing all information required for each individual.

The carrier then notes "sub-standard" employees, and information concerning such new rates, is returned to the service computer. The term A is higher in value for the substandard employees.

Thus, it may now be seen that it is a complex matter to achieve each one of the formulas, especially when there are multiple principals and other factors involved. Also, the calculations become even more complex in form.

3. Definitions

More comprehensive formulas used for premium calculations will now be discussed in greater detail.

The following table is a list of definitions of various terms used in the premium calculation formulas, used by the service computer software:

e Insured employee of the employer covered by the group term life insurance policy. Associated with this life e are the categories: issue age, sex, face amount, underwriting status, salary, and classification.

k Pre-conversion period. Defined as the certificate duration at the end of which the special conversion right can first be exercised.

t Certificate duration; one plus the whole number of years since the certificate was issued.

$FA_{e,k}^{pre}$ Face amount, in $1,000's, of pre-conversion group term for employee e. This is determined by the benefit formula chosen for the insurance plan and the employee's classification.

$FA_e^{exst}$ Face amount, in $1,000's, of life insurance for existing coverage which is to remain in effect for employee e.

$FA_{e,k}^{post}$ Face amount, in $1,000's, of post-conversion life insurance for life e. The relationship between $FA_{e,k}^{pre}$, $FA_e^{exst}$ and $FA_{e,k}^{post}$ is shown in the following formula.

$$FA_{e,k}^{post} = FA_{e,k}^{pre} + FA_e^{exst}$$

$CnvPrm_{e,k}$ Required net single premium, at time of conversion, per $1,000 of accured term conversion credits on behalf of employee e. The term conversion credits are only available under the special conversion option.

$C_{e,t,k}$ Commission rate applied to $P_{e,t}^{pre}$, and paid to the marketing entity by the insurance carrier.

$E_{e,t,k}^{\%}$ Expenses as a percent of $P_{e,t}^{pre}$, expected to be incurred annually by the insurance carrier.

$E_{e,t,k}^{cert}$ Expenses per certificate, expected to be incurred annually by the insurance carrier.

$E_{e,t,k}^{M}$ Expenses per $1,000 of certificate face amount, expected to be incurred annually by the insurance carrier.

$AS_k^{post}$ Anticipated average, amongst all employees, of the conversion face amount in $1,000's.

$\pi$ Life insurance company profit charge as a percentage of $P_{e,t}^{pre}$.

$q_{e,t,k}^{(d)}$ Expected mortality rate at duration t for employee e.

$q_{e,t,k}^{(w)}$ Rate of withdrawal at end of year t for age e.

$nP_{e,t,k}$ Probability of employee e surviving n years from duration t. Defined as $$nP_{e,t,k} = \prod_{u=t}^{t+n} (1 - q_{e,u,k}^{(d)})(1 - q_{e,u+1,k}^{(w)})$$

$i_t$ Net investment in duration t.

$nV_t$ Present value at duration t of $1 payable in year t+n.

$$nV_t = \left(\frac{1}{1 + i_t}\right)\left(\frac{1}{1 + i_{t+1}}\right) \cdots \left(\frac{1}{1 + i_{t+n-1}}\right)$$

$GP_e^{std}$ Basic group term premium for employee e.

$GP_e^{substd}$ Substand and extra group term premium for employee e.

GP Total group premium for all insured employees.

N Number of insured employees in the group.

Considering now the group term insurance premium, the group term insurance premium charged for the group policy is the sum of two parts: the premium for the group term insurance, and the premium for the insurance plan option. The aggregate group premium is based upon an employee census provided to the carrier, and is calculated in a manner such that it remains level for five years if none of the underlying assumptions and demographics change.

The aggregate group premium is the sum of the premiums for every insured employee in the group as shown in Equation 1.

$$GP = \sum_{e=1}^{N} \{FA^{pre}_{e,k} \cdot (GP^{std}_e + GP^{substd}_e) + (FA^{post}_{e,k} \cdot P^{pre}_{e,t})\} \quad (1)$$

Considering now the pre-conversion premium, the pre-conversion premium, $P_{e,t}^{pre}$, is the portion of the total group premium which covers the mortality anti-selection expected under term-to-term conversions. This premium is calculated using the carrier's future expectations for mortality, expenses, investment income, and other factors.

The pre-conversion premium in the first year of the group policy for employee e, per $1,000 of death benefit, is defined by Equation 2.

$$P^{pre}_{e,t} = \frac{CnvPrm_{e,k} \cdot k v_{1 \cdot k} p_{e,1,k} + \sum_{t=1}^{k} \left( E^M_{e,t,k} + \frac{E^{cert}_{e,t,k}}{AS^{post}_k} \right)_{t-1} v_{1 \cdot t-1} p_{e,1,k}}{\sum_{t=1}^{k} (1 - C_{e,t,k} - E^{\%}_{e,t,k} - \pi)_{t-1} v_{1 \cdot t-1} p_{e,1,k}} \quad (2)$$

The pre-conversion premium in renewal years will be recalculated due to changes in the demographics of the employee group and changes in the carrier's future expectations for mortality, expenses, investment income and other factors used in the calculation of the premium.

Considering now the conversion credit, each year under the group term contract the pre-conversion premium, $P_{e,t}^{pre}$, purchases specified amounts of conversion credits for each insured employee e. The conversion credits are the amounts of insurance the insured employee can convert at the time of election of the insurance plan option. The conversion credits earned-to-date are guaranteed by the insurance carrier.

The conversion credit, $CC_{e,t,k}$, available at end of year k, purchased by $P_{e,t}^{pre}$ in duration t is defined in Equation 3.

$$CC_{e,t,k} = \frac{\$1,000 \cdot F_{e,t,k}}{CnvPrm_{e,k} \cdot \pi^k_{s=t} {_{n}v^{val}_s} {_{s-1}p^{val}_{e,s}}} \quad (3)$$

The factor, $F_{e,t,k}$, is defined by the following formula.

$$F_{e,t,k} = \frac{(1 + i_t)}{{_1}p_{e,t-1,k}} \cdot$$

$$\left[ P^{pre}_{e,t} \cdot (1 - C_{e,t,k} - E^{\%}_{e,t,k} - \pi) + F_{e,t-1,k} - E^M_{e,t,k} - \frac{E^{cert}_{e,t,k}}{AS^{post}_k} \right] -$$

-continued $$F_{e,t-1,k} \cdot \frac{1 + i^{val}_t}{{_1}p^{val}_{e,t-1}}$$

Considering now the pre-conversion reserve, the pre-conversion reserve is defined as the maximum of the reserve for the standard conversion option and the reserve for the insurance plan option. The pre-conversion reserve for the standard conversion option is the present value of the present value of the conversion premium, [7], for the term insurance credits purchased as of the date of valuation and is calculated using valuation assumptions for mortality and interest. The statutory pre-conversion reserve is used by the insurance carrier in its NAIC annual convention blank. Additional terms used in the reserve equations are shown below.

TrmAmt$_z$ Maximum amount of insurance available under standard conversion option.

$i_t^{val}$ Valuation interest rate for group term insurance.

$q_{e,t,k}^{(w)}$ Rate of withdrawal at end of year t for age x.

$qe_{x,t,k}^{trm}$ Rate of election of the standard conversion option for those who withdraw in year t.

$qe_{x,t,k}^{TTC}$ Rate of election of the special conversion option of for those who withdraw in year t.

$q_{e,t}^{val}$ Valuation mortality rate in year t for insured with an issue age x.

$nP_{e,t}^{val}$ Probability of certificate-holder surviving n years from certificate duration t using valuation mortality rates. Defined as $$_nP^{val}_{e,t} = (1 - q^{val}_{e,t})(1 - q^{val}_{e,t+1}) \ldots (1 - q^{val}_{e,t+n-1})$$

$i_t^{val}$ Valuation interest rate in year t. $_nV_t^{val}$ Present value at certificate duration t of $1 payable in year x+n using the valuation interest rate.

$$_nv^{val}_t = \left(\frac{1}{1 + i^{val}_t}\right)\left(\frac{1}{1 + i^{val}_{t+1}}\right) \ldots \left(\frac{1}{1 + i^{val}_{t+n-1}}\right)$$

$V_{e,t,k}^S$ Pre-conversion terminal reserve.

Considering now the post-conversion contract, the insurance carrier is expected to generate a significant amount of assets from the premiums paid to it. These assets are used to offset the mortality anti-selection under the conversion option and, in the unlikely event that they are not exhausted by excess mortality, to provide for nonguaranteed dividends or other policy credits to the converted contract holders. In no event are these assets subject to contractual reversion to either the plan trust or the sponsoring employer. The insurance plan calls for full credibility to be given to experience ten years after the point of conversion, so that minimal undistributed surplus is likely to exist beyond that date. Any remaining assets from those which are generated to offset potential excess mortality costs are passed through to the converted contracts in the form of dividends or other credits.

E. SYSTEM COMPUTER PROGRAM PLAN ESTABLISHMENT SUB-ROUTINES

The following is a description of the computer software of the service computer, for establishing the insurance plan.

Figure 11:
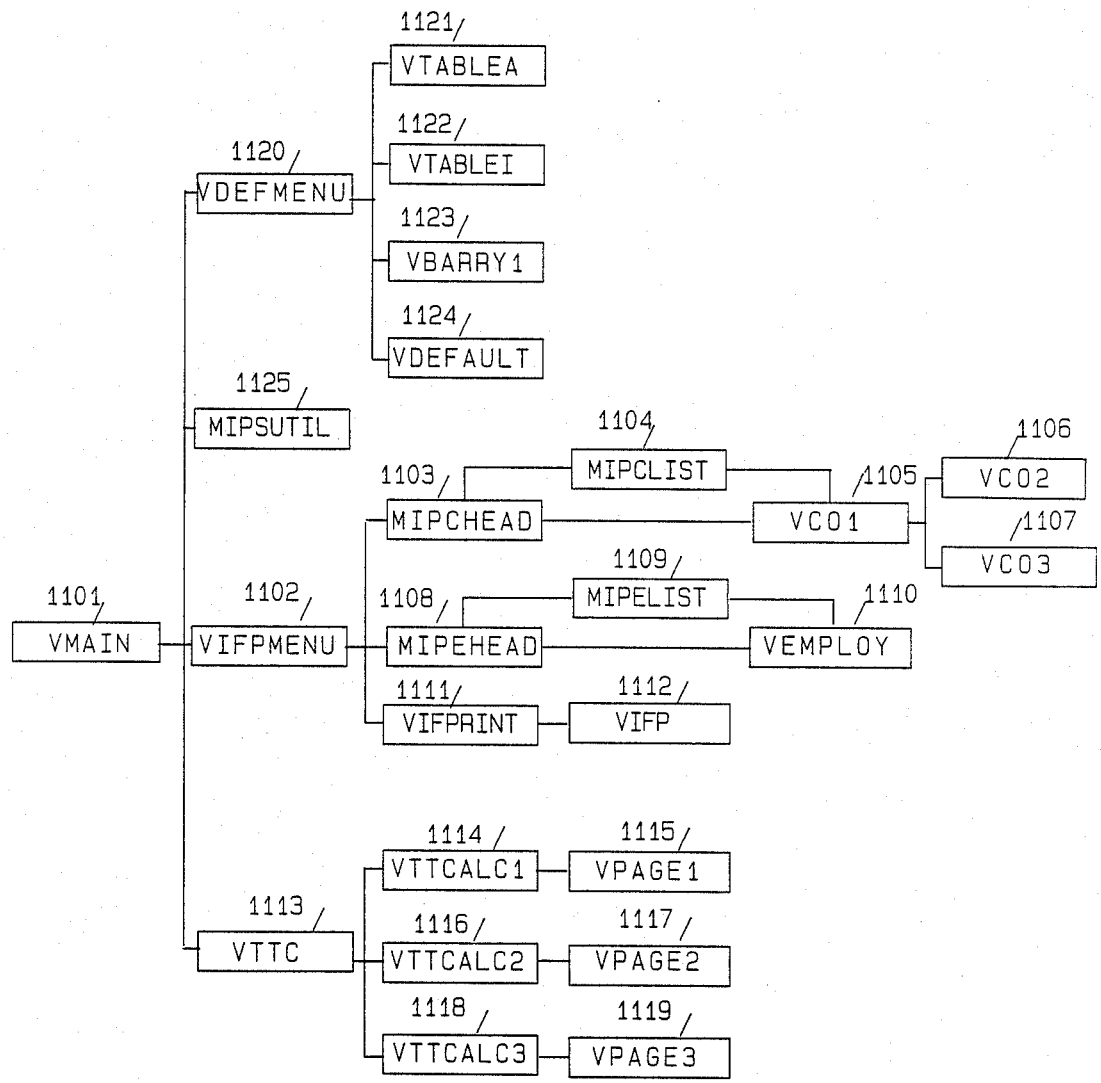
FIG. 11 is a flow chart of the various different sub-routine computer programs executed by the system of FIG. 1.

A Program Hierarchical Flow Chart is shown in FIG. 11. The source programs are combined to produce the executable version of the system program.

The Master Menu Program (VMAIN program 1101) is the control program for the whole system. Its major functions are to define all variables used in the system, open all databases for the system, and display the Master Menu (FIG. 13) and pass control to subsequent programs based on the response entered by the user.

The VIFPMENU program 1102 controls the Information for Proposal (IFP) data entry and printing. The major functions performed are to display IFP Master Menu, and pass control to the appropriate IFP programs based on the user's response.

The MIPCHEAD program 1103 is a generic data entry program for capturing the basic information for a COMPANY—e.g. Company Name and Number—prior to passing control to more application specific programs. The major functions are to display the COMPANY HEADER screen (FIG. 16) to capture COMPANY NAME/COMPANY ID to be processed by the system, call the MIPCLIST program 1104 if a list of COMPANY NAMES is required, and upon successful data entry, call the module whose name is contained in the global variable PROGRAM"—e.g. the use of the global variable technique is very valuable as it allows MIPCHEAD program 1103, MIPCLIST program 1104, MIPEHEAD program 1108, and MIPELIST program 1109 to be called by any other program to capture COMPANY/EMPLOYEE identification and automatically execute the desired subsequent program—provided the calling program initialized the global variable "PROGRAM" with the desired program name.

The MIPCLIST program 1104 displays a list of nine COMPANY names. The user may select any number of the companies displayed by placing a "1" next to each. MIPCLIST program 1104 calls the program named in the global variable "PRORAM" for the first COMPANY selected. Upon completion, the process is repeated for each of the remaining COMPANIES selected. A POP-UP MENU as subsequently defined in the "Major System Interface" section allows the user to browse through the COMPANY database to search for other COMPANIES that are to be processed.

The VCO1 program 1105 is the first of three that are used to gather Information for Proposal Data for the selected COMPANY. Major functions include gathering COMPANY name, address and subsidiary information, and displaying a POP-UP MENU to access the other COMPANY data entry screens.

The VCO2 program 1106 is the second of three that are used to gather Information for Proposal Data for the selected COMPANY. Major functions include gathering information on total employees and number of key employees, and displaying a POP-UP MENU to access the other COMPANY data entry screens.

The VCO3 program 1107 is the third of three that are used to gather Information for Proposal Data for the selected COMPANY. Major functions include gathering information on Annual Costs for COMPANY welfare plans, and displaying a POP-UP MENU to access the other COMPANY data entry screens.

The MIPEHEAD program 1108 is a generic data entry program for capturing the basic information for an EMPLOYEE—e.g. Name and Number—prior to passing control to more application specific modules. The major functions are to display EMPLOYEE HEADER screen to capture NAME/EMPLOYEE number to be processed by the system, call the MIPELIST program 1109 if a list of EMPLOYEE NAMES is required, and upon successful data entry, call the program whose name is contained in the global variable "PROGRAM" e.g. if the variable "PROGRAM" contains the program name "VEMPLOY" 1110, then the EMPLOYEE data entry program will be executed. The use of the global variable technique is very valuable as it allows the MIPCHEAD program 1103, MIPCLIST program 1104, MIPEHEAD program 1108 and MIPELIST program 1109 to be called by any other program to capture COMPANY/EMPLOYEE identification and automatically execute the desired subsequent program—provided the calling program initialized the global variable.

The MIPELIST program 1109 is a generic data entry program called by the MIPEHEAD program 1108 to allow multiple EMPLOYEES to be selected for processing. Major functions are to display a list of nine EMPLOYEE names. The user may select any number of the companies displayed by placing a "1" next to each. MIPELIST program 1109 calls the program named in the global variable "PROGRAM" for the first EMPLOYEE selected. Upon completion, the process is repeated for each of the remaining EMPLOYEES selected. A POP-UP MENU allows the user to browse through the EMPLOYEE database to search for other EMPLOYEES that are to be processed.

The VEMPLOY program 1110 is the EMPLOYEE data entry program. Major functions are to display EMPLOYEE data entry screen, gather required EMPLOYEE data—Age, sex, date of hire, salary . . . etc., and display a POP-UP MENU to allow re-edit of current EMPLOYEE or exit to Menu.

The VIFPRINT program 1111 prints the Information for Proposal data previously gathered for a COMPANY and it's EMPLOYEES. Major functions are to call the MIPCHEAD program 1103 to obtain COMPANY to be printed (the MIPCHEAD program 1103 may in turn call the MIPCLIST program 1104 if multiple COMPANIES are to be printed), and display a POP-UP menu asking if printing is to occur. If so, call the VIFP program 1112 to print the actual report.

The VIFP program 1112 is called by the VIFPRINT program 1111 to print the Information For Proposal Report for the selected COMPANY.

VTTC program 1113 is the illustration program which calls the MIPCHEAD program 1103 to obtain COMPANY to be printed (the MIPCHEAD program may in turn call the MIPCLIST program 1104 if multiple COMPANIES are to be printed), and displays the data entry screen.

It inserts Default values for Annual Contribution(s) from selected COMPANY IFP data. Default Interest rates and tax brackets for each policy year are derived from the DEFAULTS database.

It allows the user to modify any of the default values if desired, and it calls the Illustration Calculation and Print programs.

The VTTCALC1 program 1114 performs the calculations required for the first page of the illustration.

The VPage1 program 1115 retrieves the skeleton form for the first page of the illustration and makes a working copy. The results of the calculations are placed in the working copy and printed out.

The VTTCALC2 program 1116 performs the calculations required for the second page of the illustration.

VPAGE2 program 1117 retrieves the skeleton form for the second page of the illustration and makes a working copy. The results of the calculations are placed in the working copy and printed ut.

The VTTCALC3 program 1118 performs the calculations required for the third page of the illustration.

The VPage3 program 1119 retrieves the skeleton form for the third page of the illustration and makes a working copy. The results of the calculations are placed in the working copy and printed out.

The VDEFMENU program 1120 provides password protection. The Rate table and System default Menu (FIG. 23) is accessed from the MASTER MENU (FIG. 13) is password protected. Failure to enter the correct password simply returns you to the Master Menu (FIG. 13). Major functions are to display Menu of rate tables and system defaults table that may be updated, and calls the appropriate program based on the user's selection.

The VTABLEA program 1121 displays the current Entry Age Conversion Rates (FIGS. 27 and 28) used by the system. The user may modify these rates, in which case all future calculations will utilize the new values. A set back for females may be entered—in which case the female rates are adjusted to reflect the set back years.

Figure 30:
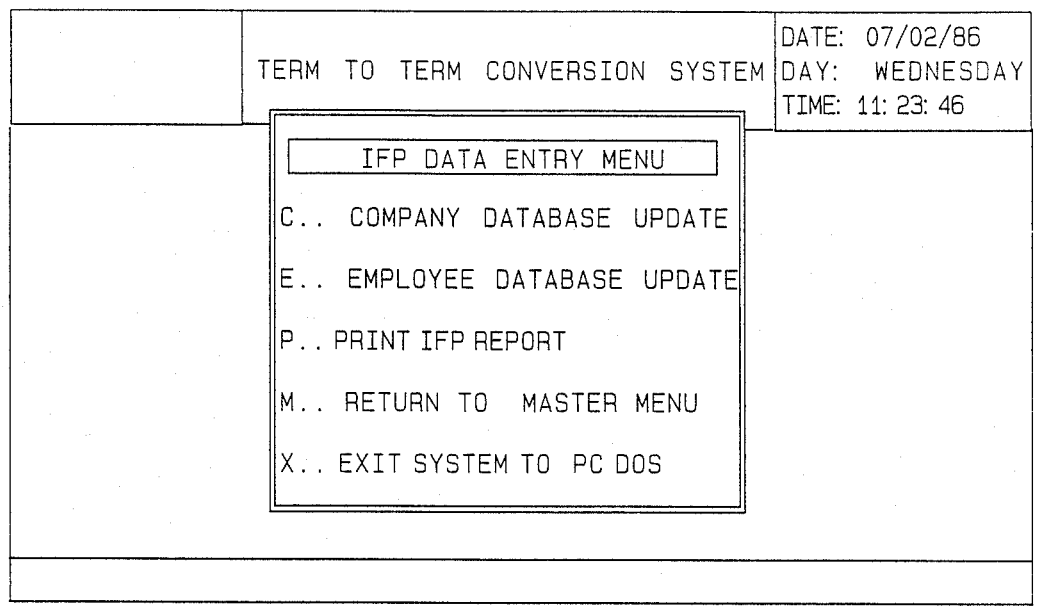

The VTABLEI program 1122 allows the current Table I rates (FIGS. 29 and 30) to be modified by the user.

The VBARRY1 program 1123 allows BARRY's Table to be modified by the user.

The VDEFAULT program 1124 provides certain default values, such as interest rates (FIG. 24).

The MIPSUTIL program 1125 is a generic program for performing general database maintenance. Databases may be backed up, re-indexed, and emptied using this module, as discussed in more detail in connection with the DATABASE UTILITIES SCREEN.

The system contains three other programs not shown in the flowchart. A MIPSIO program handles the display of all MENUS and SCREENS in the system. Individual programs issue calls to the MIPSIO program each time they wish to display a SCREEN or MENU.

A MIPSDOS program allows the user to exit temporarily to DOS while in the middle of a data entry SCREEN (not from a MENU). Pressing the "F10" key invokes the module.

A HELP program is used to determine the correct sensitive HELP screen to be displayed for a specific data item when the user presses the "F1" key.

1. Database Dictionaries

The following table contains complete descriptions of all databases used in the system 10.

The databases covered are:

| | |
|---|---|
| COMPANY.DBF | COMPANY Database |
| COMPANY.NTX | INDEX for COMPANY on COMPANY NAME |
| CONUMBER.NTX | INDEX for COMPANY on COMPANY NUMBER |
| EMPLOYEE.DBF | EMPLOYEE database |
| EMPLOYEE.NTX | INDEX for EMPLOYEE on EMPLOYEE NAME |
| SSN.NTX | INDEX for EMPLOYEE on EMPLOYEE NUMBER (Social Security #) |
| TABLEA.DBF | TABLE A - Entry Age Conversion rates. |
| TABLEI.DBF | TABLE I - Rates. |
| BARRY1.DBF | Miscellaneous Table. |
| DEFAULTS.DBF | System DEFAULT values. |
| VPAGE1.DBF | Skeleton form layout for 1st page of |

-continued

| | |
|---|---|
| | TTC Illustration. |
| WPAGE1.DBF | Database to build 1st page of TTC from skeleton. |
| VPAGE2.DBF | Skeleton form layout for 2nd page of TTC Illustration. |
| WPAGE2.DBF | Database to build 2nd page of TTC Illustration from skeleton. |
| VPAGE3.DBF | Skeleton form layout for 3rd page of TTC Illustration. |
| WPAGE3.DBF | Database to build 3rd page of TTC Illustration from skeleton. |

2. Major System Interface

Figure 12:
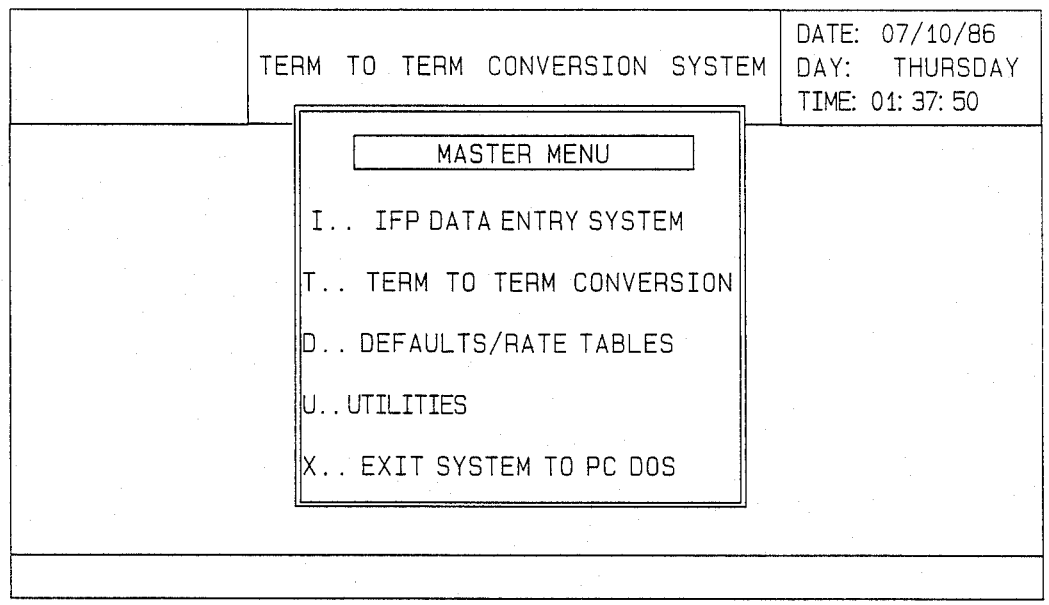

There are two main interfaces to enable effective use of the system 10. These are the POP-UP MENUS and DATA ENTRY Screens displayed by the monitor 11, of FIG. 12.

POP-UP MENUS, such as the Master Menu illustrated in FIG. 13, control the flow of processing through the system. As their name suggests, they POP-UP on the screen as they are needed. A POP-UP MENU offers the user a number of choices, the default choice is always highlighted. The user may use either of the two methods to make a choice by entering it in the customer computer (FIG. 1).

First, using UP and DOWN arrow keys (FIG. 15), the UP/DOWN arrow key is pressed until the desired choice is highlighted. The ENTER key is then pressed to cause the system 10 to accept this choice.

The second choice is selecting the letter/number displayed next to the choice appearing on the screen, by pressing the first letter/number shown to the left of the MENU choices. The system accepts the corresponding choice. Selecting a letter/number not shown on the MENU has no effect.

POP-UP MENUS sometimes overlay information on an existing screen. Pressing the space bar temporarily removes the POP-UP MENU. The POP-UP MENU disappears revealing the original screen it overlaid. Pressing the space bar again causes the POP-UP MENU to re-appear.

Selection of a choice from a POP-UP MENU may result in another POP-UP MENU with another set of choices or a DATA ENTRY SCREEN.

DATA ENTRY SCREENS are used to gather input values required by the system to perform a specific task. All the required fields to be inputted are displayed in reverse-video. The cursor is placed on the first input item and the appropriate keys are depressed. Certain key combinations have special meaning during data entry. These key combinations are described in FIGS. 4 and 5.

3. Special Data Entry Screens

When the system 10 requires entry of identification of a specific COMPANY or EMPLOYEE, using the customer computer of FIG. 1, special data entry screens are displayed for use in gathering employer/employee and other base information. The screens themselves are not peculiar to any one specific process in the system 10, but may be used by all of them. For example, adding a new COMPANY or EMPLOYEE utilizes these screens; and a request to print a report for a specific COMPANY and EMPLOYEE would also use these screens. They are the gateway to access the COMPANY and EMPLOYEE databases.

The COMPANY HEADER SCREEN is illustrated in FIG. 16. This screen is used whenever access to the COMPANY database is required. It basically allows a COMPANY to be selected by entering either all or part of the COMPANY name and/or the COMPANY numeric ID.

All the possible combinations for selection are shown on the lower part of the COMPANY screen.

The COMPANY LIST SCREEN is illustrated in FIG. 17. When insufficient information is given to uniquely identify the COMPANY input in the COMPANY HEADER·SCREEN, then the existing companies in the database are listed on the COMPANY LIST SCREEN. One or more COMPANIES may be selected from this screen.

If the desired COMPANY is not listed on the screen, then pressing the "PgDn" key (FIG. 15) pops up a MENU to allow the next or previous nine companies to be displayed (FIG. 18).

If multiple companies are selected, each is processed in turn before returning to the COMPANY LIST SCREEN.

The EMPLOYEE HEADER SCREEN is illustrated in FIG. 19. This screen is functionally equivalent to the COMPANY HEADER SCREEN illustrated in FIG. 16, except that it deals specifically with the EMPLOYEE database.

The EMPLOYEE LIST SCREEN (FIGS. 20 and 21) is functionally equivalent to the COMPANY LIST SCREEN (FIGS. 17 and 18), except that it deals specifically with the EMPLOYEE database.

Figure 22:
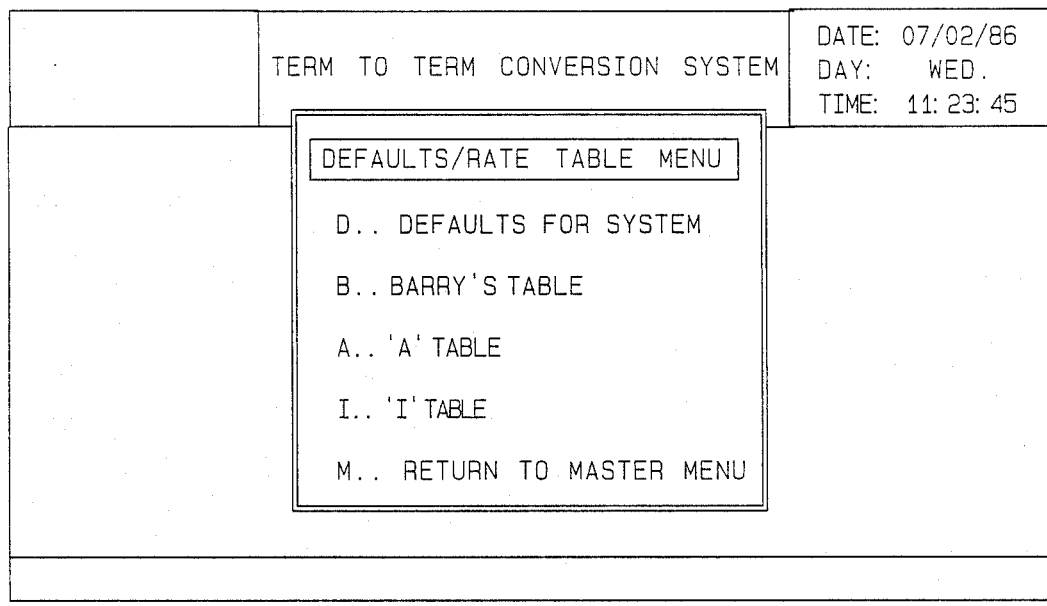

The MASTER POP-UP MENU (FIG. 13) always contains a choice name "UTILITIES". Selection of this choice displays the DATABASE UTILITIES SCREEN (FIG. 22). This screen enables commonly used functions to be performed on all the major databases in the system. Placing a 1 in the input item next to the database name will cause that function to be performed.

The major database functions performed by this screen include a BACKUP database, as indicated on the screen (FIG. 22). The BACKUP database enables important databases to be copied periodically (backed up) to floppy diskettes in case the original database becomes damaged.

A "1" in this input item helps the user create a backup copy of a database. The user is prompted for the disk drive onto which the backup database is to be made. A copy of the original database is written to the specified drive. A file extension of .BAK is assigned to the copy, to distinguish it from the original, which has a file extension of "DBF".

The DATABASE UTILITIES SCREEN (FIG. 22) also includes a REINDEX database. Some databases have INDEX files associated with them. They are used so that data for a specific COMPANY/INDIVIDUAL may be rapidly retrieved. In unusual circumstances (power failures, exiting the system improperly...) the INDEX may be damaged. This produces erratic or erroneous results—e.g. you know a specific COMPANY is definitely on the database, but when you attempt to retrieve it via the COMPANY HEADER screen (FIG. 16), you always receive a "NOT ON FILE" message.

A "1" in this input item will rebuild the damaged INDEX (es) thus enabling COMPANY/EMPLOYEE data to be retrieved correctly again.

The ZAP database choice on the DATABASE UTILITIES SCREEN (FIG. 22) provides database erasure. As the size of a database grows over time, you may wish to archive the database to floppy diskette and start again with an empty database. The BACKUP option allows you to archive the original database. A "1" in the ZAP input item empties the associated database of all data. It should never be used without first using BACKUP.

The PACK database choice provides for the removal of deleted records. When records are deleted in the database, they are not physically removed, but rather tagged so that they are bypassed during normal processing. Therefore, such records require space in the database. While they are in this "tagged" state it is possible to restore the data—useful if records are deleted in error.

Periodically, you may wish to physically remove the records in the database that are "tagged" for deletion. A "1" in the "PACK" input item will physically remove all records tagged for deletion in the associated database. The space formerly occupied by the deleted records is now available for further additions. The deleted records can no longer be restored.

It is suggested that REINDEX be run in conjunction with "PACK" to ensure the INDEX is synchronized with the database.

4. Rate Tables And System Defaults

Certain values in the system 10 remain constant for a certain length of time, and then require modification. Interest rates and policy fees are such examples. It is desirable that such values do not have to be constantly inputted by the user, but should be the default which can be overridden temporarily by the user. To override such values permanently requires access to the databases where the default values are stored.

To perform the necessary calculations for illustrations in the system 10, a variety of rate tables are used. To allow maximum flexibility, the system allows these tables to be accessed and modified by the user, if required.

The system also has a set of default parameters for the system. These include Carrier Name, Interest Rate, Policy Fees. These may be modified in a similar manner to the Rate Tables.

To access these tables, choose the "DEFAULT/-RATE TABLES" option from the MASTER MENU (FIG. 13). The correct password must be entered to gain access to the DEFAULT/RATE TABLES MENU (FIG. 23).

This Menu lists all the tables currently used in the system that may be modified by the user.

Selection of a table displays the current values in the table. The values can now be modified. Once modified, the new values are used in all subsequent calculations. The various tables are shown in FIGS. 24-30.

5. Information For Proposal (IFP)

Considering now the necessary steps to enter proposal census data, perform the desired calculations, and print the final illustration, according to the basic data entry techniques described above, the COMPANY DATABASE UPDATE is initiated by selecting the "IFP Data Entry System" from the MASTER MENU (FIG. 13). The IFP Data Entry Menu to be displayed is illustrated in FIG. 31.

Selecting "COMPANY database Update" from this Menu causes the COMPANY HEADER SCREEN to be displayed (FIG. 32).

The user selects one of the options described on the COMPANY HEADER SCREEN (FIG. 32) to specify the COMPANY the user wishes to ADD/UPDATE. If the specified COMPANY is not already in the COMPANY database, a POP-UP MENU is displayed asking if the user wishes to ADD this COMPANY.

If the user does not specify a unique COMPANY, the COMPANY LIST screen is displayed (FIG. 33). One or more of the companies may be selected. If the desired COMPANY is not in the list, then pressing the "PgDn" key displays a POP-UP MENU (FIG. 34) that will allow browsing through the rest of the COMPANY names not shown on the current screen.

Once a COMPANY has been selected and is on the COMPANY database, the first of three COMPANY data entry screens is displayed (FIG. 35). The first screen is the COMPANY Name and Address screen, and data is entered into the input fields as desired.

If the user requires further information on a specific input item, the user places the cursor on the input item and presses the "F1" key. This invokes the system context sensitive HELP feature. A screen pops-up giving specific information on the current input item. Pressing any key at this point removes the HELP screen and enters the input item.

Certain input items have built-in edit checks—i.e. only certain values are allowed to be inputted into them. Once the cursor is on such an item, the user cannot move to any other input item until a valid entry has been made. If the user is on such a field and does not know which values are valid, pressing the "F1" key initiates the HELP screen. The valid values are shown on the HELP screen.

If during data entry, the user does not wish to enter any more input items—because the values in the remaining items already contain the desired values—pressing the "PgDn" key displays a POP-UP MENU (FIG. 36). It contains the available screens/menus the user can go to from the screen.

Selecting RE-EDIT, this screen on the POP-UP MENU of FIG. 36 simply re-displays the current screen and allows data to be entered.

Selecting IFP EMPLOYEE Counts on the POP-UP MENU of FIG. 36 displays 2nd COMPANY data entry screen as shown in FIG. 37 and allows data to be entered. Upon completion of data entry, a POP-UP MENU (FIG. 38) with corresponding choices is displayed.

Selecting IFP Annual Costs on the POP-UP MENU of FIG. 36 displays the third COMPANY data entry screen as shown in FIG. 39, and allows data to be entered. Upon completion of data entry, a POP-UP MENU (FIG. 40) with corresponding choices is displayed.

Selecting UPDATE EMPLOYEES on the POP-UP MENU of FIG. 36 allows existing EMPLOYEES for this COMPANY to be updated. The EMPLOYEE LIST SCREEN is displayed (FIG. 41) allowing EMPLOYEES to be selected for update.

If COMPANY does not have any EMPLOYEE data then the EMPLOYER HEADER screen is displayed (FIG. 42) to allow NEW EMPLOYEES to be added.

Selecting EXIT this screen on the POP-UP MENU of FIG. 36 returns to the SCREEN/MENU that displayed this screen. The system 10 keeps track of the MENUS and SCREENS that are displayed as the user moves through the various elements of the system 10. This option effectively allows the user to traverse backwards thru these MENUS and SCREENS.

An exception occurs if the user is processing Multiple COMPANIES—i.e. selected more than one from the COMPANY LIST SCREEN—in this case the first COMPANY screen for the next COMPANY to be processed is displayed.

Selecting Return to MENU allows the user to bypass the MENUS/SCREENS that preceded the current screen. It will return directly to the IFP Data Entry Menu (FIG. 31).

Upon completion of data entry, the user ultimately arrives back at the IFP Data Entry Menu shown in FIG. 31.

The EMPLOYEE DATABASE UPDATE option on the IFP Data Entry Menu of FIG. 31 provides for EMPLOYEE data to be added/updated without going to the COMPANY database. Selection of the "EMPLOYEE Database Update" choice form the MENU will display the EMPLOYEE HEADER SCREEN illustrated in FIG. 42.

The screen gives all the available options for specifying the way in which an EMPLOYEE may be selected. If an EMPLOYEE is not uniquely identified then the EMPLOYEE LIST SCREEN is displayed (FIG. 41). This screen lists EMPLOYEEs bases on the selection criteria specified. EMPLOYEEs may be selected for processing by placing a "1" next to them. If the desired EMPLOYEE is not shown on the current screen, the "PgDn" key will display a POP-UP MENU to allow browsing through the rest of the EMPLOYEE database.

Selection of an EMPLOYEE displays the EMPLOYEE screen (FIG. 43). This screen is used to capture information specific to the EMPLOYEE. Upon completion of data entry or by pressing the "PgDn" key, a POP-UP menu is displayed (FIG. 44) that provides several choices.

Selecting RE-EDIT this screen displays the EMPLOYEE screen (FIG. 43) and enables data entry.

Selecting EXIT this screen returns to the SCREEN/MENU that displayed this screen. The system 10 keeps track of the MENUS and SCREENS that are displayed as the user moves through the various elements of the system 10. This option effectively allows the user to traverse backwards thru these MENUS and SCREENS.

An exception occurs when processing Multiple EMPLOYEES—i.e. the user selected more than one from the EMPLOYEE LIST SCREEN—in this case the EMPLOYEE screen for the next EMPLOYEE to be processed is displayed.

Selecting Return to MENU returns directly to the IFP Data Entry Menu (FIG. 31).

Selecting PRINT IFP Report displays the COMPANY HEADER SCREEN (FIG. 32) to obtain the COMPANY for which the REPORT is to be printed. Multiple COMPANIES may be selected via the COMPANY LIST SCREEN (FIG. 33).

A POP-UP MENU is displayed asking if you wish to print the INFORMATION FOR PROPOSAL Report. A sample of the Report is shown in FIGS. 45-47.

Selecting Return to MASTER Menu returns to the system MASTER MENU, WITHOUT printing the report.

6. Calculations And Illustrations

Selecting the conversion option on the MASTER Menu (FIG. 13) allows calculations and illustrations to be printed for a specified COMPANY.

The COMPANY HEADER SCREEN (FIG. 16) is displayed to capture the COMPANY for whom the illustrations are to be performed.

Next the CONVERSION data entry screen (FIG. 48) is displayed. This screen is used to enter the assumptions that are to be made for this illustration.

Upon completion of data entry, the necessary calculations are performed and a POP-UP MENU displayed (FIG. 49) asking whether to print the illustration.

The illustration is simultaneously displayed on the screen as it is being printed out, and upon completion, the user is returned to the system MASTER menu (FIG. 13).

Selecting the EXIT SYSTEM to PC DOS option on the MASTER MENU (FIG. 13), or on other Major MENUS in this system returns the user directly to the PC operating system. This is the only way to properly exit the system, except when "ALT C" is used per FIG. 14. EXIT from the system by any other method is likely to cause loss of data or corruption of database indexes.

A sample of the illustration report produced, is shown in FIG. 4.

F. ESTABLISHING AND ADMINISTERING INSURANCE PLAN

The following is a description of the computer software and the hardware of the service computer for both establishing and administering the insurance plan. The description includes an operational description from the user's point of view.

1. Marketing Phase

Figure 54:
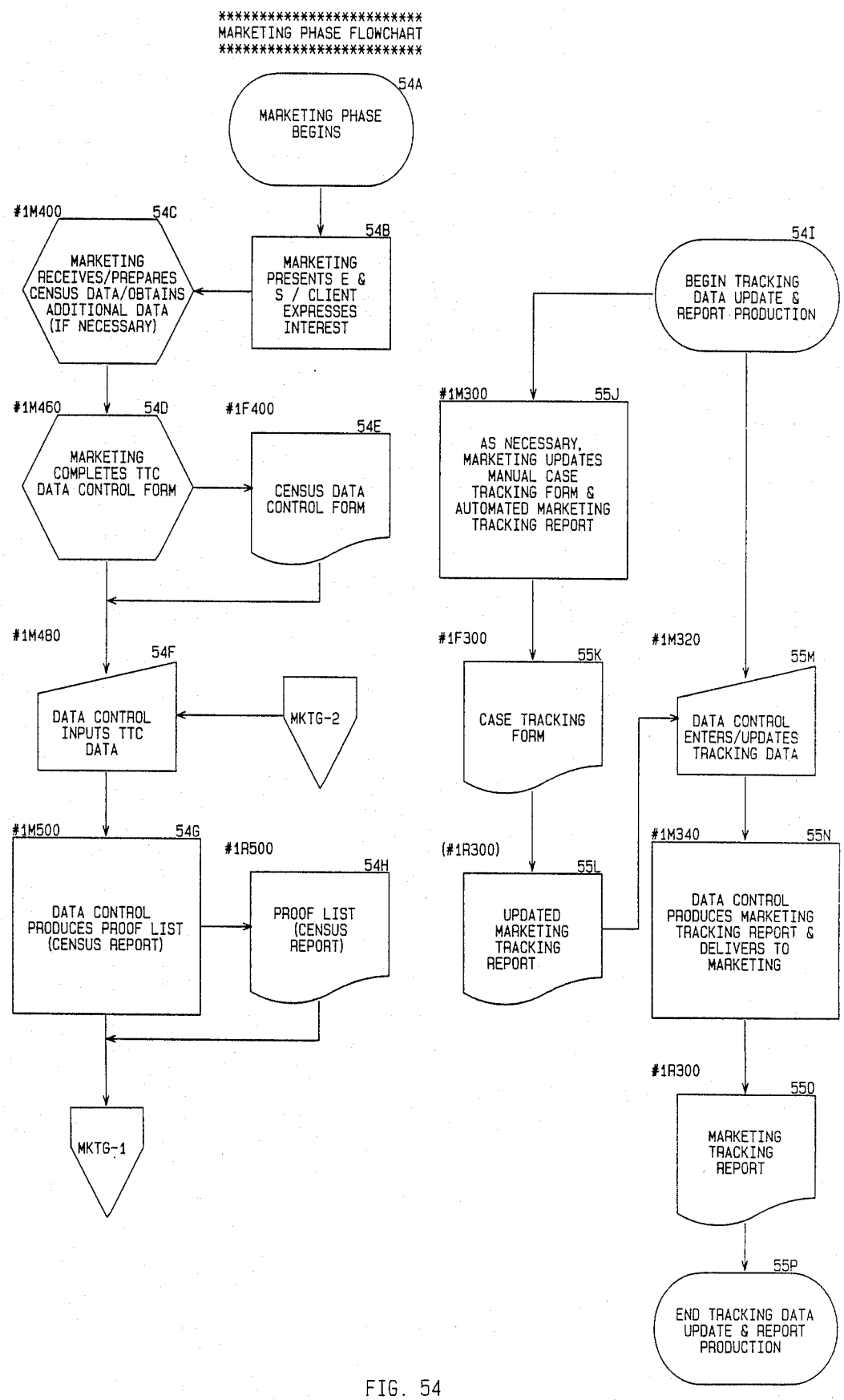
FIGS. 54-56 are flow charts of a computer program stored in the service computer of FIG. 2 for generating the necessary reports for the Marketing Phase of the insurance plan.
Figure 55:
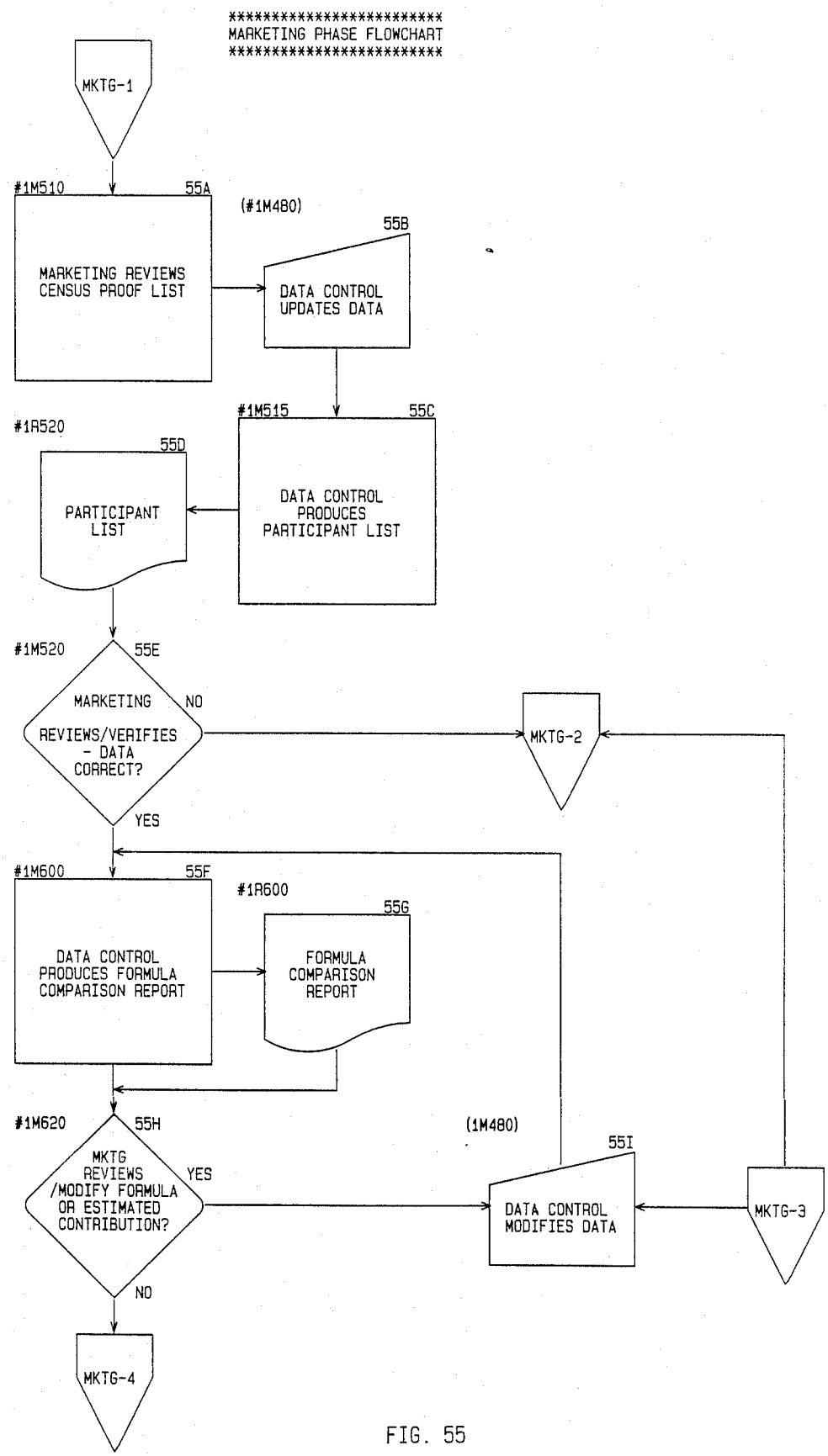
Figure 56:
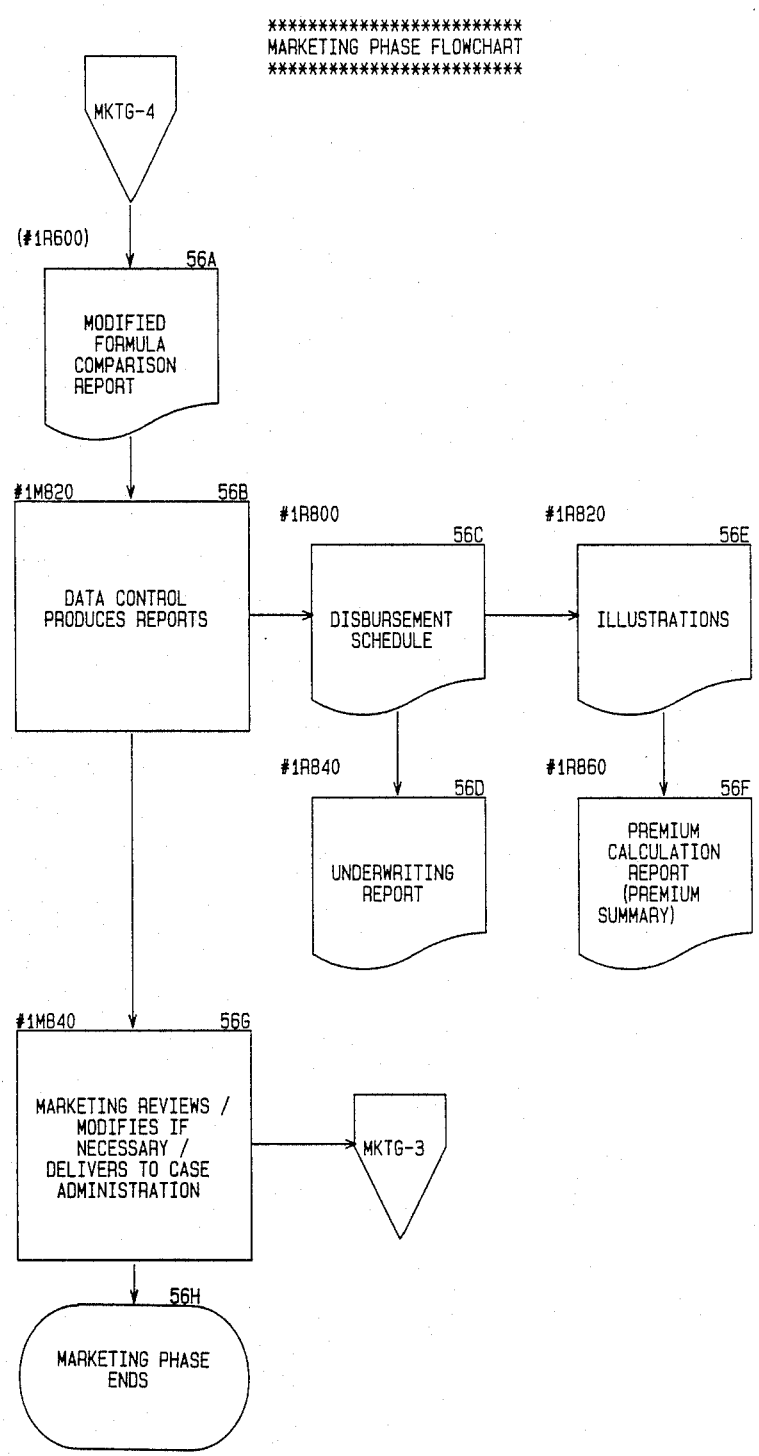

Referring now to FIGS. 54–56, there is shown flow charts for the computer program stored in the service computer for generating the necessary reports for the marketing phase of the insurance plan. The various reports are controlled and generated in the service computer, but either the service computer or a carrier computer can cause the report to be generated.

The system Marketing procedures primarily relate to the interaction within and between the Marketing and the MIS Departments of an insurance carrier required to produce the system production reports (Illustrations, Premium Calculations Report, Disbursement Schedule, and Underwriting Report). These procedures are initiated immediately following the receipt of client census data in the Marketing Department. Prior to this point, the Marketing Representative has presented the E&S and the client has signed a Retainer Agreement. A manual Case Tracking Form (FIG. 59) and automated Marketing Tracking Report are utilized throughout these procedures to ensure that inter-departmental information, required to produce the illustrations and associated reports is received, processed and forwarded accurately and expeditiously.

The census data is transcribed to the Census Data Control Form, and submitted to the MIS Data Control Operator. The MIS Data Control Operator enters this information into the system Database and generates a Census Proof List. The Marketing staff reviews the proof list for possible changes and, if necessary, returns the corrected Proof List to the MIS Data Control Operator.

If there are no corrections required to the Proof List, the MIS Data Control Operator generates the Participant List and forwards this list to the Marketing Department for review. The Marketing staff reviews the participant list for possible changes and, if necessary, returns the corrected participant list to the MIS Data Control Operator. If there are no modifications required to the participant list, the MIS Data Control Operator runs the Formula Comparison Report.

The Marketing Representative reviews the Formula Comparison Report and either identifies (annotates) the appropriate formula or modifies the Target Contribution. There is also a possibility at this procedural phase that the Marketing Representative may make changes to the Participant data and the procedure flow re-enters at a previous procedural step.

If there are no modifications, the formula comparison report is returned to the MIS Data Control Operator for the production of the Illustrations, Premium Calculations, Disbursement Schedule, and Underwriting Reports.

The MIS Data Control Operator forwards the Illustrations, Premium Calculations, Disbursement Schedule, and Underwriting Reports to the Marketing Department of the insurance carrier. The Marketing Staff reviews the reports and, if changes are necessary, returns them to the MIS Data Control Operator for a rerun or if no modifications are required, forwards the reports to the Case Administration and Accounting Departments. The Conversion Marketing procedures, as they relate to the interaction between the Marketing Department and the MIS Department are complete.

Referring now to FIG. 54, the marketing phase software commences execution at 54A, and as indicated at 54B, the Marketing Representative has presented the E&S report and the Client has signed a Retainer Agreement. As indicated at 54C, the census data is received and, if necessary, the Client is contacted for additional information. Following this procedure, the census data is transcribed to the Census Data Control Form and this form is submitted to the MIS Data Control Operator.

The Executive Marketing/Sales Coordinator receives census data from the Client, reviews for completeness and clarity, and then forwards the information to the Marketing Assistant. The Marketing Assistant then enters the receipt date for the Marketing Tracking Report. If not identified, the Marketing Assistant requests the Client Key Employee identification from the Marketing Representative or the Client. If necessary, the Marketing Assistant obtains additional data from either the Marketing Representative or the Client.

The Marketing Tracking Report is generated, as indicated in FIG. 57.

After preparing the census data report, as indicated at 54D, the Census Data Control Form is generated.

Figure 58:
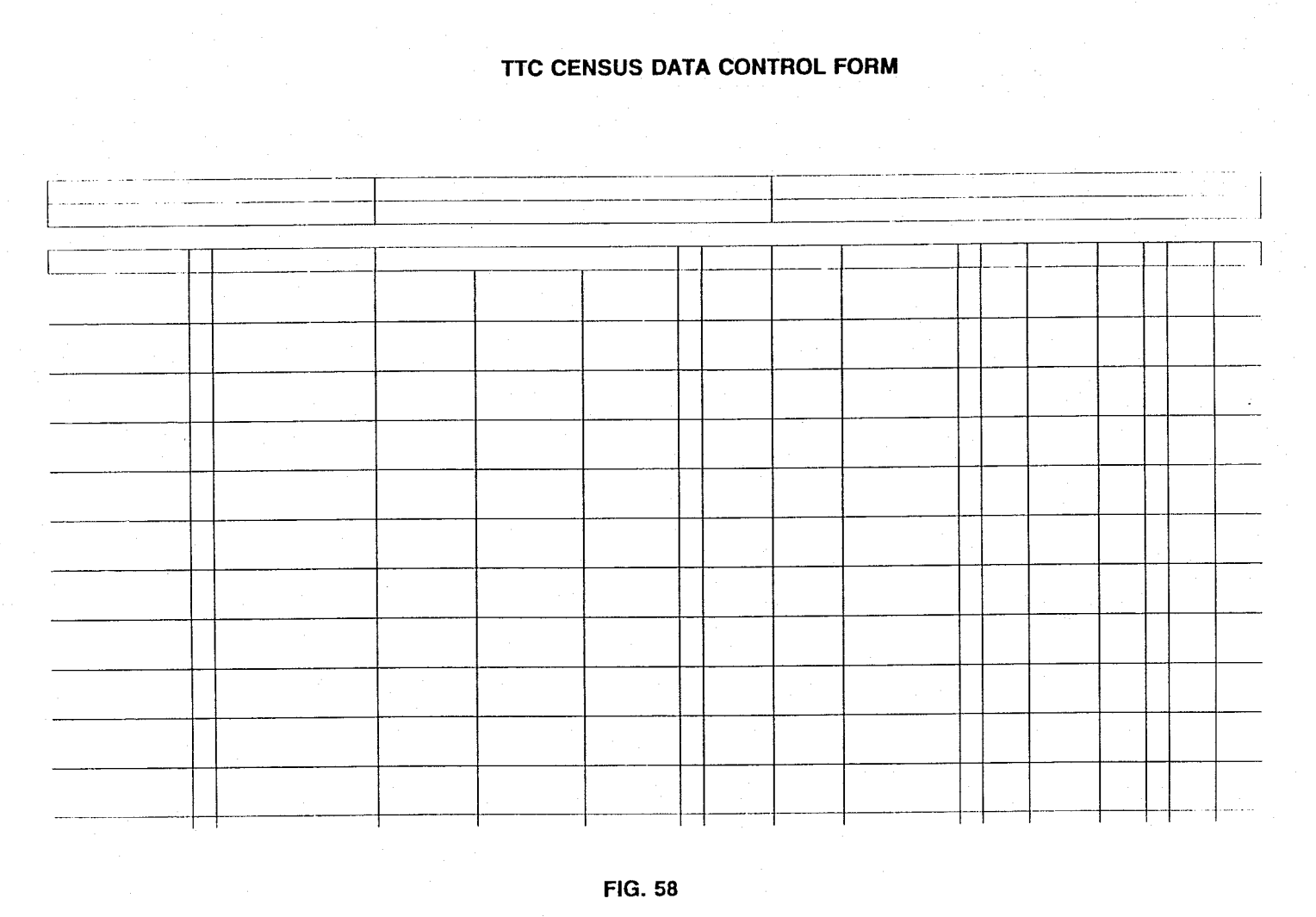

As indicated at 54D, the Executive Marketing/Sales Coordinator and the Marketing Assistant transcribe the census data submitted by the Client and forward the completed Census Data Control Form illustrated in FIG. 58 to the MIS Data Control Operator for entry into the data base.

The Marketing Assistant transcribes the following census data:

Company Database Number—The Marketing Assistant should query the computer database using the company name to determine this field. This field may be left blank if not found in the database (the Data Control Operator will then complete);

Company Legal Name—The legal entity that will own the contract should be entered here. It must be the full legal name (i.e., XYZ Corporation, Inc., Money Purchase Pension Trust, or San Diego Trust & Savings Bank, as Trustee for XYZ Company, Employees' Welfare Benefit Trust Number 1001001);

Enter the individual's 1st, , Middle Initial and Last Name;

Compensation—Enter the Wage, Bonus and/or Miscellaneous amounts in the following format: 9999999.99 as applicable;

Sex—Enter M or F;

Birthdate—Enter Month, Day and Year in this format: MMDDYY (i.e., 1/15/87);

Hire Date—Same format as Birthdate;

Social Security Number—Enter in following format: xxx- xx-xxxx; and

System Participant—Enter a Y or N as applicable.

After the Marketing Assistant submits the Client data and Census Data Control Form to the Executive Marketing/Sales Coordinator, the Executive Marketing/Sales Coordinator ensures that the Estimated Contribution, Rate, Class Factor, Class Code, Special, Flat Extra Amount and Flat Extra Years fields are accurate and transcribed.

Definitions

Estimated Contribution: This number must be the exact amount of money that the client is going to send to the insurance company for the premium. It may not be a range, and it is preferable not to have any guesswork here. The reason being is that all reports and computer calculations and illustrations are based on this number, and if it is incorrect, all the illustrations and computer reports will be incorrect.

Rate: If the client is standard or in good health, or if it is not certain, the rate code should equal "S". If the client is completely uninsurable, and this is known—not just a guess—the rate should be "U". If the client has had previous ratings on an insurance contract issued within the last six months, and you know what this rating is (for example, Table II or Table IV), then the rate would be equal to an alphabetical translation of the Table number (i.e., Table I=A, Table II=B, Table III=C, Table IV=D, etc.).

Class Factor: Per the Nondiscrimination Rules, the most discriminatory class factors we can have are a factor of 2½ times between each class and the bottom class being no less than 10% of the top class. Class factors are constructed with the assumption that class code "1" equals class factor 1.00, class code "2" equals class factor 0.40, class code "3" equals class factor 0.10. In this case, class factors two, three and four are adjustable upwards but cannot be any lower than as listed. In the case where there are only two classes of individuals, again, the second class may not be more than a factor of 2½ times less than the first, so the most discriminatory factor can only be one equals 1.00, and two equals 0.40. Therefore, the required field format to be entered is: 1.00, .40, .16, or .10.

Class Code: The Class Code is determined by position and should be entered as follows:

1 Owners and Directors
2 Managers and Supervisors
3 Technicians and Other Salaries
4 All other Special: This is a yes o no (Y or N) field. Enter a "Y" in this column if the individual is supposed to convert to the special term product and receive dividends. If they are not, put an "N" in this field.

Flat Extra Amount and Flat Extra Years: Do not enter data here unless within the last six months, the employee has been rated and has been charged a flat extra amount for some other insurance. The required field format to be entered is: Flat Extra Amount=999.99 and Flat Extra Years= Enter number of years that the Flat Extra Amount must be paid.

The Executive Marketing/Sales Coordinator then returns the Census Data Control Form (FIG. 58) to the Marketing Assistant, and the Marketing Assistant forwards the Census Data Control Form (FIG. 58) to the MIS Dat Control Operator and enters the forwarding date on the Marketing Tracking Report shown in FIG. 57.

After completion of the Census Data Control Form, as indicated at 54D, data is added to the Company and Census Tables in order to set the individual and company up as a client.

As indicated at 54F, the Database Administration department is the only department that adds data to the system database. Currently, the information that is required to set up a client and an individual in the system database is acquired from the Marketing department in the form of the Census Data Control Form shown in FIG. 58.

The procedure for entering data into the service computer, is accomplished as set forth in the following table:

1. From the c:prompt; change directories to the service computer.
2. Press the Enter key to shift the cursor to the next field.
3. At the CCI prompt type in ILL.
4. Press the Enter key to shift the cursor to the next field.
5. A system menu will appear.
6. Select Master Company by using the arrow keys and moving the cursor over the word "Master Company".
7. Press the Enter key.
8. The Preliminary Company Information screen will appear. Enter the data for the companyf, prosclient, and the TTCPC Tables by following the instruction on "How To Enter/Add Data To The Companyf, Prosclient, and TTC tables".
9. Press "E" to exit and this will return you to the menu.
10. Select option Census by using the arrow keys and moving the cursor over the word "Census".
11. Press the Enter key.
12. The Individual Census screen will appear. Enter the data into the Name, Censusf, and Censusttc Tables, following the instructions on "How To Enter Data Into The Name, Censusf, and Censusttc Table".
13. The data entry portion of the Census Data Control Form is now completed.
14. Press "E" to exit. This will return you to the menu.

After entering the data control inputs into the service computer, as indicated at 54F, a Census Proof List is generated and is returned to Marketing to sign off that the data that was entered wa correct.

As indicated at 54G, the Data Base Administration department adds data to the Data Base. Once the Census Proof List as generally shown in FIG. 60, has been run by the Data Control Operator, the Census Proof List is then given to the Executive Sales Coordinator to make changes or approve the list. At the bottom of the Proof List are small boxes that the Marketing Department will initial to indicate the following:

(1) changes have been made - please make changes and print another Proof List; or (2) everything looks good - please run the Formula Comparison Report.

The procedure for generating the Proof List is accomplished as set forth in the following table:

1. Select Print a Census Proof List by using the arrow key and moving the cursor over the word "Print a Census Proof List".
2. Press the Enter key.
3. A prompt will appear requesting "Enter company reference number that you wish this Census Proof List To Be Run For=".
4. Enter the Company Reference Number (from the Company table) that you want the Census Proof List to be run for. The program will produce a list of census data for a certain company.
5. Press the "ENTER" key.
6. The Census Proof List is produced as indicated at 54H, and the Data Control Operator gives the report to the Executive Marketing/Sales Coordinator for approval or changes.

Referring now to FIG. 55, and after the Census Proof List is generated, as indicated at 54H, the Census Proof List is reviewed by Marketing to be resubmitted to the MIS Data Control Operator, if necessary.

As indicated at 54G, the Client census data was transcribed to the Census Data Control Form (FIG. 58), and forwarded to the MIS Data Control Operator. The census data was entered into the database, a Census Proof List generated at 54H, and delivered to the Marketing Department. The Proof List is then reviewed and changes thereto are made if necessary. The Proof List (FIG. 60) is then returned to the MIS Data Control Operator for further processing.

The procedure for reviewing the Census Proof List is accomplished as set forth in the following table:

1. The Executive Marketing/Sales Coordinator receives the Census Proof List from the MIS Data Control Operator, annotates the receipt date on the Marketing Tracking Report, compares the Proof List to the original source data, annotates on the Proof List any changes (particular attention is directed to the critical fields Estimated Contribution, New Participant, and Special) and forwards the Proof List to the Marketing Assistant.
2. The Marketing Assistant compares the Proof List to the original source data and annotates any changes. The Marketing Assistant will check the appropriate box on the Proof List to indicate whether or not changes were made at this time or by the Executive Marketing/Sales Coordinator and return the Proof List to the MIS Data Control Operator.
3. The Marketing Assistant annotates the Proof List forwarding date on the Census Tracking Form and the Marketing Tracking Report.

After the Census Proof List is reviewed at 55A, new Data Control updates are inputted in the service computer for updating the existing Data Control, as indicated at 55B.

The procedure for adding a New Company To The CompanyF Table is accomplished as set forth in the following table:

1. To make sure that the company is not already in the CompanyF Table:
   1.01 Type q to select the Query option, and then type the company's name in the company name field.
   1.02 To initiate the search, press the ESC key.
   1.03 If there are not records located with the Queried company's name. Perform displays:
   "No records found"
2. To add the company to the CompanyF Table:
   2.01 Type a to select the Add option. Perform displays the Add menu and the cursor moves into the first field on the CompanyF Form (Exhibit I).
   2.02 Enter the data you want to add into the first field on the form. (Company Name.) Use the legal company name.
   2.03 Press the enter key to shift the cursor to the next field.
   2.04 Enter the data you want to add into the next field on the form. (Address line one). Enter the street number and the avenue of the company. Please type out all words, such as Boulevard, Street, Avenue, etc. No abbreviations please.
   2.05 Press the Enter key to shift the cursor to the next field.
   2.06 Enter the data you want to add into the next field on the form. (Address line 2). Enter the Suite and Suite number for the company. No abbreviations please.
   2.07 Press the Enter key to shift the cursor to the next field.
   2.08 Enter the data you want to add into the next field on the form. (City). Enter the City name that the company resides in.
   2.09 Press the Enter key to shift the cursor to the next field.
   2.10 Enter the data you want to add into the next field on the form. (State). Enter the State (2 Characters) abbreviation that the company resides in.
   2.11 Press the Enter key to shift the cursor to the next field.
   2.12 Enter the data you want to add into the next field on the form. (Zip Code). You will notice that there is room for an extended zip code number (13 digits), but this field does not require all 13 digits.
   2.13 Press the Enter key to shift the cursor to the next field.
   2.14 Enter the data you want to add into the next field on the form. (Telephone number). Automatic dashes appear so that you need only enter the area code and telephone number.
   2.15 Press the Enter key to shift the cursor to the next field.
   2.16 Enter the data you want to add into the next field on the form. (Facsimile number). Automatic dashes appear so that you need only enter the area code and facsimile number.
   2.17 Press the Esc key to add the new row of data to the table. (CompanyF Table).

The procedure for adding a New Company To The Prosclient Table is accomplished as set forth in the following table:

1. A master - detail relationship, one table is the master table, and the other is the detail table. You use the MASTER and DETAIL options to switch between tables and to conduct automatic data base Queries.

2. The CompanyF Table is the master of the Prosclient Table. The Prosclient Table is a detail of the CompanyF Table.
3. From the CompanyF Table (Master).
   3.01 Type d to select the Detail Table (prosclient) and initiate the search.
   3.02 While conducting the search Perform displays: "Searching..."
   3.03 Then indicates the results of the Queries: "4 row(s) found."
4. If you use the DETAIL option when no Detail Table (prosclient) exists for the company, Perform displays: "There are no rows satisfying the conditions."
5. To add the company to the Prosclient Table. (Exhibit I):
   5.01 Type a to select the Add option. Perform displays the Add menu and the cursor moves into the first field on the Prosclient Form.
   5.02 Enter the data you want to add into the first field on the form (Contact person). Enter the contact person's reference number (from the name table). The contact person's name will display on the form as soon as you press the Enter key.
   5.03 Press the Enter key to move the cursor to the next field.
   5.04 Enter the data you want to add into the first field on the form (Corporate attorney). Enter the Corporate Attorney's reference number (from the name table). The Corporate Attorney's name will display on the form as soon as you press the Enter key.
   5.05 Press the Enter key to shift the cursor to the next field.
   5.06 Enter the data you want to add into the first field on the form (Corporate CPA). Enter the Corporate CPA's reference number (from the name table). The Corporate CPA's name will display on the form as soon as you press the Enter key.
   5.07 Press the Enter key to shift the cursor to the next field.
   5.08 Enter the data you want to add into the first field on the form (Corporate FYE). Enter the Corporate fiscal year-end as month month/day day/, e.g., 12/31.
   5.09 Press the Enter key to shift the cursor to the next field.
   5.10 Enter the data you want to add into the first field on the form (Type of Business). Enter the kind of business that this company is, e.g., Auto Dealer.
   5.11 Press the Enter key to shift the cursor to th next field.
   5.12 Enter the data you want to add into the first field on the form (Definition of Full-time). This is a 3-digit field that indicates the number of hours of work required by this company to determine full-time employment.
   5.13 Press the Enter key to shift the cursor to the next field.
   5.14 Enter the data you want to add into the first field on the form (SIC Code). You will need to review the SIC Code list and from the type of business that you entered in the "Type of Business" field, figure out what this company's SIC Code is.
   5.15 Press the Enter key to shift the cursor to the next field.
   5.16 Enter the data you want to add into the first field on the form (Closely/Public). Enter either "P" for Publicly-held Corporation or "C" for Closely-held Corporation.
   5.17 Press the Enter key to shift the cursor to the next field.
   5.18 Enter the data you want to add into the first field on the form (Regular/Sub S). Enter either "R" for Regular or "S" for Sub Chapter S.
   5.19 Press the Enter key to shift the cursor to the next field.
   5.20 Enter the data you want to add into the first field on the form (Accounting/Basis). Enter either "A" for Accounting or "B" for Basis.
   5.21 Press the Enter key to shift the cursor to the next field.
   5.22 Enter the data you want to add into the first field on the form (State Organization Number). Enter the 9-digit State Organization Number. Notice that the dash is automatically generated.
   5.23 Press the Enter key to shift the cursor to the next field.
   5.24 Enter the data you want to add into the first field on the form (Federal Employer Identification Number). Enter the 9-digit Federal Employer Identification Number. Notice that the dash is automatically generated.
   5.25 Press the ESC key to add the new row of data to the Table (Prosclient Table).

The procedure for adding a New Company To The TTCPC Table is accomplished as set forth in the following table:
1. The TTCPC Table is a detail of the Prosclient Table. The Prosclient Table is the master of the TTCPC Table.
2. From the Prosclient Table (master).
   2.01 Type d to select the detail table (TTCPC) and initiate the search.
   2.02 While conducting the search perform displays: "Searching . . . "
   2.03 Then indicates the results of the querys: "4 row(s) found"
3. If you use the detail option when no detail table (TTCPC) exists for the company, perform displays: "There are no rows satisfying the conditions"
4. To add the company to the TTCPC Table: (Exhibit I):
   4.01 Type a to select the add option. Perform displays the add menu and the cursor moves into the first field on the TTCPC form.
   4.02 Enter the data you want to add into the first field on the form. (Carrier number). Skip over this field for now.
   4.03 Press the Enter key to shift the cursor to the next field.
   4.04 Enter the data you want to add into the next field on the form. (TTC status). Enter an "S" for Suspenct, "P" for Prospect, or "C" for Client.
   4.05 Press the Enter key to shift the cursor to the next field.
   4.06 Enter the data you want to add into the next field on the form. (Effective date). Enter the effective date as MM/DD/YY (i.e., 12/31/87). Notice that the slashes are automatically generated.
   4.07 Press the Enter key to shift the cursor to the next field.
   4.08 Enter the data you want to add into the next field on the form. (Estimated contribution). Estimated contribution is a nine digit field from 9999999.99 to default=.00. Please enter the estimated contribution as given to you from Marketing.

4.09 Press the Enter key to shift the cursor to the next field.

4.10 Enter the data you want to add into the next field on the form. (Estimated closing date). Enter the estimated closing date as a MM/DD/YY (i.e., 12/31/87). Notice that slashes are automatically generated.

4.11 Press the Esc key to add the new row of data to the Table (TTCPC).

The procedure for adding a New Individual To The Name Table is accomplished as set forth in the following table:

1. To make sure that individual name is not already in the Name Table:
    1.01 Type q to select the Query option, and then type the individuals last name in the last name field.
    1.02 To initiate the search, press the ESC key.
    1.03 If there are not records located with the Queried last name field. Perform displays:
    "No records found"
2. To add the individual name to the Name Table (Exhibit I).
    2.01 Type a to select the Add option. Perform displays the Add menu and the cursor moves into the first field on the Name Table.
    2.02 Enter the data you want to add into the first field on the form. (First, Middle, and Last Name).
    2.03 Press the Enter key to shift the cursor to the next field.
    2.04 Enter the data you want to add into the next field on the form. (Company Number). Enter the company reference number (from the company table). The company name and address will be displayed on the form as soon as you press the Enter key.
    2.05 Press the Enter key to shift the cursor to the next field.
    2.06 Press the Esc key to add the new row of data to the table. (Name Table).
    2.07 Enter the data you want to add into the next field on the form. (Address line 2). Enter the Suite and Suite number for the company. No abbreviations please.
    2.08 Press the Enter key to shift the cursor to the next field.
    2.09 Enter the data you want to add into the next field on the form. (City). Enter the City name that the company resides in.
    2.10 Press the Enter key to shift the cursor to the next field.
    2.11 Enter the data you want to add into the next field on the form. (State). Enter the State (2 Characters) abbreviation that the company resides in.
    2.12 Press the Enter key to shift the cursor to the next field.
    2.13 Enter the data you want to add into the next field on the form. (Zip Code). You will notice that there is room for an extended zip code number (13 digits), but this field does not require all 13 digits.
    2.14 Press the Enter key to shift the cursor to the next field.
    2.15 Enter the data yo want to add into the next field on the form. (Telephone number). Automatic dashes appear so that you need only enter the area code and telephone number.
    2.16 Press the Enter key to shift the cursor to the next field.
    2.17 Enter the data you want to add into the next field on the form. (Facsimile number). Automatic dashes appear so that you need only enter the area code and facsimile number.
    2.18 Press the Esc key to add the new row of data to the table. (CompanyF Table).

The procedure for adding a New Individual To The Censusf Table is accomplished as set forth in the following table:

1. A master - detail relationship, one table is the master table, and the other is the detail table. You use the MASTER and DETAIL options to switch between tables and to conduct automatic data base Queries.
2. The Name Table is the master of the Censusf Table. The Censusf Table is a detail of the Name Table.
3. From the Name Table (Master):
    3.01 Type d to select the Detail Table (Censusf) and initiate the search.
    3.02 While conducting the search Perform displays: "searching..."
    3.03 Then indicates the results of the Queries: "4 row(s) found."
4. If you use the DETAIL option when no Detail Table (Censusf) exist for the Master (Name), Perform displays:
    "There are no rows satisfying the conditions."
5. To add the company to the Censusf Table. (Exhibit I).
    5.01 Type a to select the Add option. Perform displays the Add menu and the cursor moves into the first field on the Censusf Form.
    5.02 Enter the data you want to add into the first field on the form (Social Security Number). Enter the social security number as 000-00- 0000. Notice that the dashes are automatically generated.
    5.03 Press the Enter key to shift the cursor to the next field.
    5.04 Enter the data you want to add into the next field on the form (Sex). Enter either M for Male or F for Female.
    5.05 Press the Enter key to shift the cursor to the next field.
    5.06 Enter the data you want to add into the next field on the form (Date of Birth). Enter the Date of this individuals birth in mm/dd/yy format. (i.e., 12/31/65).
    5.07 Press the Enter key to shift the cursor to the next field.
    5.08 Enter the data you want to add into the next field on the form (City). Enter the name of the city that this individual was born in. If this is a resident alien use this field to enter the city and country of birth.
    5.09 Press the Enter key to shift the cursor to the next field.
    5.10 Enter the data you want to add into the next field on the form (State). Enter the state abbreviation that this individual was born in.
    5.11 Press the Enter key to shift the cursor to the next field.
    5.12 Enter the data you want to add into the next field on the form (Keyman). Enter a Y for Yes this is a keyman for this company or N for No this is not a keyman for this company. Default is N.
    5.13 Press the Enter key to shift the cursor to the next field.
    5.14 Enter the data you want to add into the next field on the form (Union/Non Union). Enter a Y for Yes this is a union employee or N if this is a Non union employee. Default is N.

5.15 Press the Enter key to shift the cursor to the next field.

5.16 Enter the data you want to add into the next field on the form (Seasonal). Enter either Y for Yes this is a seasonal employee or a N for No this is not a seasonal employee. Default is N.

5.17 Press the Enter key to shift the cursor to the next field.

5.18 Enter the data you want to add into the next field on the form (Resident/Alien). Enter either Y for Yes this is a resident alien or N for No this is not a resident alien. Default is N.

5.19 Press the Enter key to shift the cursor to the next field.

5.20 Enter the data you want to add into the next field on the form (Hire Date). Enter the date that this individual was hired within the company. Use mm/dd/yy format. i.e., 12/31/85. Either "A" for Accounting or "B" for Basis.

5.21 Press the Enter key to shift the cursor to the next field.

5.22 Enter the data you want to add into the next field on the form (Full/Part). Enter either F for Full Time or P for Part Time. Default is F.

5.23 Press the Enter key to shift the cursor to the next field.

5.24 Enter the data you want to add into the next field on the form (Owner). Enter a Y for Yes this is the owner of the company of N for No this is not the owner of the company. Default is N.

5.25 Press the Enter key to shift the cursor to the next field.

5.26 Enter the data you want to add into the next field on the form (President). Enter a Y for Yes this is the president of the company or N for No this is not the president of the company. Default is N.

5.27 Press the Enter key to shift the cursor to the next field.

5.28 Enter the data you want to add into the next field on the form (Owner). Enter a Y for Yes this is the owner of the company or N for No this is not the owner of the company. Default is N.

5.29 Press the Enter key to shift the cursor to the next field.

5.30 Enter the data you want to add into the next field on the form (Committee Member). Enter a Y for Yes this is the Veba Committee Member of the company or N for No this is not the Veba Committee Member of the company. Default is N.

5.31 Press the Enter key to shift the cursor to the next field.

5.32 Enter the data you want to add into the next field on the form (Board Director). Enter a Y for Yes this is the corporate board director of the company or N for No this is not a corporate board director of the company. Default is N.

5.33 Press the Enter key to shift the cursor to the next field.

5.34 Enter the data you want to add into the next field on the form (Secretary). Enter a Y for Yes this is the Secretary of the company or N for No this is not the Secretary of the company. Default is N.

5.35 Press the Enter key to shift the cursor to the next field.

5.36 Enter the data you want to add into the next field on the form (Trustee). Enter a Y for Yes this is a Veba Trustee of the company or N for No this is not a Veba Trustee of the company. Default is N.

5.37 Press the Enter key to shift the cursor to the next field.

5.38 Enter the data you want to add into the next field on the form (Wage). Enter this individuals annual wage using #######.## format. Default is 0.00.

5.39 Press the Enter key to shift the cursor to the next field.

5.40 Enter the data you want to add into the next field on the form (Bonus). Enter this individuals annual bonus using #######.## format. Default is 0.00.

5.41 Press the Enter key to shift the cursor to the next field.

5.42 Enter the data you want to add into the next field on the form (Misc Income). Enter this individuals misc. annual income using #######.## format. Default is .00.

5.43 Press the Enter key to shift the cursor to the next field.

5.44 Press the ESC key to add the new row of data to the Table (Censusf Table).

The procedure for adding a New Individual To The CensusTTC Table is accomplished as set forth in the following table:

1. The Censusttc Table is a detail of the Censusf Table. The Censusf Table is the master of Censusttc Table.
2. From the Cesusft Table (Master):
    2.01 Type d to select the detail table (Censusttc) and initiate the search.
    2.02 While conducting the search perform displays: "Searching..."
    2.03 Then indicates the results of the querys: "4 row(s) found"
3. If you use the detail option when no detail table (Censusttc) exist for the individual, perform displays: "There are no rows satisfying the conditions"
4. To add the individual to the Censusttc Table: (Exhibit I):
    4.01 Type a to select the add option. Perform displays the add menu and the cursor moves into the first field on the Censusttc Form.
    4.02 Enter the data you want to add into the first field on the form. (Executive Override). Skip over this field for now.
    4.03 Press the Enter key to shift the cursor to the next field.
    4.04 Enter the data you want to add into the next field on the form. (Participant). Enter a "Y" for Yes this is a Participant or "N" this is not a Paricipant. Default is N. (A participant is an individual that Mkt has chosen to be illustration individual).
    4.05 Press the Enter key to shift the cursor to the next field.
    4.06 Enter the data you want to add into the next field on the form. (Class Code). Enter either a 1, 2, 3, or 4 into this field, Default is 1.
    4.07 Press the Enter key to shift the cursor to the next field.
    4.08 Enter the data you want to add into the next field on the form. (Special). Enter either a Y for Yes this individual is special or N for No this individual is not special. Default is N. Mktg will select if this individual is special or not.
    4.09 Press the Enter key to shift the cursor to the next field.

4.10 Enter the data you want to add into the next field on the form. (TTC Rating). Enter the Table rating that this individual is. Default is S for Standard. Mktg. will select each individuals Table rating.

4.11 Press the Enter key to shift the cursor to the next field.

4.12 Enter the data you want to add into the next field on the form. (Flat Extra). Enter the dollar amount of any temporary flat extra premiums. Default is .00. Mktg. will select this information for you.

4.13 Press the Enter key to shift the cursor to the next field..

4.14 Enter the data you want to add into the next field on the form. (Flat Extra Years). Enter the number of years that flat extra must be paid. Default is .00. Mktg. will select this information for you.

4.15 Press the Esc key to add the new row of data to the Table (Censusttc).

After completion of the Data Control updates, as indicated at 55B, a Participant List is generated at 55D. As indicated at 55C, the Data Base Administration departmernt adds data to the Data Base.

The procedure for generating a Participant List such as the one shown in FIG. 61 is accomplished as set forth in the following table:

1. Select Print a Participant List by using the arrow key and moving the cursor over the word "Print a Census Proof List."
2. Press the Enter key.
3. A prompt will appear requesting "Enter company reference number that you wish this Census Proof List (FIG. 60) To Be Run For=."
4. Enter the company reference number (from the Company Table) that you want the Census Proof List to be run for. The program will produce a list of census data for a certain company.
5. Press the "ENTER" key.
6. The Census Proof List is produced and the Data Control Operator is to be given to the Executive Marketing/Sales Coordinator for approval or changes.

After the Participant List is generated at 55D, the Participant List (e.g. FIG. 61) is reviewed and verified; and if there are no changes the MIS Data Control Operator is notified to run the Formula Comparison Report.

The Census Proof List (FIG. 60) is reviewed and submitted to Data Control for corrections and production of the Participant List at 55C. If there are no changes to be made subsequent to the review of the Participant List, the Executive Marketing/Sales Coordinator will request the MIS Data Control Operator to run the Formula Comparison Report. If modifications are made, then the Marketing Assistant will annotate the changes on the Participant List and return it to the MIS Data Control Operator for reprocessing.

The procedure for reviewing the Participant List, such as the one illustrated in FIG. 61 is accomplished as set forth in the following table:

1. The executive Marketing/Sales Coordinator receives the Participant List from the MIS Data Control Operator, annotates the receipt date onto the Marketing Tracking Report, reviews and makes any necessary modifications on the list and forwards the list to the Marketing Assistant.
2. The Marketing Assistant annotates any changes on the list. If there are no changes made by either the Executive Marketing/Sales Coordinator or the Marketing Assistant, then the Marketing Assistant will notify the MIS Data Control Operator to run the Formula Comparison Report. If changes have been made by Marketing, then the Marketing Assistant will forward the annotated Participant List to the MIS Data Control Operator for reprocessing.
3. The Marketing Assistant will annotate the appropriate forwarding date onto the Case Tracking Form and Marketing Tracking Report.

After the Participant List is reviewed and verified at 55E, then Data Control generates a Formula Comparison Report at 55F. Once the Participant Proof List has been returned from the Marketing Department with the bottom of the Participant List marked off as (1) Changes have been made, please make changes, or (2) Everything looks good, please run a Formula Comparison Report, then the Data Control Operator will be ready to run the Formula Comparison Report, or to produce another Participant Proof List until it is OK to run the Formula Comparison Report.

The procedure for generating a Formula Comparison Report at 55G, such as the Report illustrated in FIG. 62, is accomplished as set forth in the following table:

1. From the Main Menu
2. Select "Marketing Reports" by using the arrow key and moving the cursor over the words "Marketing Reports."
3. Press the Enter key.
4. From the Marketing Reports Menu
5. Select "Formulas" by using the arrow key and moving the cursor over the word "Formulas" .
6. Press Enter key.
7. A prompt will appear requesting, "Enter Company Reference Number for Data extracts."
8. Enter the company reference number, (from the company table) that you want the Formula Comparison Report to be run for.
9. Press Enter key.
10. Another prompt will appear requesting "Enter Benefit to Premium ratio to be used for formula assumptions 'A' through 'D'".
11. Enter the number "2." Press Enter key.
12. The Formula Comparison Report for the client you have just chosen will begin to print on the Laser Jet printer. Warning: Please make sure the Laser Jet printer is turned on and ready with paper, and not the dot matrix printer.
13. Once the Formula Comparison Report has been run, it is given to the Marketing Department so they can choose the formula to be used for this client's illustration.

After the Formula Comparison Report is generated at 55G, Marketing reviews the Formula Comparison Report, and selects the appropriate formula code. A formula is then selected for the Client and Data Control reports are generated at 56B.

The MIS Data Control Operator delivers the Comparison Report to Marketing. The Executive Marketing/Sales Coordinator then annotates the receipt date onto the Case Tracking Form and Marketing Tracking Report, then submits the Formula Comparison Report to the Marketing Sales Representative The Marketing Sales Representative then reviews the report and either annotates the appropriate formula or modifies the Estimated Contribution. The Marketing Representative returns the report to the Executive Marketing/Sales Coordinator.

As illustrated at 56A, the Executive Marketing/Sales Coordinator returns the Formula Comparison Report to the MIS Data Control Operator for production of varous reports, at 56C–56F, such as Illustrations (FIGS. 63–67), Premium Calculation (FIGS. 68A, 68B), Disbursement Schedule (FIGS. 69A, 69B), and Underwriting Reports (FIG. 70), or as illustrated at 55I, if a modification to the Estimated Contribution was made, a rerun of the Formula Comparison Report will be requested. The Executive Marketing/Sales Coordinator enters the forwarding date onto the Case Tracking Form and Marketing Tracking Report.

The procedure for producing an Illustration for a Client, at 56E, is accomplished as set forth in the following table:

1. Select "Illustration" by using the arrow keys and moving the cursor over the word "Illustration."
2. Press Enter Key.
3. A prompt will appear requesting, "Which company do you want the illustration to be run for?"
4. Enter the company reference number (from the company table) you want the illustration to be run for.
5. Press Enter key.
6. The program now takes the company reference number and extracts those eligible participants. This may take a few minutes to do since this is not done prior to the illustration. Once the illustration extract has been made by the program, go to 1.07.
7. Another prompt will appear requesting, "What formula do you wish to use for this illustration?"
8. Enter the letter or number that Marketing has chosen from the Formula Comparison Report, to run the illustration for this company.
9. Another prompt will appear requesting, "What benefit to ratio do you wish to choose?" "Enter benefit to premium ratio to be used for formula assumptions 'A' through 'D'."
10. Enter the number "2."
11. Press Enter key.
12. You will now produce the Census Report, Underwriting Report, Premium Calculation Report and illustration for this client.
    Warning: Please make sure the Laser Jet printer is turned on and ready with paper, and not the dot matrix printer. Note: There is one blank page in between each report.
13. All reports will be printed to the Laser Jet except for the .R file which is a raw data file that will be utilized for the Polaris program. The Polaris program will have instructions on how to use the Polaris program in the following memo.
4. The reports are then delivered to the Executive Marketing/Sales Coordinator.

After the Data Control reports are generated at 56B, Marketing reviews and modifies these reports and either delivers the Client documentation to the Case Administration Department if there are no modifications, or requests the MIS Data Control Operator to rerun a previous list or report(s).

The MIS Data Control Operator delivers the following reports to the Executive Marketing/Sales Coordinator: Illustrations, Premium Calculations Report, Disbursement Schedule, and Underwriting Report. The Executive Marketing/Sales Coordinator then reviews the reports for accuracy and completeness and forwards the Illustrations, Premium Calculation Report, Disbursement Schedule, and Underwriting Report to the Marketing Representative for review.

The Marketing Representative reviews the reports for accuracy and completeness and if there are no changes to be made, returns the reports to the Executive Marketing/Sales Coordinator for subsequent forwarding to the Case Administration and Accounting departments. If there are no changes to be made, the Marketing Representative will annotate the appropriate modifications on the report(s), return the reports to the Executive Marketing/Sales Coordinator and notify the Executive Marketing/Sales Coordinator of the changes. If there are no changes, the Executive Marketing/Sales Coordinator will forward the Illustrations, Premium Calculations, Disbursement Schedule, and Underwriting Report to the Case Administration, and Accounting departments, indicating the end of the Marketing phase. If there are changes, the appropriate reports are resubmitted to MIS Data Control for reprocessing.

Referring now to FIG. 54, the tracking Data Update and Report Production phase software commence at 55I. Within the Marketing Phase, information regarding the status of items is tracked to assist the Executive Marketing/Sales Coordinator, Marketing Assistant, and Marketing Department, to follow the status of a particular case.

As items are mailed, followed-up on, and received, the Marketing Assistant indicates the dates on the internal Case Tracking Form. At the same time, the updates are also made on the Marketing Tracking Report The updates on the Marketing Tracking Report are indicated in red ink and are circled to assist data processing in locating the updated information. On a weekly basis, the Marketing Tracking Report is given to Data Control to update the data base, run a new report, and distribute.

Marketing delivers an updated/modified tracking report to MIS Data Control The Data Control Operator will input the data changes or additions to the system database, reruns a new tracking report, and delivers it to Marketing. The procedure for updating or adding tracking data to the data base, as indicated at 55M, is accomplished as set forth in the following table:

1. Select "Data Entry" by using the arrow keys and moving the cursor over the word "Data Entry."
2. Press the Enter key.
3. From the Data Entry Menu.
4. Select "Tracking Updates" by using the arrow keys and moving the cursor over the word, "Tracking Updates."
5. Press the Enter key.
6. From the Data Entry Tracking Updates Menu.
7. Select the desired phase option.
8. Press the Enter key.
9. Enter any data updates or changes by following the rules on how to enter data into the database.
10. You have now completed the data entry portion of the Tracking screens.
11. Press "E" to exit. This will return you to the menu.

As indicated at 55N, Marketing delivers an updated/modified tracking report to MIS Data Control. The Data Control Operator will input the data changes or additions to the system database, reruns a new tracking report, and delivers it to Marketing.

The procedure for producing Marketing Tracking Reports from the Main Menu, is accomplished as set forth by the following table:

1. Select "Tracking Reports" by using the arrow key and moving the cursor over the words "Tracking Reports."
2. Press the Enter key.

The procedure for producing Marketing Tracking Reports from the Tracking Report Menu, is accomplished as set forth in the following table:
1. Select the desired Tracking Report option "Marketing or Underwriting" by using the arrow keys and moving the cursor over the desired option.
2. Press the Enter key.
3. The desired option will be printed to your Laser Jet.

2. Application Phase

Figure 71:
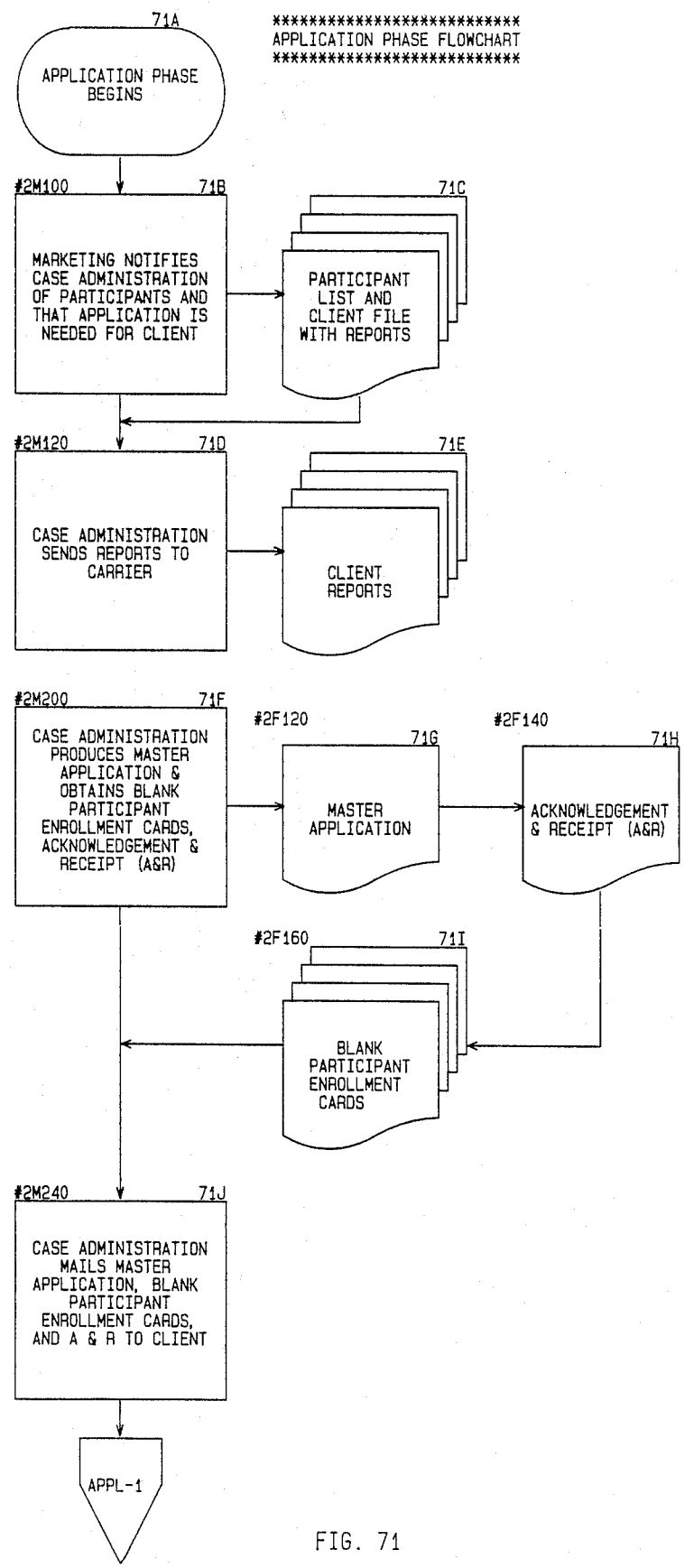
FIGS. 71-72 are flow charts of a computer program stored in the service computer of FIG. 2 for generating the necessary reports for,the Application Phase of the insurance plan.
Figure 72:
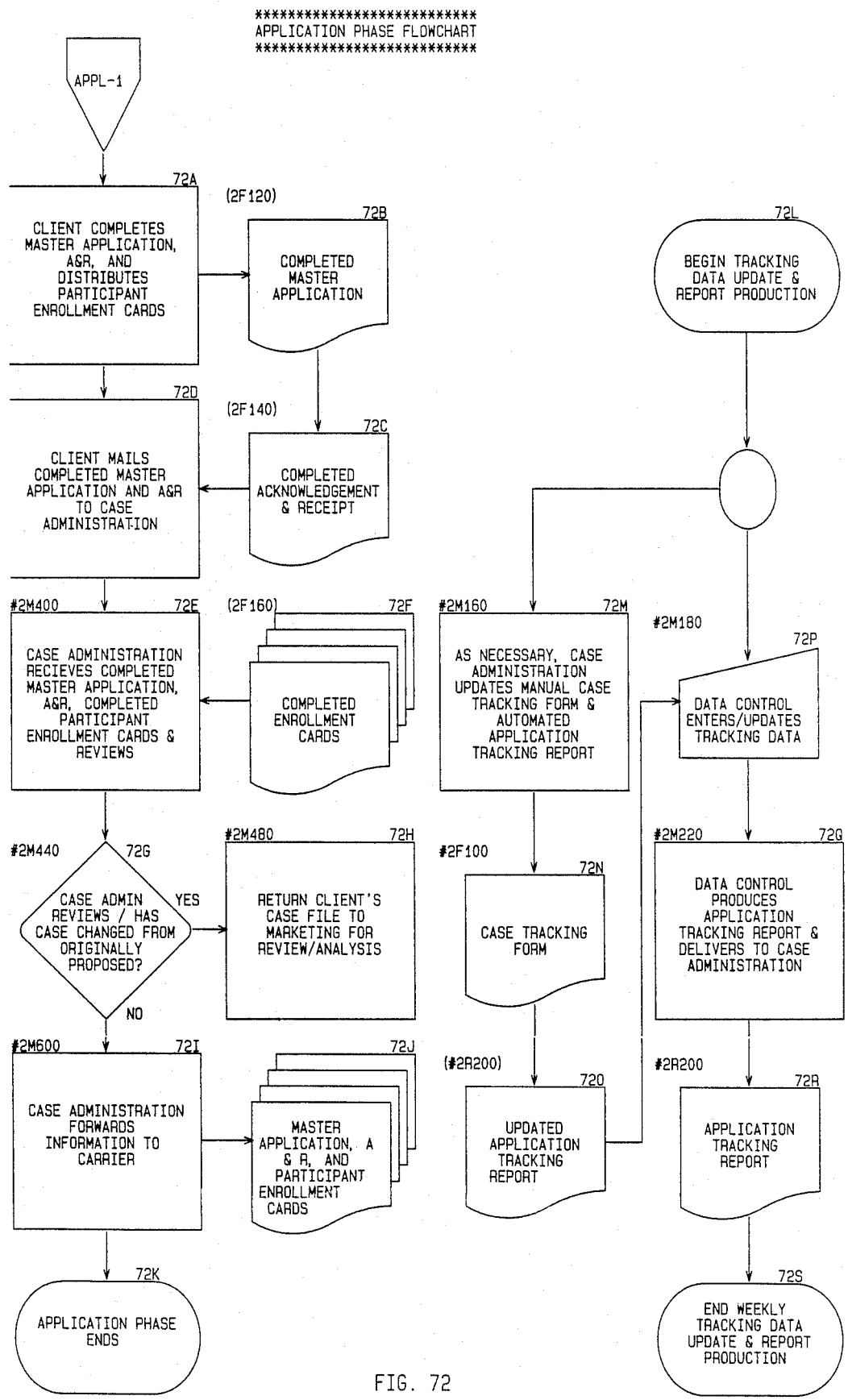

Referring now to FIGS. 71 and 72, there is shown flow charts for the computer program stored in the service computer for generating the necessary reports for the Application Phase of the insurance plan. The various reports are controlled and generated by the service computer, but either the service computer or a carrier computer can cause the reports to be generated.

The general purpose of the Application Phase of the program is to prepare a new case for submission to the insurance carrier. The various areas covered in the Application Phase include the preparation and completion of the Master Application, the Acknowledgment and Receipt form, and the individual enrollment cards. These forms, along with various other reports, are completed and reviewed by the Insurance Case Administration Department, prior to the submission of the case, to the insurance carrier.

Once a client agrees to establish a term to term conversion system, the Marketing Department notifies Insurance Case Administration. A number of reports are then produced by Data Control to be used by Insurance Case Administration in preparation for the submission of the case to the carrier. The Case, in general, and all of the reports, are reviewed for completeness by an Insurance Case Administrator and New Business Assistant (NBA). The role of the Insurance Case Administrator in the application phase is to oversee the work of the NBA to ensure the flow of the cases to the carrier. The NBA, within this phase, is responsible for the actual preparation of the forms, the mailing of them to the client for completion, follow-up, and review of the forms when returned by the client. The NBA i also responsible for updating the Case Tracking Form and Application Tracking Report to be used by the NBA, Insurance Case Administrator, and Marketing Manager in determining the status of a case at any particular time. The form and report are updated by the NBA as items are prepared, mailed, and returned.

Next, the NBA prepares the Master Application, and Acknowledgment and Receipt form, and mails them to the client along with enrollment cards for each participant to complete. The NBA follows up with a client as needed. When a client returns all forms and cards, they are reviewed by the NBA. The NBA and Case Administrator then meet to review all items. The Case Administrator checks with the Marketing Department to determine if the client's funding level is the same as originally proposed. If the funding level and participation are as originally stated, the Master Application, enrollment cards, and Acknowledgment and Receipt form are mailed to the carrier, along with the illustrations, the Premium Calculation Report, the Participant Report, and the Underwriting Report.

If the funding level and/or participation has changed, the case is returned to the Marketing Department for review and re-analysis. Once Marketing has reviewed the cas and made the changes, they notify Data Control to rerun all reports. Marketing reviews the reports and gives them to Insurance Case Administration for mailing to the carrier. The Underwriting Phase then begins.

Referring now to FIG. 71, the Application Phase software commences at 71A, and as indicated at 71B, Marketing has presented a proposal to a client and the client agrees to establish a term to term conversion system, the administration of the client's case is transferred from Marketing to Insurance Administration The Insurance Case Administration Department receives notification via memo, that client agrees to term to term conversion system. Along with such notification memo, the following forms are received as indicated at 71C:
a. Preliminary Checklist (FIGS. 73A-73D)
b. Illustrations (FIGS. 56C-56F)
c. Underwriting Report (FIG. 70)
d. Premium Calculation Report (FIG. 68A, 68B)
e. Formula Comparison Report (FIG. 62)
f. Census Report (FIG. 58)
g. Participant Report (FIG. 61)

NBA then checks to make sure that all forms are received. NBA sets up a soft work file and enters items received on the Case Tracking Report—Application Phase. The file is then given to the Insurance Administrator for review. The Insurance Administrator then returns the file to the NBA and indicates any potential areas of concern.

After completion of the notification at 71B, and receipt of the forms at 71C, various reports which have been received, along with the notification memo, are mailed to the carrier, as illustrated at 71D and 71E.

The procedure for sending the reports to the carrier is accomplished as set forth in the following table:
1. NBA and Insurance Case Administrator review items received.
2. NBA prepares a letter to carrier and mails in the following:
   a. Underwriting Report
   b. Illustrations
   c. Premium Calculation Report
   d. Participant Report
3. NBA updates Case Tracking Form and Application Tracking Report.

Referring now to FIGS. 74 and 75, Case Administration verifies that Agent is properly licensed in client's state, to ensure that the Agent/Sale Representative are in full legal compliance with licensing requirements of all states in which we market, or plan to market.

The procedure for verifying that Agent is properly licensed in client's state is accomplished as set forth in the following table:
1. NBA checks Agent License List to verify the Agent is licensed in the client's state.
2. If licensed, NBA indicates this on Case Tracking Report. If not licensed, NBA notifies Case Administrator. NBA and Case Administrator discuss (and research, if necessary) state licensing requirements.
3. Blank licensing forms are requested from state (if not in agency licensing file), and NBA follows up as required. When forms are received from state, NBA and Case Administrator discuss requirements, and forms are given to Agent with instructions for completion. NBA follows up as required. When forms are received back from Agent, they are reviewed by NBA and forwarded to state. The date forwarded to state is indicated on Case Tracking Form.

4. NBA follows up as required until Agent receives license.

As indicated at 71F, Case Administration produces Master Application, A & R form, and obtains blank enrollment cards. Using information reports received from Marketing, forms are prepared to be mailed out to the client for completion, to sign them up and enroll the individuals in the group.

The procedure for producing the Master Application form at 71G, the Acknowledgment and Receipt form at 71H (FIG. 76), and the blank enrollment cards at 71I is accomplished as set forth in the following table:
1. NBA completes Master Application using information from preliminary checklist.
2. NBA pulls from file drawers an appropriate number of blank enrollment cards and completion instruction sheets, using participant list as a guide.
3. NBA requests Data Processing to produce the A/R form for client, using preliminary checklist information.
4. Dates on which items are prepared are entered on the Case Tracking Form.

After the above forms are produced, as indicated at 71F–71I, Insurance Case Administration mails Master Application, blank participant enrollment cards, and A & R Form to client, for signature and completion.

The procedure for mailing the above forms is accomplished as set forth in the following table:
1. NBA mails out master application, A/R Form, and blank enrollment cards to client, along with a letter of instruction. Client is instructed to sign and return Master Application and A/R Forms immediately and enrollment cards as soon as possible thereafter. Follow-up dates for these are as follows:
   —Master application and A/R Form—7 days
   —Enrollment cards—14 days
2. NBA indicates on Case Tracking Form and Application Tracking Report the dates that the items are mailed.
3. NBA follows up as needed until all items are received, then enters dates that the items are received on the Case Tracking Form.

Referring now to FIG. 72, the client completes the Master Application at 72B and the Acknowledgment and Receipt (A & R) forms at 72C, and the distributed Participant Enrollment Cards at 72A. The client the mails the completed Master Application and Acknowledgment and Receipt form to Case Administration.

As indicated at 72E and 72F, Insurance Case Administration receives back from the client the completed Master Application, A & R Form, and completed Participant Enrollment Cards. The completed forms are reviewed for accuracy and completeness, prior to mailing to the insurance carrier.

The procedure for receiving the above forms is accomplished as set forth in the following table:
1. NBA receives back items and reviews for completeness. Receipt dates are indicated on the Case Tracking Form and Application Tracking Report. Incomplete forms are returned to client, along with a letter of instruction for correct completion. Date re-sent is indicated on Case Tracking Form. Follow-up is done at the end of a seven-day period.
2. All forms are correctly completed and received from client. Dates on which items are received back are placed on Case Tracking Form and Application Tracking Report.

After these forms are received by Case Administration at 72E, Case Administration reviews them and decides where the case has changed from the originally proposed case, as indicated at 72G. Additionally, Case Administration determines whether the estimated contribution level has changed.

The procedure for reviewing the case changes is accomplished as set forth by the following table:
1. NBA reviews participation list and Case Tracking Form to determine if all enrollment cards have been returned.
2. NBA reviews case with Insurance Case Administrator to determine if Administrator knows of any estimated contribution funding level changes.
3. Insurance Case Administrator speaks to Marketing on the funding level question.
4. If no changes on either the enrollment or funding level, the enrollment cards are sent to carrier along with Master Application and A & R form, as indicated at 72I.
5. If there are changes to either the enrollment or funding level, the entire case is given to Marketing for review as indicated at 72H.

As indicated at 72I, the procedure for returning client's case file to Marketing for review and analysis is accomplished as set forth by the following table:
1. Insurance Case Administrator notifies Marketing that their department is unable to obtain all enrollment cards, or that the funding level has changed.
2. If the funding level has changed, Marketing determines the actual amount. Marketing notifies Data Control and all original reports are rerun. Reports are returned to Marketing for review. If reports are correct, they are given to Case Administration.
3. If enrollment has changed (based on Insurance Case Administration being unable to get all cards returned), Marketing reviews the file to determine if these participants are "key" members, or if other employees may be substituted. If "key" employees, Marketing contacts the client to ensure that the enrollment cards will be completed and returned. If "non-key" will be completed and returned. If "non-key" employees, the Marketing Department supplies the name of the substitute individual(s) and notifies Data Control of the information needed to rerun all the original reports. All reports are rerun by Data Control and given to Marketing for review. If all reports are correct, Marketing gives the reports to Case Administration.

As indicated at 72I and 72J, the procedure for forwarding information to the carrier is accomplished as set forth by the following table:
1. NBA forwards letter to carrier along with Master Application, A & R Form and Enrollment Cards.
2. NBA indicates on Case Tracking Form and the Application Tracking Report, the date the forms are sent.
3. NBA follows-up at the end of seven days to insure that forms have been received by carrier. Wherefor, the Application Phase ends at 72K.

As indicated at 72L, the Tracking Data Update and Report Production Phase program begins, and as indicated at 72M, Case Administration updates Case Tracking Form at 72N, and Application Tracking Report at 72O, to provide current summary information on a particular case.

The procedure for updating the above forms is accomplished as follows: As the items are mailed, followed-up on, and received, the NBA indicates the dates on the internal Case Tracking Form. At the same time, the updates are also made on the Application Tracking Report. The updates on the Application Tracking Report are indicated in red ink and are circled to assist data processing in locating the updated information. On a weekly basis, the Application Tracking Report is given to Data Control to update the data base, run a new report, and distribute.

As indicated at 72P, the user enters and updates the tracking data to the system database. Case Administration delivers an updated/modified tracking report to MIS Data Control. The Data Control Operator will input the data changes or additions to the system database, reruns a new tracking report, and delivers it to Case Administration.

The procedure for entering and updating the tracking data to the system database is accomplished as set forth in the following table:

1. Select "Data Entry" by using the arrow keys and moving the cursor over the word "Data Entry."
2. Press the Enter key.
3. From the Data Entry Menu
4. Select "Tracking Updates" by using the arrow keys and moving the cursor over the word, "Tracking Updates."
5. Press the Enter key.
6. From the Data Entry Tracking Updates Menu
7. Select the desired phase option.
8. Press the Enter key.
9. Enter any data updates or changes by following the rules on how to enter data into the system database.
10. You have now completed the data entry portion of the Tracking screens.
11. Press "E" to exit. This will return you to the Menu.

After the user enters and updates the tracking data, Data Control produces an Application Tracking Report, as indicated at 72Q and 72R. The Data Control Operator will input the data changes or additions to the system database, reruns a new tracking report, and delivers it to Case Administration.

The procedure for producing the Tracking Report is accomplished as set forth by the following table:
1. Select "Tracking Reports" by using the arrow key and moving the cursor over the words "Tracking Reports."

2. Press the Enter key. From the Tracking Report Menu:
1. Select the desired Tracking Report option, "Marketing, Application, or Underwriting" by using the arrow keys and moving the cursor over the desired option.
2. Press the Enter key.
3. The desired option will be printed to your Laser Jet. Wherefore, the Weekly Tracking Data Update and Report Production phase ends, as indicated at 72S.

3. Accounting Phase

Figure 79:
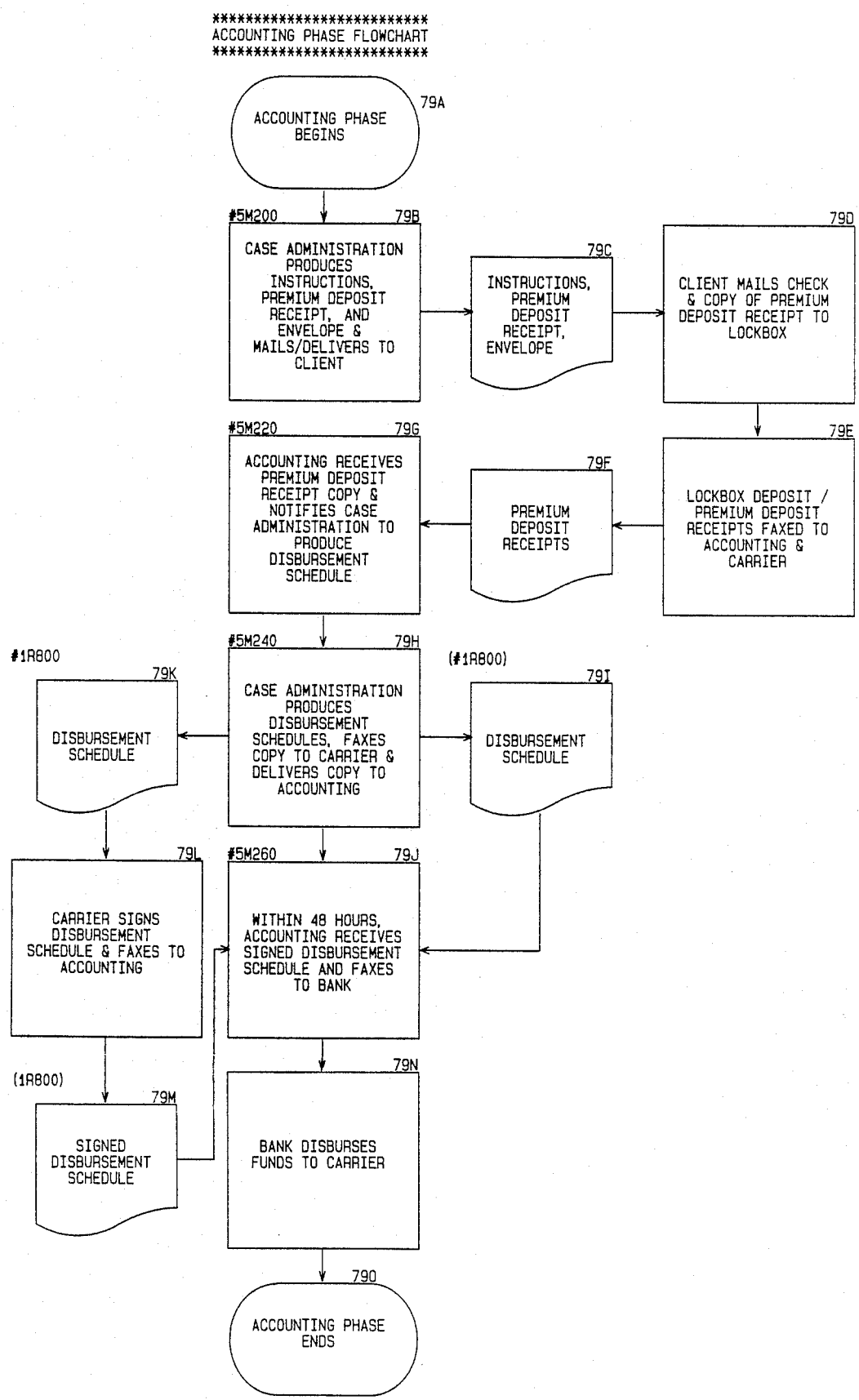
FIG. 79 is a flow chart of a computer program stored in the service computer of FIG. 2 for generating the necessary reports for the Accounting Phase of the insurance plan.

Refer now to FIG. 79, there is shown a flow chart for the computer program stored in the service computer for generating the necessary reports for the accounting phase of the insurance plan. The various reports are controlled and generated by the service computer, and either the service computer or a carrier computer can cause the reports to be generated.

The accounting phase of the system deals with the receipt and flow of funds from the clients, through the ultimate disbursement of those funds to the appropriate entities. The system procedures include use of hardcopy documents which act as internal control checks at various points in the flow of a transaction. The successful completion of the accounting phase depends not only on the proper processing and follow-up of data in the accounting department, but also relies heavily on functions performed by case administration, marketing, the carrier, and the Two independent functions occur somewhat simultaneously, yet independently of each other during the accounting phase. They are:

1. Flow of Dollars—Client funds are deposited in a carrier bank account specifically designated for the system. A Lock-box arrangement is used to provide necessary deposit detail information and to place the funds into an account which has some restrictions on disbursements.
2. Flow of Documents—Deposit Instructions, Deposit Receipt, Notification of Deposit, and Disbursement Schedule forms are all documents critical to completing the accounting phase and providing appropriate internal control. Both functions must be completed successfully before the final disbursal of funds to the appropriate entities. There are two agreements which relate to the accounting phase.

They are:
1. License Agreement—This agreement covers the basic business relationship between the carrier, Agenesis, Inc. and the agent company. Portions of the agreement that are relevant to the accounting phase deal with the method by which the carrier will be notified that monies have been sent by the client to purchase the system, how those funds are to be distributed to the various entities, and at what compensation level. The latter is accomplished by a disbursement schedule which is prepared by case administration and faxed to the carrier. The agreement will provide for an adequate period of time for the carrier to review the disbursement schedule and agree to the underlying calculations. The carrier will be further instructed as to the steps necessary to return disbursement schedule (via fax) so that the ultimate disbursement of collected funds can be made by the bank.
2. Collection and Disbursement Account Agreement—This is an agreement between the carrier, Agenesis, and the bank which delineates the procedures to be followed by the bank in depositing, collecting, and disbursing client funds. The agreement is to provide mutual protection for all parties involved, since the ultimate goal of the banking arrangement is to place the client funds in a carrier account that allows for a prompter payment cycle than the traditional carrier commission accounting system, yet does not breach the fiduciary obligations of either the carrier or the bank. The checks and balances provided by the flow of documents accomplishes this objective, as the bank is directed to disburse funds from the clearing account only upon receipt of a disbursement schedule signed by the carrier.

Referring now to FIG. 79, the accounting phase software commences execution at 79A, and as indicated as 79B, the Case Administration produces Instructions Premium Deposit Receipt, and Envelope, and mails them to the client.

After the system trigger point, as determined by Marketing, has been reached, Case Administration is repsonsible for producing a set of Instructions which gives the client information as to the amount of Premium for their policy, how and where the funds are to be sent, and in what manner. The client is also provided with a preprinted envelope, which has the lock box address on it.

The procedure for providing the client with the appropriate instructions for preparing and mailing the premium check to the bank lock box is accomplished as set forth in the following table:

1. The Insurance Case Administrator prepares a letter and a premium deposit receipt for the client which describes the steps to be taken by the client in the remittance of monies to the bank lock box.
2. The Insurance Case Administrator prepares a photocopy of these instructions and receipt and places them in a pending file to await notification from accounting that client monies have been deposited.
3. The original of the instructions and receipt are transmitted to the client, along with the preprinted envelope (which notes the address of the bank lock box) to be used for the deposit of monies. The date and time of the transmission of the deposit instructions and envelope to the client should be noted in the Insurance Case Administrator's file.

After the Case Administration mails Instructions Premium Deposit Receipt and Envelope to the client, as indicated by 79B and 79C, then the client mails the check and a copy of the Premium Deposit Receipt to the lock box as indicated in 79D. The lock box Deposit and the Premium are faxed to the Accountant and Carrier as indicated at 79E and 79F.

As indicated at 79G, the Accounting Department will receive on a daily basis deposit detail information from the bank lock box. Upon receipt of this information, Accounting notifies Case Administration via standard form which client monies have been received. Accounting retains a copy of this notification for later follow-up.

The procedure for describing the steps to be taken by Accountant upon the receipt of the Deposit detail information from the lock box account is accomplished as set for the following table:

1. The Controller receives detailed premium deposit receipts from the lock box each day. The Controller prepares a Deposit Notification Form for the Case Administrator. The form indicates the client name, client number, dollar amount of deposit, and date of deposit.
2. The Controller sends the Notification Form to Case Administration. A copy of the form is retained by Accounting and placed in a pending file for later follow-up.

After the Case Administration receives from Accounting the notification of deposits for the day, as indicated at 79G, the Case Administration produces a Disbursement Schedule, as indicated at 79I. The Disbursement Schedule is a document which denotes the allocation of client premium to the carrier, agent, and patent holder. As indicated at 79H and 79K–79M, the Disbursement Schedule is transmitted to the Carrier for their review and approval, and is later returned to the patent holder in a later step in the accounting phase. A copy of the Disbursement Schedule is sent to the patent holder's accounting department.

This procedure describes the steps to be taken by Case Administration to produce and disseminate the Disbursement Schedule (FIGS. 69A and 69B), the critical document in the accounting phase, as indicated in the following table:

1. The Insurance Case Administrator is notified via the Accounting Department's Deposit Notification Form that the deposit has been received. The Case Administration representative takes this notification as an order to input the data necessary to produce the Disbursement Schedule. Any relevant information not previously accumulated are gathered at this point so that the calculations necessary to compute the allocation of client premium can be completed.
2. After the Disbursement Schedule has been printed, the Insurance Case Administrator reviews the calculation of client premium distribution for reasonableness. The Insurance Case Administrator signs the Disbursement Schedule to indicate the review has been performed.
3. The Disbursement Schedule is photocopied and facsimilied to the insurance carrier. The date and time of the transmission is noted on the Case Administration copy. This Disbursement Schedule is matched to the original deposit instruction letter and placed in the pending file for later review.
4. A second copy of the Disbursement Schedule is made and routed to the Accounting Department. The date and time of routing is noted on the Case Administration copy.
5. The Case Administrator retains the Deposit Notification Form in a daily binder.

After the Case Administration produces Disbursement Schedules as indicated at 79H, the Accounting Department is responsible for tracking Disbursement Schedules sent to the carrier, in an effort to have them returned in a timely manner so that the bank can be instructed how to disburse funds, as indicated at 79J and 79M.

The procedure describing the steps to be taken by Accounting upon receipt of the signed Disbursement Schedule from the carrier so that the transfer of the system compensation can be effectuate is accomplished as set forth by the following table:

1. The Controller receives, via facsimile transmission, a signed copy of the Disbursement Schedule.
2. This Disbursement Schedule is matched to the copy of the schedule originally given to Accounting by Case Administration. Amounts and disbursement number are compared and agreed.
3. The signed-off Disbursement Schedule is transmitted to the bank via facsimile for disbursement of funds being held in the lock-box account.
4. The matched copies of the Disbursement Schedule are placed in a pending file until the bank confirms, via subsequent receipt, the transfer of the funds. The Disbursement Schedules and bank transfer receipt are matched together and placed in the Accounting Department deposit folder for that month.

It should be noted that if the Accounting Department has not received back from the carrier the signed-off Disbursement Schedule within 48 hours of its originally being transmitted, the Accounting Department will notify Case Administration to contact carrier for follow-up and resolution of any problems.

4. Underwriting Phase

Figure 80:
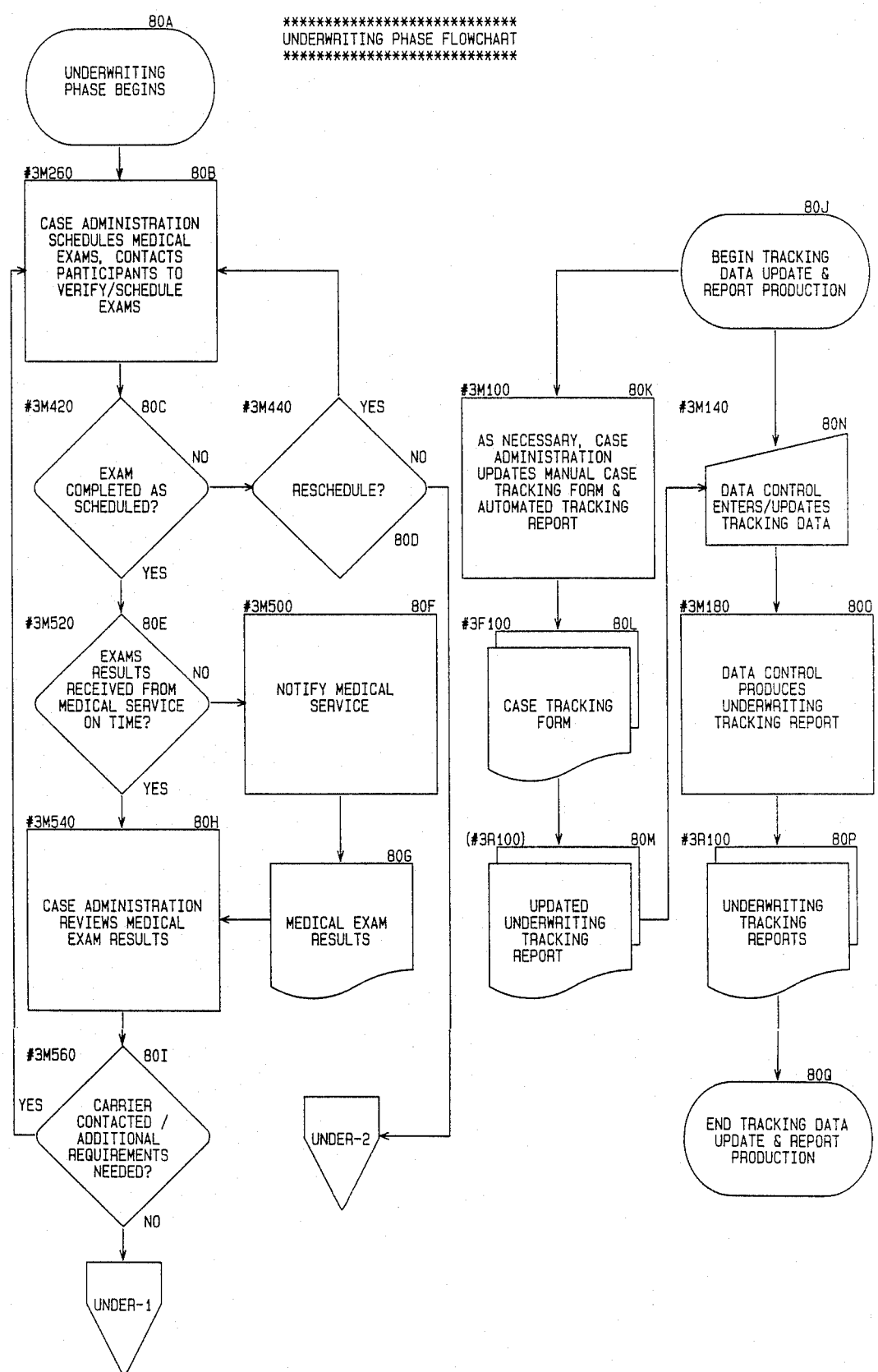
FIGS. 80 and 81 are flow charts of a computer program stored in the service computer of FIG. 2 for generating the necessary reports for the Underwriting Phase of the insurance plan.
Figure 81:
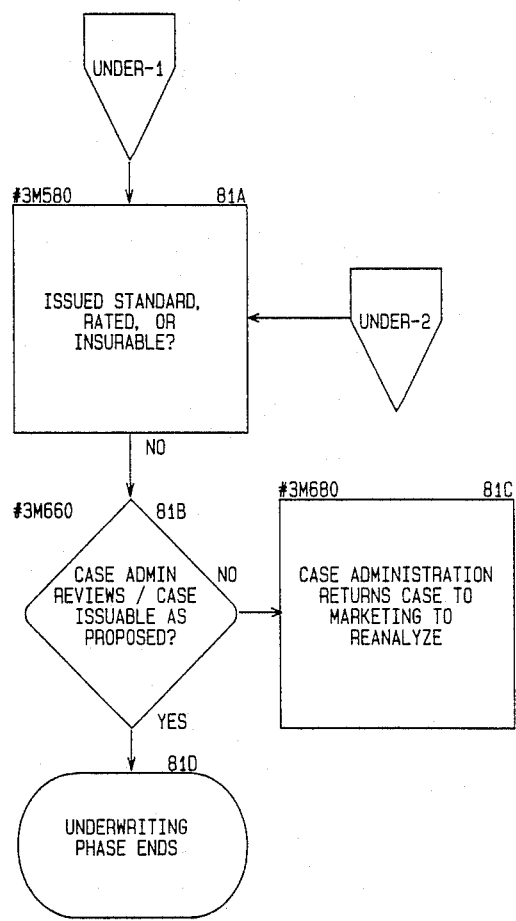

Referring now to FIGS. 80 and 81, there is shown flow charts for the computer program stored in the service computer for generating the necessary reports for the underwriting phase of the insurance plan. The various reports are controlled and generated by the service computer, but either the service computer or a carrier computer can cause the reports to be generated.

The general purpose of the Underwriting Phase of the system program is to provide the insurance carrier with sufficient medical evidence on each participant; thus, enabling the carrier to make an offer of insurance. Working closely with the participants of the group, the local medical service companies, and the underwriting department of the insurance carrier, the Insurance Case Administration Department is able to arrange for, and have completed, all necessary requirements in an efficient and timely basis.

Upon receipt of a case from the Marketing Department, Insurance Case Administration is furnished with a list of participants and their medical requirements. This report is reviewed by Case Administration and forwarded on to the carrier. The carrier, upon review of this report and the enrollment cards received, determines the exact requirements which are necessary to underwrite the case. Insurance Case Administration is notified and contacts the local medical service companies to arrange for the various medical requirements. At the same time, Insurance Case Administration is also in touch with the participants in regard to the non-medical requirements needed. Once all requirements are completed, they are reviewed for completeness and accuracy by Case Administration and are then mailed to the Underwriting Department at the carrier. Upon receipt of the requirements in the Underwriting Department, they are reviewed and evaluated. Underwriting notifies Case Administration of their decision on each participant. Underwriting also advises Case Administration of any additional requirements which they may need on an individual. Case Administration makes the necessary arrangements with the local medical service company with for these requirements.

Once a decision has been made on all participants, Insurance Case Administration reviews the entire case to determine the status of all of the individuals in the group. This is done for the purpose of determining whether to advise the insurance carrier to issue all the certificates, or if the case needs to be referred back to the Marketing Department for re-analysis due to changes in the premium funding/participation. Once this decision has been made, the carrier is notified, and the underwriting process is completed. The Policy Issue Phase now begins.

The Insurance Case Administration personnel required to handle the responsibilities in the underwriting phase of the system would consist of an Insurance Case Administrator and New Business Assistant (NBA).

The NBA would be primarily responsible for the arranging and tracking of requirements with the local medical service companies. The Insurance Case Administrator would oversee the work of the NBA and interface with the underwriting department of the carrier.

Referring now to FIG. 80, the Underwriting Phase software commences execution at 80A, and as indicated at 80B, the Case Administration Schedules and Medical Exams phase program is executed, to schedule all necessary underwriting medical requirements to issue a certificate to the participant.

The procedure for scheduling all necessary underwriting medical requirements, for issuing a certificate to the participant, is accomplished as set forth in the following table:
1. NBA reviews report from the carrier which outlines all requirements needed on each participant to issue a certificate. NBA reviews with Insurance Case Administrator.
2. Based on this report, NBA contacts the medical service and provides them with the medical requirements for each participant. NBA also furnishes telephone number of participant.
3. Medical service contacts participant and schedules appointment.
4. Medical service contacts NBA and supplies date of appointment.
5. NBA places date on the Case Tracking Form and Underwriting Tracking Report.

After medical exams are scheduled for a client, as indicated at 80B, a follow-up is done with the medical service, as indicated at 80C. NBA then determines whether the exam has been completed as scheduled.

Figure 82:
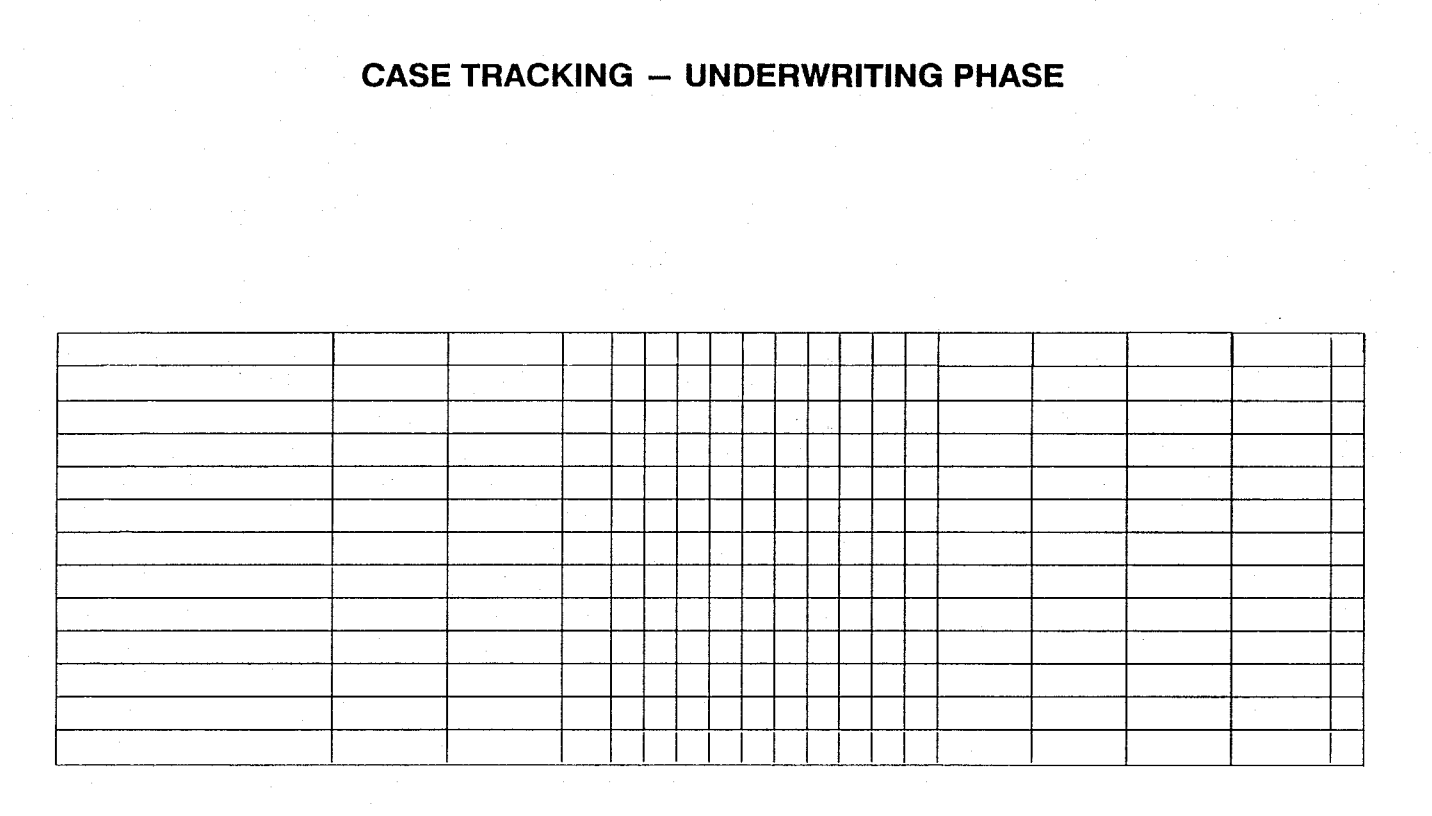

The procedure for the NBA to determine whether the medical exam requirements have been completed is accomplished as set forth in the following table.
1. NBA contacts medical service to determine if requirements have been completed.
2. NBA logs answer on Case Tracking Form (FIG. 82) and Underwriting Tracking Report (FIG. 83).

After checking with the medical service to determine if requirements were completed, and exams are rescheduled if necessary.

The procedure for rescheduling the medical exam and other requirements if not done when originally scheduled is accomplished as set forth in the following table:
1. NBA contacts and discusses with the medical service the reason for the requirements not being completed as scheduled. The medical service indicates whether another appointment has been scheduled.
2. If another appointment has been scheduled, NBA places rescheduled date on the Underwriting Case Tracking Form (FIG. 82) and Underwriting Tracking Report (FIG. 83).
3. If appointment has not been rescheduled, and does not appear that it will be, NBA reviews with Insurance Case Administrator to determine if Case Administration needs to contact the participant.

After completion of the exam scheduling, the NBA determines whether the exam results received from the medical service are on a timely basis, as indicated at 80E. After the requirements have been completed, they are sent to a Sale Representative for review before mailing to the carrier.

The procedure for determining whether the exam results are timely, is accomplished by having the NBA review the Case Tracking Form (FIG. 82) to determine when the requirements were completed, and if results have been received yet. The nominal timeframe should be five (5) days. The NBA fills in the information on the Case Tracking Form and the Underwriting Tracking Report (FIG. 83) when items are received.

As indicated at 80F and 80G, after requirements have been completed, they need to be sent to a Sale Representative for review before sending to the carrier. The procedure for determining the reasons why the exam and other requirements have not been received yet is accomplished as set forth in the following table:
1. After reviewing the Case Tracking Form (FIG. 82), the NBA contacts the medical service to determine why the completed requirements haven't been received. The normal time-frame should be five (5) working days to receive these requirements.
2. Based on the answer from the medical service, the NBA follows up as needed if the requirements are not received as instructed.
3. The NBA fills in the information on the Case Tracking Form (FIG. 82) and Underwriting Tracking Report (FIG. 83) when items are received.

As indicated at 80H, after the medical requirements have been completed and before they are sent to the carrier, they are reviewed by a Sale Representative, to analyze the completed requirements to determine if there may be any problems on the underwriting of the participant.

The procedure for Case Administration reviewing the medical exam results, is accomplished as set forth in the following table:
1. The NBA reviews the completed requirements and brings to the attention of the Insurance Case Administrator any potential problem areas.
2. The NBA copies and sends the requirements, those with normal results, to the carrier along with a cover letter.
3. The NBA logs in on the Case Tracking Form (FIG. 82) and the Underwriting Tracking Report (FIG. 83), the date the requirements are sent to the carrier.

After reviewing the completed medical requirements, as indicated at 80H, and before sending it to the carrier, the carrier is contacted to determine if any additional requirements may be need on a participant whose completed medical requirement results are questionable or not normal, as indicated at 80I.

The procedure for contacting the carrier for additional medical requirements is accomplished as set forth in the following table:
1. Insurance Case Administrator contacts an underwriter at the carrier and goes over the results of the completed medical requirements.
2. The underwriter determines if any additional requirements are needed.
3. If additional requirements are needed, the Insurance Case Administrator informs the NBA, and the NBA makes arrangements with the medical service to have the additional requirements done.
4. The Insurance Case Administrator contacts the participants to explain why the additional requirements are needed.
5. The NBA logs in on the Case Tracking Form (FIG. 82) and the Underwriting Tracking Report (FIG. 83), the additional requirements which are needed, and then the underwriting loop begins again.

Referring now to FIG. 81, and after the carrier has been contacted, as indicated at 80I, the underwriter makes a decision on the final status of the participant, as indicated at 81A, to determine the final underwriting decision on a participant.

The procedure for determining the final status of the participants is accomplished as set forth in the following table:
1. An underwriter at the carrier contacts a Sale Representative to inform them of their final decision on the participants.
2. If a participant on a case is rated, the underwriter furnishes the table rating to a Sale Representative.
3. The NBA indicates the final status on the Case Tracking Form (FIG. 82) and the Underwriting Tracking Report (FIG. 83).
4. If necessary, the Insurance Case Administrator negotiates with the carrier for "underwriting consideration."

After the carrier has underwritten all the participants in a group, and before the case is issued, as indicated at 81A, the entire case is reviewed as indicated at 81B, to review the final status of all participants, to determine if the case has changed from what was originally proposed.

The procedure for determining whether a case is issuable as proposed is accomplished as set forth in the following table:
1. When the Underwriting Department makes a decision on the last participant, the entire case is reviewed by the Insurance Case Administrator.
2. If all participants are approved on a standard basis as proposed, the Insurance Case Administrator notifies the carrier to issue the Master Contract and all participant's certificates.
3. If all participants are not approved on a standard basis (i.e. rated or uninsurable), the case is given to the Marketing Department for review/reanalysis.

After the Insurance Case Administration has received the final underwriting decisions on all the participants from the carrier, as indicated at 81B, and if any substandard or uninsurable, the Marketing Department reviews the case.

The procedure for the Marketing Department to reanalyze the case is accomplished as set forth in the following table:
1. The Insurance Case Administration Department furnishes to the Marketing Department the final underwriting status of all participants in the group.
2. The Marketing Department reanalyzes the case to determine the final composition of the group, and provides the necessary information to Data Processing to rerun all reports, if necessary.
3. Data Processing reruns reports and gives them to Marketing to review.
4. The Marketing Department gives the reports to the Insurance Case Administrator, along with the final decision on which participants are to be covered in the group.

Whereupon, the Underwriting Phase program ends, as indicated at 81D.

Referring now to FIG. 80, the Tracking Date Update and Report Production phase program commences execution at 80J, and as indicated at 80K, within the Underwriting Phase, information regarding the status of items is tracked to assist the Insurance Case Administrator, NBA and Marketing Department, to follow the status of a particular case, and to provide current summary information on a particular case.

The procedure for the Case Administration to update Case Tracking Form (FIG. 82) and Underwriting Tracking Report (FIG. 83), is accomplished as follows: as items are mailed, followed-up on, and received, the NBA indicates the dates on the internal Case Tracking Form, as indicated at 80L. At the same time, the updates are also made on the Underwriting Tracking Report, as indicated at 80M. The updates on the Underwriting Tracking Report are indicated in red ink and are circled to assist data processing in locating the updated information. On a weekly basis, the Underwriting Tracking Report is given to Data Control to update the data base, run a new report, and distribute.

As required, Case Administration delivers an updated/modified tracking report to MIS Data Control. The Data Control Operator will input the data changes or additions to the system database, reruns a new tracking report, and delivers it to Case Administration, to provide the user with instructions on how to update or add tracking data to the system database.

The procedure for entering and updating the tracking data from the Main Menu, is accomplished as set forth in the following table:
1. Select "Data Entry" by using the arrow keys and moving the cursor over the word "Data Entry".
2. Press the Enter key.
3. From the Data Entry Menu.
4. Select "Tracking Updates" by using the arrow keys and moving the cursor over the word, "Tracking updates."
5. Press the Enter key.
6. From the Data Entry Tracking Updates Menu.
7. Select the desired phase option.
8. Press the Enter key.
9. Enter any data updates or changes by following the rules on how to enter data into the system database.
10. You have now completed the data entry portion of the tracking screens.
11. Press "E" to exit. This will return you to the Menu.

After the tracking data has been updated or added to the system database, as indicated at 800, and as required, Case Administration delivers an updated/modified tracking report to MIS Data Control.

The procedure for producing a tracking report, as indicated at 80T, is accomplished as set forth in the following table:
From the Main Menu:
1. Select "Tracking Reports" by using the arrow key and moving the cursor over the words "Tracking Reports."
2. Press the Enter key.
From the Tracking Report Menu:
1. Select the desired Tracking Report option "Marketing, Underwriting, or Underwriting" by using the arrow keys and moving the cursor over the desired option.
2. Press the Enter key.
3. The desired option will be printed to your Laser Jet.

Whereupon, the Tracking Data Update and Report Production program software terminates.

5. Issue Phase

Figure 84:
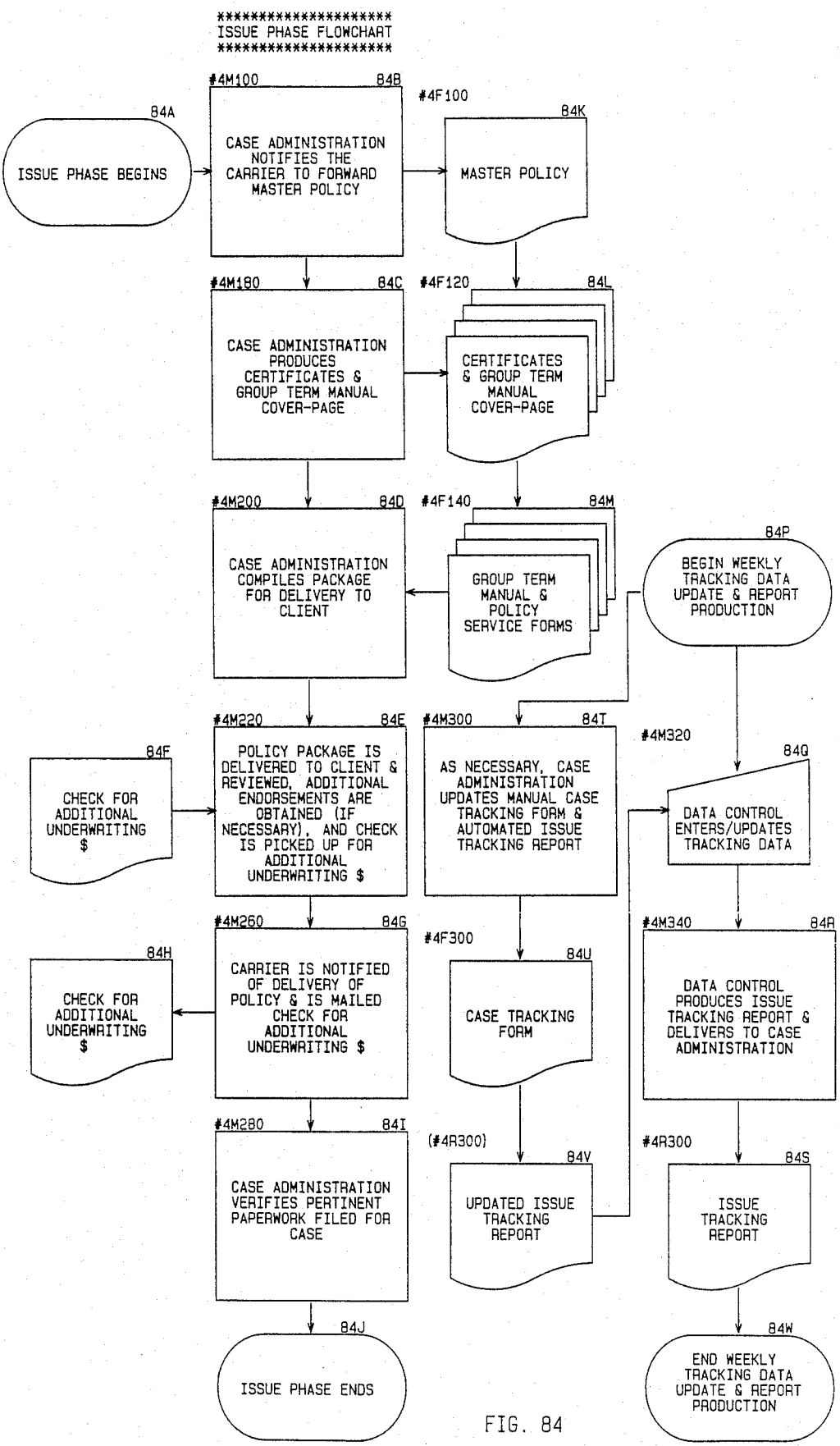
FIG. 84 is a flow chart of a computer program stored in the service computer of FIG. 2 for generating the necessary reports for the Issue Phase of the insurance plan.

Referring now to FIG. 84, there is shown flow charts for the computer program stored in the service computer, for generating the necessary reports for the Issue Phase of the insurance plan. The various reports are controlled and generated by the service computer, but either the service computer or a carrier computer can cause the reports to be generated.

The general purpose of the Issue Phase of the system program is to have the master policy issue and the individual participant's certificates prepared, and then delivered to the client for review and acceptance. Any outstanding requirements are picked up at the same time for transmittal to the carrier. In addition, the client is given a group term manual describing the operation of the system program.

Upon review of all of the individuals in the group by the carrier, a Sale Representative is notified. The case is reviewed in total and a Sale Representative advises the carrier to either issue the master policy or that changes will be forthcoming. Once the case is finalized, a Sale Representative notifies the carrier to issue the master policy, and the individual participant's certificates are prepared by a Sale Representative.

Upon receipt of the master policy, a group kit is compiled. This kit contains the master policy, the individual participant's certificates, a group term manual, and policy service forms. The group kit is then delivered to the client and the contents reviewed. Any additional money or endorsements needed are obtained and are then forwarded to the carrier. Once the carrier is notified of delivery and any money/endorsements are received by the carrier, the case is officially in force. At this point, the client is now put on our permanent records and will be handled through our policyholder service area.

Referring now to FIG. 84, the Issue Phase software commences execution at 84A, and as indicated at 84B, the Case Administration notifies the carrier to forward the Master Policy.

After the carrier has made the final decision on each participant and the case has been reviewed by the Insurance Case Administration/Marketing Department, the carrier needs to be contacted to instruct them whether to issue the Group Master Contract. The procedure for notifying the carrier to issue a Master Policy, as indicated at 84B, is accomplished as set forth in the following table:

1. Insurance Case Administrator reviews the case with Marketing and determines if the case should be issued on its present basis.
2. If the case is to be issued, the Insurance Case Administrator notifies the New Business Assistant (NBA) and the NBA contacts the carrier.
3. If the case is not to be issued on its present basis, the Insurance Case Administrator notifies the NBA and the Insurance Case Administrator speaks to the underwriter.
4. The NBA logs the information in either situation on the Issue Case Tracking Form and Issue Tracking Report.

After all of the participants have been approved by the carrier, and the Insurance Case Administration has notified the carrier to issue the Master Policy, as indicated at 84B, the Insurance Case Administration prepares the individual certificates for each participant, as well as the cover page for the group term manual, as indicated at 84C, 84K and 84L.

The procedure for preparing the individual participant's certificate and group term manual cover page for the group, is accomplished as set forth in the following table:
1. The NBA, using the Underwriting Report, types in the necessary information on the individual certificate for each participant.
2. The NBA, using the preliminary checklist, types up the personalized cover page of the group term manual which is to be given to the client for reference purposes.
3. The NBA logs the information on the Issue Case Tracking Form and Issue Tracking Report.

After the master policy has been received from the carrier and the individual participant's certificates have been typed, as indicated at 84C, the Insurance Case Administration compiles the forms in a group kit, along with a group term manual and policy service form, as indicated at 84D and 84M.

The procedure for compiling the group kit which will be furnished to the client, is accomplished as set forth in the following table:

1. Upon receipt of the Master Contract, the NBA assembles the group kit. The kit contains the Master Contract, the individual participant's certificates, a group term manual, and service forms.
2. NBA prepares a list of requirements needed on delivery.
3. The NBA gives the group kit to Insurance Case Administrator for review.

After the group kit has been assembled, as indicated at 84D, it is delivered to the client, as indicated at 84E, and any additional monies and endorsements are obtained and sent to the carrier, as indicated at 84F.

The procedure for reviewing and delivering the Policy Package to the client, and for picking up any additional money required, and to have any endorsements signed, and to review the group term manual and policy service forms, is accomplished as set forth in the following table:

1. The Insurance Case Administrator contacts the client to set up an appointment to deliver the kit.
2. Insurance Case Administrator meets with the client and goes over the concept in general with them again.
3. Insurance Case Administrator picks up any additional money needed and gets any endoresements signed.
4. The Insurance Case Administrator goes over, in general with the client, the contents of the group term manual.

After the group case has been presented to the client, as indicated at 84E, the carrier is notified of the delivery, and any additional money or endorsements are sent to the carrier, as indicated at 84G and 84H.

The procedure for contacting the carrier to fulfill the delivery requirements is accomplished, as set forth in the following table:

1. Insurance Case Administrator returns to the office and reviews the case with the NBA.
2. NBA forwards a notification of delivery form to the carrier as well as any additional money and endorsements.
3. NBA indicates the date and the items which are sent to the carrier, on the Issue Case Tracking Form and Issue Tracking Report.

After all delivery requirements have been received by the carrier, as indicated at 84G, the paperwork on the case is transferred from the Insurance Case Administration working file to the insurance client binder, as indicated at 84I.

NBA transfers paperwork from the Insurance Case Administration working file to the appropriate sections of the insurance client binder. The case is officially now in force. All paperwork from the various stages of application, underwriting, and issue are compiled, indicating the Issue Phase termination, as indicated at 84J.

As indicated at 84P, the Weekly Tracking Data Update and Report Production phase software commences execution, and as indicated at 84T - 84V, Case Administration updates the Manual Case Tracking From and the Automated Issue Tracking Report, as necessary.

The tracking data is then entered and updated, as indicated at 84Q, and the Data Control produces the Issue Tracking Report and delivers the same to the Case Administration, as indicated at 84R and 84S. Whereupon the Weekly Tracking Data Update and Report Production phase software terminates, as indicated at 84W.

A particular embodiment of the present invention has been disclosed, it is to be understood that various different modifications are possible and are contemplated within the true spirit and scope of the appended claims. There is no intention, therefore, of limitations to the exact abstract or disclosure herein presented.

What is claimed is:

1. A system for facilitating the establishment and administration of an insurance plan, comprising:
   at least one insurance carrier computer;
   a service computer adapted to communicate with said carrier computer;
   means for gathering base customer information concerning the insurance plan;
   said service computer having means for compiling said base customer information for the establishment of the insurance plan;
   means for determining tentative insurance plan information is response to the compiled base customer information;
   said carrier computer having means for generating an approved insurance plan report information based on said tentative insurance plan report information; and
   said service computer having means for receiving and storing said insurance plan report information and for generating an approved insurance plan report messages for use by a customer.

2. A system according to claim 1, wherein said gathering means comprises a group of customer computers.

3. A system according to claim 2, wherein said customer computers each include means for receiving said approved insurance plan report messages and wherein the messages includes an illustration report.

4. A system according to claim 3, wherein said approved insurance plan report message further includes administrative information.

5. A system according to claim 1, wherein said determining means comprises:
   a processor in said service computer for calculating iteratively group benefit values of the insurance plan based upon a given premium contribution from an employer for the insurance plan for a plurality of employees as a part of said tentative insurance plan information for a given interval of time; and
   for calculating benefit values of the insurance plan subsequent to said interval of time, based upon said given premium contribution.

6. A system according to claim 5, wherein said processor means stores signals indicative of an algorithm for facilitating calculation operations.

7. A system according to claim 6, wherein said processor means responds to said algorithm signals for generating signals indicative of tenative death benefits.

8. A system according to claim 7 wherein said processor means responds to the tentative death benefit signals and to said algorithm signals, by generating further tentative death benefit signals.

9. A system according to claim 8, wherein said processor means stores signals indicative of a desired target premium contribution.

10. A system according to claim 9, wherein said processor means responds to said stored premium contribution signals and to said tentative premium contribution signals by comparing the approximate equivalence of the stored premium contribution signals with the tentative premium contribution signals and by generating a report in response to an approximate equivalence, and alternatively initiating a further calculation in response to a non-equivalence.

11. A system according to claim 1, wherein said service computer adapted to communicate with said carrier computer comprises:
a pair of floppy disk drive memories;
an input keyboard for entering input data;
a monitor for displaying base customer information, approve insurance plan report information and approved insurance plan report message;
a printer for printing output data;
and wherein said system further includes means for interconnecting said service computer with said carrier computer.

12. A system according to claim 11, further including means for interconnecting said service computer with a group of customer computers.

13. A system for facilitating the establishment and administration of an employee group insurance plan, comprising:
means for gathering base customer information regarding a proposed new customer, said information including employee census information;
means for compiling said base information and summarizing it;
means for calculating iteratively the benefit values of the insurance plan based upon a given premium contribution from an employer for the insurance plan for a plurality of employees for a given interval of time; and means for calculating iteratively individual employee conversion benefit values of the insurance plan subsequent to said interval of time based upon said given premium contribution.

14. A system according to claim 13, wherein said means for calculating includes processor means for storing signals indicative of an algorithm for facilitating calculation operations.

15. A system according to claim 14, wherein said processor means responds to said algorithm signals by generating signals indicative of tentative death benefits.

16. A system according to claim 15, wherein said processor means responds to the tentative death benefit signals and to said algorithm signals, by generating further tentative death benefit signals.

17. A system according to claim 16, wherein said processor means stores signals indicative of a desired target premium contribution.

18. A system according to claim 17, wherein said processor means responds to said stored premium contribution signals and to said tentative premium contribution signals by comparing the approximate equivalence of the stored premium contribution signals with the tentative premium contribution signals and for generating a report in response to an approximate equivalence, and alternatively initiating a further calculation in response to a non-equivalence.

19. A system according to claim 13, wherein said means for gathering base customer information includes at least one census data form.

20. A system according to claim 19, wherein said census data form is a printed form.

21. A system according to claim 13, wherein said means for compiling said base information and summarizing it comprises a processor.

22. A system according to claim 13, wherein said means for calculating iteratively the benefit values of the insurance plan comprises a processor.

23. A system according to claim 13, wherein said means for calculating iteratively individual employee conversion benefit values of the insurance plan comprises a processor.

24. A method of facilitating the establishment and administration of an insurance plan, comprising:
gathering base information regarding a proposed new customer, said information including employee census information;
compiling said base information and summarizing it;
calculating iteratively the benefit values of the insurance plan based upon a given premium contribution from an employer for the insurance plan for a plurality of employees periodically for a given interval of time; and
calculating iteratively individual employees conversion benefit values of the insurance plan subsequent to said interval of time based upon said given premium contributions.

25. A system for facilitating the design, establishment and administration of a plurality of insurance plans on behalf of customer accounts, where base customer information is gathered and updated,
and insurance carrier accounts
where insurance plans are evaluated, said system comprising:
first data receiving and storing means for receiving and storing customer base information signals gathered by the customer account;
compiling means responsive to said customer base information signals for compiling said customer base information;
processor means responsive to said compiling means for generating tentative insurance illustration signals indicative of an insurance risk for a calculated premium;
report generating means responsive to said processor means for generating tentative insurance illustration reports and tentative information for proposal report for insurance carrier evaluation and acceptance, said reports delineating a tentative insurance plan;
sending means for sending the tentative insurance plan individually and selectively to an insurance carrier account for evaluation purposes and to a customer account for pre-plan approval;
second data receiving and storing means for receiving and storing insurance carrier information signals indicative of evaluated insurance illustration information and update information relating to said customer account; and
analyzing means responsive to said second data receiving and storing means for generating information signals for further evaluation by said customer account or alternately said insurance carrier account.

26. A system according to claim 25, wherein said analyzing means further includes a first responding means for determining that said insurance carrier has rejected said tentative insurance plan and for sending said tentative insurance plan to a selected insurance carrier that has not rejected said tentative insurance plan.

27. A system according to claim 25, wherein said analyzing means further includes a second responding means for determining that said insurance carrier has accepted said tentative insurance plan and for sending a policy acceptance signal to said insurance carrier and said customer account.

28. A system according to claim 25, wherein said analyzing means further includes a third responding means for determining that said insurance carrier has generated additional information signals and for sending said information signals to said customer account for further evaluation.

29. A system according to claim 25 wherein said compiling means further includes updating means for generating updated customer base information based upon the update information relating to said customer account.

30. A system according to claim 25, wherein said processor means comprises:
   means for generating a targeted master premium contribution signal that includes an individual employee premium component and a targeted employer premium component for a proposed group life insurance plan based upon said customer base information signals;
   calculating means response to said generating means for calculating iteratively the death benefit values of a group insurance plan based upon said targeted master premium contribution signal;
   means responsive to said calculating means for facilitating the calculation of a single master premium contribution measured by a plurality of present and future insurance risk factors allocable among the employees associated with said customer account, a plurality of calculated death benefit values of a proposed group insurance plan for insuring against present and future risks, and said targeted employer premium component, said single master premium contribution including a plurality of individual employee premium components and a single employer premium component;
   first responding means responsive to said facilitating means for generating tentative death benefit signals;
   second responding means responsive to said tentative death benefit signals and to said facilitating means for generating a tentative single master premium contribution signal having an employer premium component and a plurality of employee premium components;
   comparing means for comparing the approximate equivalence of said employer premium component of the tentative single master premium contribution signal and said targeted employer premium contribution; and
   data generating means for generating tentative insurance illustration signals in response to an approximate equivalence, and alternately initiating a further calculation in response to a non-equivalence.

31. A system according to claim 30, wherein said data generating means further includes premium generation means for generating group standard premiums and current reserve requirements for post-conversion transactions after a predetermined length of time passed upon said targeted employer premium contribution for a given customer account and present and future insurance risk factors.

32. A system according to claim 31, wherein said premium generation means for generating group standard premiums and current reserve requirements comprises:
   master premium generating means responsive to said compiling means for generating a single master premium contribution signal measured by a plurality of present and future insurance risk factors allocable among the employees associated with a selected customer account, a face amount of a group insurance policy for insuring present and future risks and a targeted employer premium contribution, said single master premium including a plurality of individual premium components and a single employer premium component, said employer premium component being approximately equal to said target employer premium contribution.

33. A system according to claim 30 wherein said comparing means further comprise;
   storing means for strong the death benefit values associated with the calculated tentative single master premium contribution signal;
   altering means for reallocating present and future insurance risk factors for generating an alternate single master premium contribution;
   calculating means for calculating iteratively the death benefit values of a group life insurance plan based upon said alternate single master premium contribution;
   comparing means for determining the maximum death values associated with each single master premium contribution calculated for generating a maximum death benefit value signal and alternately a non-maximum value signal when said death benefit value is not greater than the stored death benefit value;
   data generating means for generating tentative insurance illustration signals in response to said maximum death benefit value signal, and alternately initiating a further calculation in response to a non-maximum value signal.

34. A method for generating illustration data for facilitating the acceptance of a group life insurance risk for a customer account consisting of an employer having a plurality of employees, comprising:
   receiving base employer information from the customer account regarding a group life insurance plan, said base information including a targeted employer premium contribution;
   storing said base information characterizing said customer account;
   generating a plurality of individual employee premium components and a single employer premium component for a tentative single premium contribution based upon the stored customer base information for said customer account;
   calculating iteratively the death benefit values of a group life insurance plan based on said tentative single premium contribution;
   using an algorithm for facilitating the calculation of a single master premium measured by a plurality of present and future risk factors allocable among the employees associated with said customer account for a predetermined interval of time, a plurality of calculated death benefit values of a group insurance plan for insuring against present and future risks and a targeted employer premium contribution, said single master premium contribution including a plurality of individual premium components calculated continuously for said interval and a single employer premium component;

responding to said algorithm by generating signals indicative of a tentative death benefit;

responding to the tentative death benefit signal and to the algorithm to generate a tentative single premium contribution signal having an employer premium component and an employee premium component;

comparing the approximate equivalence of the employer premium component of the tentative premium contribution signal and the targeted employer premium contribution; and generating illustration data in response to an approximate equivalence, and alternately initiating a further calculation in response to a non-equivalence.

35. A method as recited in claim 34 further comprising:

storing death benefit values associated with the calculated tentative single master premium contribution signal;

reallocating present and future insurance risk factors for generating an alternate single master premium contribution;

calculating iteratively the death benefit values of a group life insurance plan based upon said alternate single master premium contribution;

comparing the death benefit value associated with the alternate single master premium contribution with the stored death benefit values to determine which benefit values are greater;

generating a maximum death benefit value signal when the maximum death benefit value has been determined; and generating a tentative insurance illustration data signal in response to said maximum death benefit value signal.

36. A method according to claim 34, wherein said predetermined interval of time equals five years.

* * * * *

UNITED STATES PATENT AND TRADEMARK OFFICE
CERTIFICATE OF CORRECTION

PATENT NO. : 4,837,693

DATED : June 6, 1989

INVENTOR(S) : Barry R. Schotz

It is certified that error appears in the above-identified patent and that said Letters Patent is hereby corrected as shown below:

Column 58, line 23, after "information" please delete "is", and substitute therefor --in--.

Column 58, line 37, after "report", delete "messages", and substitute therefor --message--.

Column 58, line 38, before "includes", delete "messages" and substitute therefor --message--.

Column 58, line 51, after "calculating", please insert --iteratively individual employee conversion--.

Signed and Sealed this

Eighth Day of May, 1990

Attest:

HARRY F. MANBECK, JR.

*Attesting Officer*     *Commissioner of Patents and Trademarks*